US009858535B2

(12) United States Patent
Keith et al.

(10) Patent No.: US 9,858,535 B2
(45) Date of Patent: Jan. 2, 2018

(54) SYSTEM AND METHOD FOR DYNAMIC GENERATION OF PROCEDURES

(75) Inventors: Steven Wesley Keith, Quispamsis (CA); Patrick Michael Pottier, Nova Scotia (CA); Michael Patrick Doyle, Woodmans Point (CA)

(73) Assignee: INNOVATIA INC., Saint-John, New Brunswick (CA)

( * ) Notice: Subject to any disclaimer, the term of this patent is extended or adjusted under 35 U.S.C. 154(b) by 1807 days.

(21) Appl. No.: 13/281,302

(22) Filed: Oct. 25, 2011

(65) Prior Publication Data

US 2012/0159389 A1 Jun. 21, 2012

Related U.S. Application Data

(60) Provisional application No. 61/406,432, filed on Oct. 25, 2010.

(51) Int. Cl.
*G06Q 10/00* (2012.01)

(52) U.S. Cl.
CPC .................................. *G06Q 10/00* (2013.01)

(58) Field of Classification Search
CPC combination set(s) only.
See application file for complete search history.

(56) References Cited

U.S. PATENT DOCUMENTS 5,596,507 A   1/1997 Jones et al.
6,061,516 A * 5/2000 Yoshikawa ........... G06F 9/4443
                                                                  717/109
6,615,204 B1 * 9/2003 Menon ...................... G06T 1/00
6,976,033 B2   12/2005 Yang et al.
7,062,502 B1 * 6/2006 Kesler ................. G06F 17/3056
(Continued)

FOREIGN PATENT DOCUMENTS

CN     101969388    2/2011
JP       62120959    6/1987

OTHER PUBLICATIONS

Schneider, Joachim et al., Asset management techniques, Electrical Power and Energy Systems 28, Mar. 31, 2006, www.sciencedirect.com.

*Primary Examiner* — Hien Duong
(74) *Attorney, Agent, or Firm* — Knobbe Martens Olson & Bear LLP

(57) ABSTRACT

A system and method for dynamic generation of procedures is disclosed. The method comprises: (a) storing asset types defining attributes; asset instances, inheriting attributes of one of the asset types and having attribute-values; procedure statements being associated to conditional rule(s) to be applied to an attribute-value of an asset instance; and procedure templates, each defining a unique combination of asset type and a group of said procedure statements. The method further comprises (b) for a given asset instance and a given procedure template: (i) iteratively reading each of the procedure statements of the group of procedure statements being associated to the given procedure template; and (ii) presenting, on a user interface, each one of the procedure statements where a condition is met when the corresponding conditional rule(s) is applied to the attribute-values of the given asset instance, in order to dynamically generate an asset specific procedure.

18 Claims, 47 Drawing Sheets

(56) References Cited

U.S. PATENT DOCUMENTS

| | | | | |
|---|---|---|---|---|
| 7,181,422 | B1* | 2/2007 | Philip | G06Q 40/00 |
| | | | | 705/35 |
| 7,490,027 | B2 | 2/2009 | Retsina | |
| 9,454,647 | B1* | 9/2016 | Richards | G06F 21/10 |
| 2002/0073114 | A1* | 6/2002 | Nicastro | G06Q 10/06 |
| | | | | 705/36 R |
| 2003/0200212 | A1* | 10/2003 | Benson | G06F 9/466 |
| 2003/0200220 | A1* | 10/2003 | Hu | G06F 17/30595 |
| 2005/0038707 | A1* | 2/2005 | Roever | G06Q 20/12 |
| | | | | 705/21 |
| 2005/0038724 | A1* | 2/2005 | Roever | G06Q 20/12 |
| | | | | 705/35 |
| 2006/0224563 | A1* | 10/2006 | Hanson | G06F 17/30463 |
| 2007/0050467 | A1* | 3/2007 | Borrett | G06F 17/30011 |
| | | | | 709/213 |
| 2009/0150329 | A1* | 6/2009 | Malec | G06F 17/248 |
| 2009/0204234 | A1 | 8/2009 | Sustaeta et al. | |
| 2010/0017739 | A1 | 1/2010 | Han | |
| 2010/0280977 | A1* | 11/2010 | Dybala | G06Q 10/10 |
| | | | | 706/11 |
| 2010/0333083 | A1* | 12/2010 | Chancey | G06F 8/36 |
| | | | | 717/174 |
| 2011/0161371 | A1* | 6/2011 | Thomson | G06F 17/30398 |
| | | | | 707/792 |
| 2011/0172965 | A1 | 7/2011 | McIntyre et al. | |

* cited by examiner

Generate Procedure

Given: Procedure Template, Asset, Date
For Each (Process Section in Procedure Template @ Date)
    Declare List PS Included Statements
    For Each (Conditional Statement in Process Section)
        If (Conditional Statement.EvaulateRule(Asset))
            PS Included Statements.Add(Conditional Statement.Statement)
        End If
    End For
    If (PS Included Statements Contains Elements)
    Display Process Section Heading
    For Each (Statement in PS Included Statements)
        Display Statement
    End For
End For

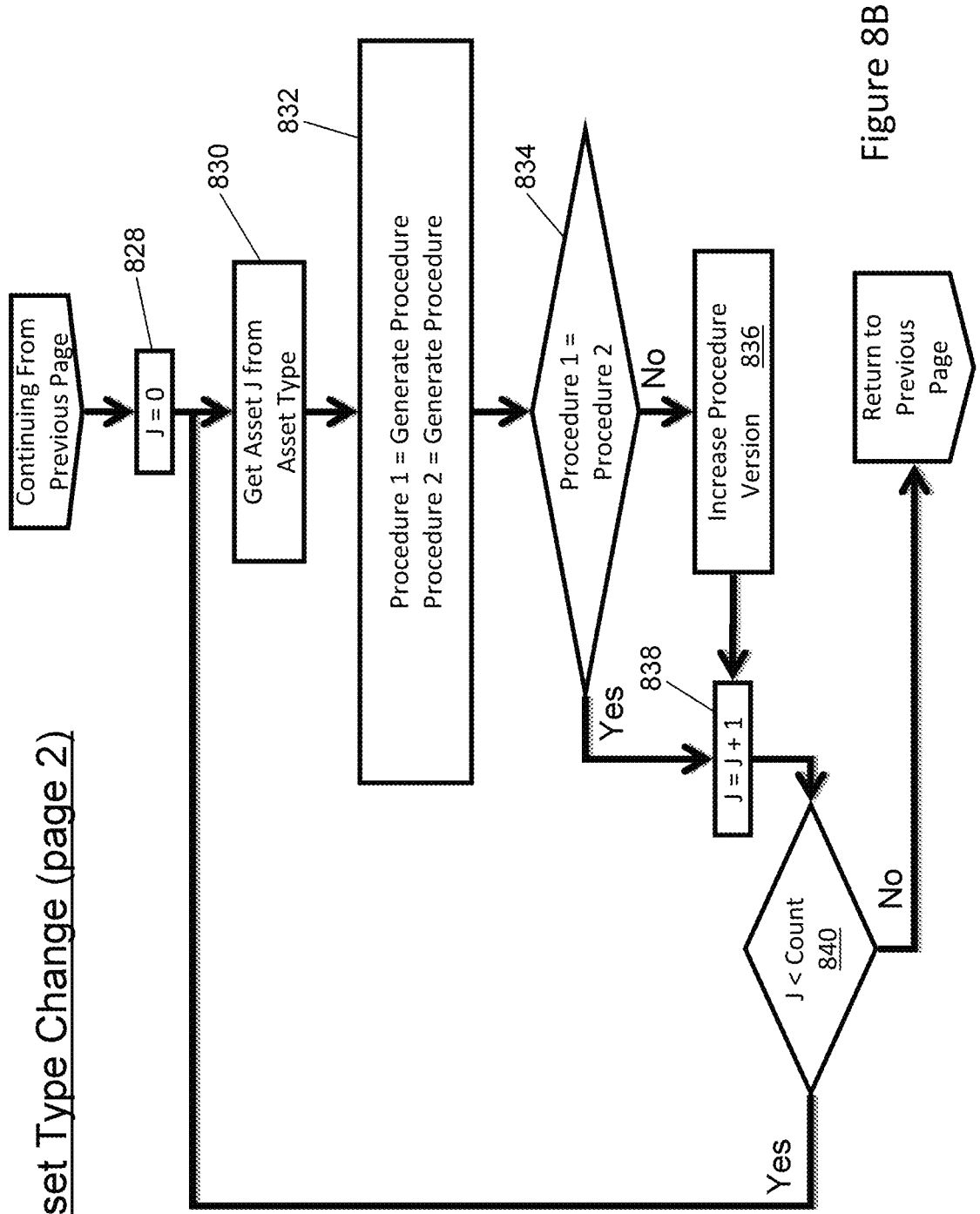

Asset Type Change (create new procedure version if required)

← 910

Given: Asset Type
Declare Start Time = Now
For Each (Procedure Template in Asset Type.Procedure Templates)
    For Each (Process Section in Procedure Template)
        For Each (Conditional Statement in Process Section)
            If ( Not (Conditional Statement.RuleTarget still exists))
                Remove Conditional Statement
            End If
        End For
    End For
    For Each (Asset in Asset Type.Assets)
        Declare Procedure 1 = Generate Procedure(Procedure Template, Asset, Now)
        Declare Procedure 2 = Generate Procedure (Procedure Template, Asset, Start Time)
        If (Procedure 1 != Procedure 2)
            Increase Procedure Version
        End If
    End For
End For

Figure 9

Procedure Template Change (create new procedure version if required) ~1100

Given: Procedure Template
Declare Start Time = Time Immediately Prior to Procedure Template Change
For Each (Asset in Asset Type.Assets)
    Declare Procedure 1 = Generate Procedure(Procedure Template, Asset, Now)
    Declare Procedure 2 = Generate Procedure (Procedure Template, Asset, Start Time)
    If (Procedure 1 != Procedure 2)
        Increase Procedure Version
    End If
End For

Figure 11

Statement Change (create new procedure version if required)

Given: Changed Statement
For Each(Asset Type in All Asset Types)
    For Each(Procedure Template in Asset Type.Procedure Templates)
        For Each( Asset in Asset Type.Assets)
            Declare Procedure = Generate Procedure(Procedure Template, Asset, Now)
            If (Procedure contains Changed Statement)
                Increase Procedure Version
            End If
        End For
    End For
End For

Statement Editor

Statement

Type: Information

Statement: Seal Quench Plan 62 (Basic checks to be supplied by RE team from BEMP's)

More details:

B *I* <u>U</u>

- Steam pressure should be maintained at (2-3 psig).
- The typical mode of failure is a dogged orifice, a defective pressure controller, loss of pressure in the line, or a closed valve
- Steam quench not operable-Check all valves to make sure they are open. Check steam source. If orifice is used, block in system and check for dogged conditions. Open blow down line to make sure system is not filled with condensate
- Excessive Condensate-Open blow down line. Reduce steam to desired level. It may be necessary to insulate steam system. For cold service pumps such as caustic service there will

Asset Type
- ● All types
- ○ Selected types ...

Attachments

QuenchPlan62.png

▫ Manage attachments

[Close]

▫ Where is this statement used?

Create Statement

Statement

Type: *

Statement: *

More details:

B  *I*  U  ≣  ⋮≣  ↶  ↷

Asset Type

○ All types
◉ Selected types:
　☐ Exchanger
　☐ Fin Fan
　☐ Pump
　☐ Unique

Attachments

▫ Manage attachments

— 120

[ Save ]   [ Cancel ]

SYSTEM AND METHOD FOR DYNAMIC GENERATION OF PROCEDURES

FIELD OF THE INVENTION

The present invention relates to the field of content development, namely standard operating procedure development. More particularly, the present invention relates to a system and method for dynamic generation of procedures, for managing assets and/or operations related concerning organizations having large numbers of such procedures and assets.

BACKGROUND OF THE INVENTION

Some businesses or organizations require to define large volumes of procedures and to manage such procedures as well as associated assets. For example, in an industrial setting, a company may need to create, manage and deliver standard operating procedures for planned maintenance on industrial assets that involved operator/field technician specific tasks like starting up an asset or removing an asset from operation for maintenance.

The sheer volume of procedures required and the content development timeline and cost using traditional methods present a primary obstacle. When over tens of thousands of assets must be defined and managed, and that several procedures are associated to each asset, it could take hundreds of person-years to prepare standard procedures, even for a large team of people, when using traditional document and content development and management approaches.

Known to the applicant United States patent applications No. 2011/0172965 A1 (McINTYRE et al.), 2005/0119768 A1 (RETSINA) and 2009/0204234 A1 (SUSTAETA et al.), as well as U.S. Pat. No. 5,596,507 (JONES).

Hence, in light of the aforementioned, there is a need for an improved system which, by virtue of its design and components, would be able to overcome some of the above-discussed prior art concerns.

SUMMARY OF THE INVENTION

According to an aspect of the present invention, there is provided a method for dynamic procedure generation. The method comprises: (a) storing, in a main storage: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements. The method further comprises (b) for a given asset instance and a given procedure template: (i) iteratively reading, by means of a processor, each of the procedure statements of the group of procedure statements being associated to said given procedure template; (ii) storing in a temporary memory, a statement-reference to each of said procedure statements where a condition is met when the corresponding one or more conditional rule is applied to the attribute-values of the given asset instance, in order to construct an asset-specific-procedure instance; and (iii) presenting, on a user interface, the procedure statements being referenced by the asset-specific-procedure instance constructed at step (b)-ii), in order to dynamically generate an asset specific procedure.

According to another aspect of the present invention, there is provided a system for dynamic procedure generation, the system comprising: a main storage for storing: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements; and a processor being in communication with the storage for iteratively reading each of the procedure statements of the group of procedure statements being associated to said given procedure template; a temporary memory being in communication with the processor for storing a statement-reference to each of said procedure statements where a condition is met when the corresponding one or more conditional rule is applied to the attribute-values of the given asset instance, in order to construct an asset-specific-procedure instance; and communication means being in communication with the temporary memory and the processor for outputting the procedure statements being referenced by the constructed asset-specific-procedure instance to be presented on a user interface, in order to dynamically generate an asset specific procedure.

According to another aspect of the present invention, there is provided a processor-readable storage medium for dynamic procedure generation the processor-readable product comprising instructions for execution by a processor to: (a) store, in a main storage: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements; and (b) for a given asset instance and a given procedure template: (i) iteratively read, by means of a processor, each of the procedure statements of the group of procedure statements being associated to said given procedure template; (ii) store in a temporary memory, a statement-reference to each of said procedure statements where a condition is met when the corresponding one or more conditional rule is applied to the attribute-values of the given asset instance, in order to construct an asset-specific-procedure instance; and (iii) present, on a user interface, the procedure statements being referenced by the asset-specific-procedure instance constructed at step (b)-ii), in order to dynamically generate an asset specific procedure.

According to yet another aspect of the present invention, there is provided a method for dynamic procedure generation, the method comprising: (a) storing, in a main storage: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements; and (b) for a given asset instance and a given procedure template: (i) iteratively reading, by means of a processor, each of the procedure statements of the group of procedure statements being associated to said given procedure template; (ii) presenting, on a user interface, each of said procedure statements where a condition is met when the corresponding one or more conditional rule is applied to the attribute-values of the given asset instance, in order to dynamically generate an asset specific procedure.

According to yet another aspect of the present invention, there is provided a processor-readable storage medium for dynamic procedure generation the processor-readable product comprising instructions for execution by a processor to: (a) store, in a main storage: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements; and (b) for a given asset instance and a given procedure template: (i) iteratively read, by means of a processor, each of the procedure statements of the group of procedure statements being associated to said given procedure template; and (ii) present, on a user interface, each of said procedure statements where a condition is met when the corresponding one or more conditional rule is applied to the attribute-values of the given asset instance, in order to dynamically generate an asset specific procedure.

According to yet another aspect of the present invention, there is provided a system for dynamic procedure generation, the system comprising: a main storage for storing: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements; and a processor being in communication with the storage for iteratively reading each of the procedure statements of the group of procedure statements being associated to said given procedure template; and communication means for being in communication with the temporary memory and the processor for outputting each of said procedure statements where a condition is met when the corresponding one or more conditional rule is applied to the attribute-values of the given asset instance, in order to dynamically generate an asset specific procedure.

According to still another aspect of the present invention, there is provided a processor-readable storage medium comprising a data structure for dynamic procedure generation, wherein the data structure comprises: a library of asset types, each being representative of a common group of assets, each asset type defining attributes; asset instances, and each of said asset instances inheriting attributes of one of the asset types and having an attribute-value assigned to each of the inherited attributes; a collection of procedure statements; one or more conditional rule to be applied to an attribute-value of an asset instance, said one or more conditional rule being associated to each of the procedure statements; and a collection of procedure templates, each defining a unique combination of one of the asset types and a group of said procedure statements, for applying the one or more conditional rule associated with each of the procedure statements in said group, to the attribute-values of the given asset instance and for generating, where a condition is met, the corresponding one of the procedure statements, in order to dynamically generate an asset specific procedure.

Draft Procedure Generation Method

Preferably, there is provided a procedure generation method comprising the steps of: providing a plurality of classes, each class being representative of an asset to be used, wherein the asset is preferably an equipment, each asset having: one or more attribute being representative of a qualification of the associated equipment; and one or more procedure being representative of an operation associated to the equipment, each procedure being defined by one or more statement. The method further preferably comprising providing a set of rules for combining classes, attributes and procedure; and dynamically generating combinations of procedure, attributes and assets based on at least said rules to produce draft procedures for respective assets. Preferably, a procedure template is defined within the system as a collection of conditional statements, such that a statement is only applicable to an asset's procedure if the associated condition is met. A condition in this sense may be a specific asset, the existence of an attribute on an asset, or a value indicating that the statement is always applicable.

Still preferably, procedures are dynamically generated, upon request to view, edit or complete from a definition of asset, by evaluating each of the conditional statements for each defined procedure template against the a defined asset to establish a set of applicable statements for that particular asset's procedures. Upon modification of a statement, procedure template, or asset all impacted procedures are automatically handled to create a new version of each of the impacted procedures in the system while maintaining a historical record of all previous procedure versions.

Preferably, there is provided a procedure generation system comprising: a storage medium having stored thereon: a database for storing a set of rules and a plurality of classes, each class being representative of an asset to be used, wherein the asset is preferably an equipment, and each asset is associated to: one or more attribute being representative of a qualification of the corresponding equipment; and one or more procedure being representative of an operation corresponding to the equipment. Preferably, the system further comprises: statements and instructions for generating combinations of procedure, attributes and classes based on said set of rules; and a processor for executing said statements and instructions.

Thus, preferably, there is provided a draft procedure generation module which presents a well defined set of tightly coupled features that could be implemented together including asset type definition, asset profiling, procedure template definition and draft procedure generation. Through asset type definition, classes of assets may be described (pumps, fans, compressors, heat exchanger, and/or the like), as well as potential properties, attributes and potential attribute values of each class. For example, an asset class of Pump may have a Drive Type attribute with possible values of Electric, Steam, or Internal Combustion. For a given asset class, a checklist style form from an asset type definition may be presented to a user to take into the field, where the asset is deployed, to capture the actual values of each asset attribute that applies to that specific asset.

Preferably, a set of procedure templates is created for each asset class. A pump, for example, may have Normal Startup, Normal Shutdown, Prepare for Maintenance and Return from Maintenance. This template may thus include all possible statements for each procedure type (by asset class) with each statement having a condition that describes its inclusion in an asset specific procedure chosen from the comprehensive list of attributes and attribute values for that asset class. For example, if Pump requires that the pump drive (motor) gets turned off (i.e. Normal Shutdown Template), then it would have a different statement for each drive type each with the appropriate drive type selected (Electric, Steam or Internal Combustion).

Preferably, when a given asset profile is completed, meaning all appropriate attributes and attribute values are populated and submitted to the system, a set of draft procedures may be rendered through a multi-stage process that effectively involves the 'overlaying' of the asset (specific) profile onto a set of procedure templates for the given asset class. The key to this specific solution is that there is never any explicit snapshot of the asset specific procedures, but rather, the procedures are rendered dynamically, upon request through the 'overlay' process described above. At this point, a draft procedure is produced, and some changes may be required in order to properly represent how the procedure should be executed for the specific asset.

Procedure Editing System

According to another aspect of the present invention, there is provided a framework for customizing and editing the draft procedures (i.e. procedures generated). The Applicant's approach allows for hiding statements that were included in the draft but do not apply to the specific asset being documented, adding statements from a pool of existing statements, creating new statements to add to the procedure (and statement pool) and re-ordering of statements (specific to that procedure instance).

This approach is advantageous in that it is simple, elegant and best fit as an extension to the dynamic procedure rendering techniques used to generate the draft procedure. To enable this, a DB schema extension may be used, stored procedures added and several C#.NET business logic layer components may be developed in addition to the user interface components with the functional behavior described above, in ASP.NET.

Preferably, after an editing has been applied to a procedure, the rendering process has an extra step during which the asset specific procedure editings are identified then applied to the procedure. Positional information, relative to the master template statements, is the data used for persisting sequencing changes and that data is important to the mechanism for rendering.

Workflow, Markup and Procedure Versioning Method

According to another aspect of the present invention, there is provided workflow, markup and procedure versioning method.

Preferably, a workflow supports the review, editing and approval processes for procedure development. It may be implemented simply as minor extensions to the procedure data model with several interface additions to support use cases. The review part of the workflow includes some non-complex user interface (UI), Business Logic (BL) and database DB schema extensions to support commenting on draft (or non-issued) procedures for content related input from subject matter experts.

Preferably, whenever a change, or set of changes, is applied to the procedure the system moves a copy of the previous version of the statements to an archive record and a reference is established such that if a previous version of a procedure is requested the archived statement is referenced into the procedure.

According to the present invention, the time required to create and maintain a large volume of standard operating procedures is dramatically reduced, namely when there is a significant amount of repetition of content between procedures. A reduction of 80% in the effort to create a large volume of procedures has been observed, in an industrial setting, in comparison to traditional approaches.

The objects, advantages and features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 7 is an algorithm of the of steps shown in FIG. 6.

FIGS. 8A and 8B are a block diagram of steps of a method, according to a preferred embodiment of the present invention.

FIG. 9 is an algorithm of the steps shown in FIGS. 8A and 8B.

FIG. 11 is an algorithm of the steps shown in FIG. 10.

FIG. 13 is an algorithm of the steps shown in FIG. 12.

FIG. 23 is another screenshot of a user interface of a system, according to a preferred embodiment of the present invention.

Figure 28:
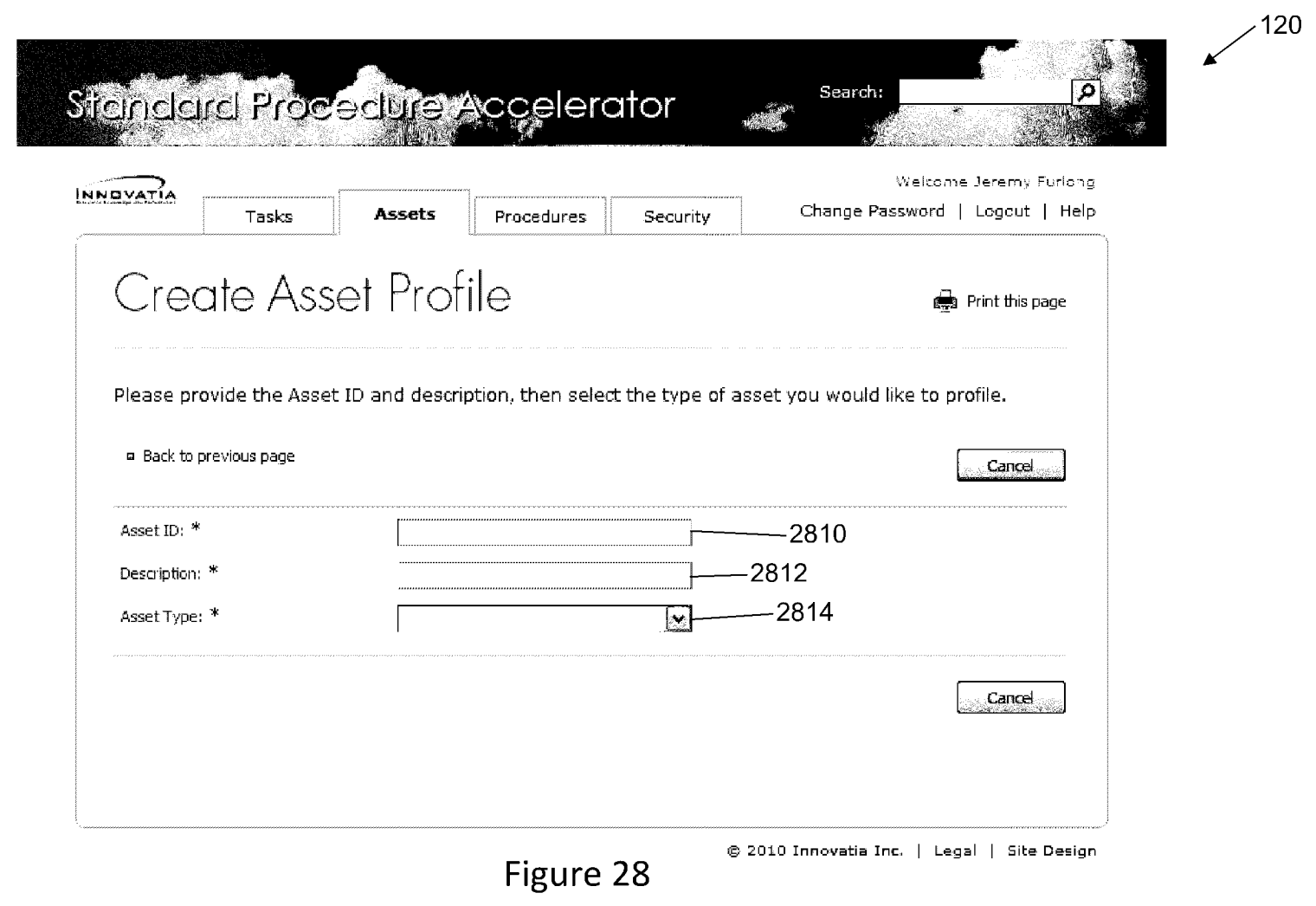

FIG. 28 is another screenshot of a user interface of a system, according to a preferred embodiment of the present invention.

FIG. 39 is another screenshot of a user interface of a system, according to a preferred embodiment of the present invention.

FIG. 43 is another screenshot of a user interface of a system, according to a preferred embodiment of the present invention.

Figure 45:
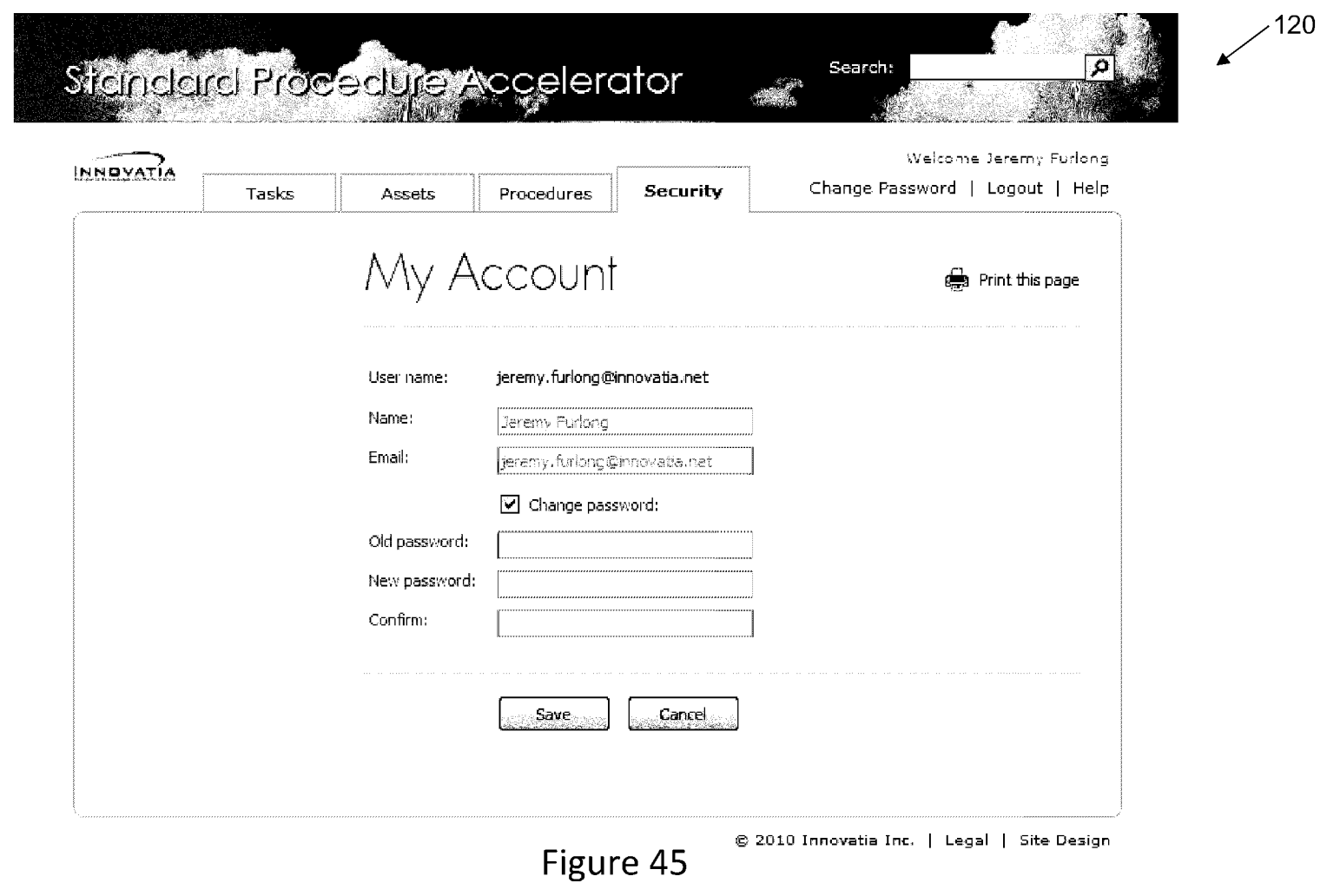

FIG. 45 is another screenshot of a user interface of a system, according to a preferred embodiment of the present invention.

DETAILED DESCRIPTION OF PREFERRED EMBODIMENTS OF THE INVENTION

In the following description, the same numerical references refer to similar elements. The embodiments mentioned and/or geometrical configurations and dimensions shown in the figures or described in the present description are embodiments of the present invention only, given for exemplification purposes only.

Broadly described, the present invention proposes re-use algorithms and exploits the sharing of procedures as well as class types which may be used to classify a large number of assets, and is preferably based on a database centered multi-tiered web based solution.

The primary qualitative aspect of the software is that it has been designed in a multi-tier architecture to improve scalability and portability and to promote reuse of components. As presented in FIG. 1, the separation of user interface from business logic from the data layer allows one or more application servers to be hosted on separate physical hardware from the database if necessary.

Figure 2:
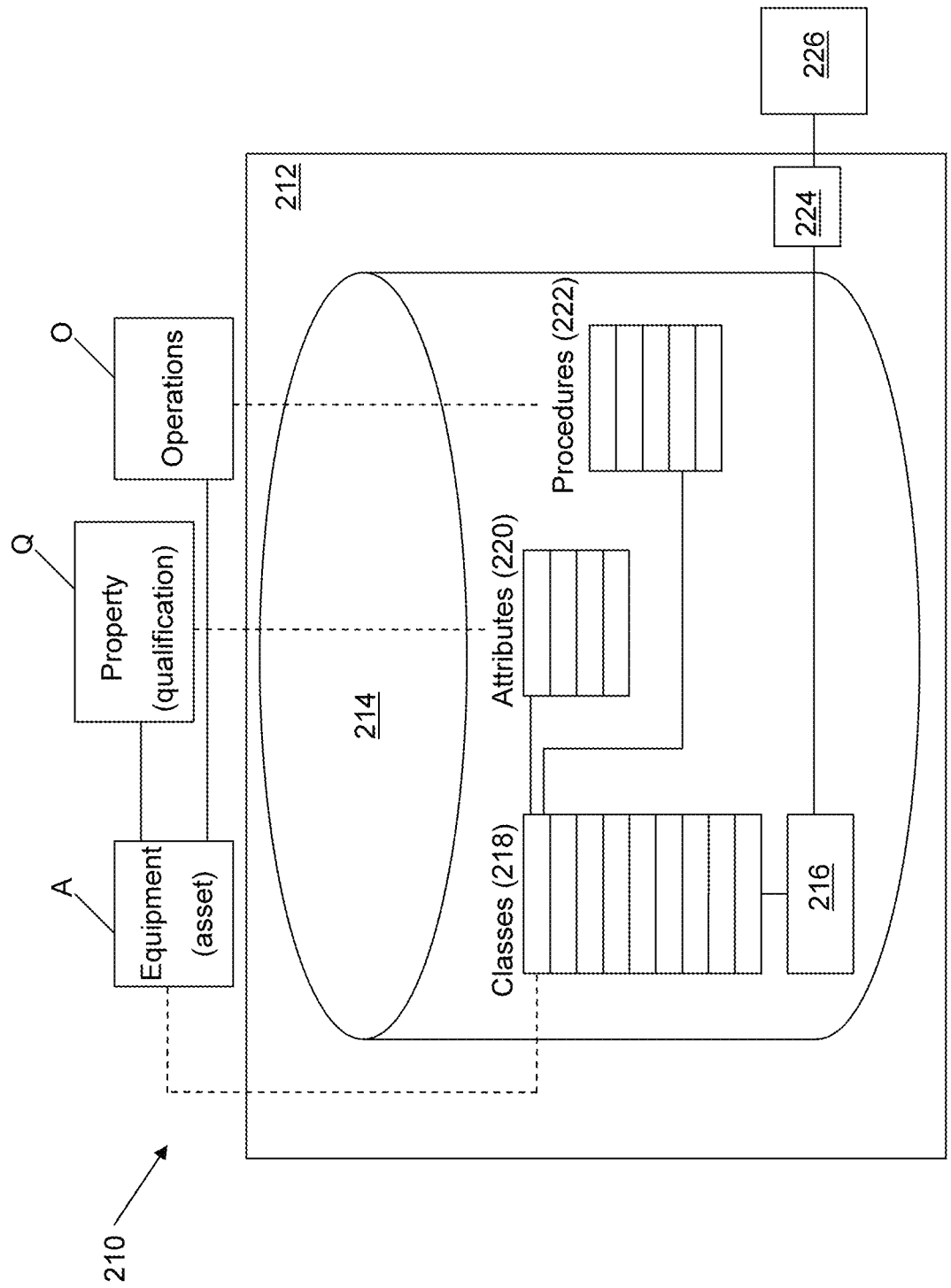
FIG. 2 is another schematic diagram of a system according to a preferred embodiment of the present invention.

According to an embodiment of the present invention, there is provided, as better illustrated in FIG. 2, a procedure generation system 10 comprising:
- a storage medium 12 having stored thereon:
  - a database 14 for storing a set of rules 16 and a plurality of classes 18, each class 18 being representative of an asset A to be used, wherein the asset A is preferably an equipment, and each asset A is associated to:
    - one or more attribute 20 being representative of a qualification Q of the corresponding equipment;
    - one or more procedure 22 being representative of an operation O corresponding to the equipment;
  - statements and instructions 24 for generating combinations of procedure 22, attributes 20 and classes 18 based on said set of rules; and
- a processor 26 for executing said statements and instructions.

Figure 3:
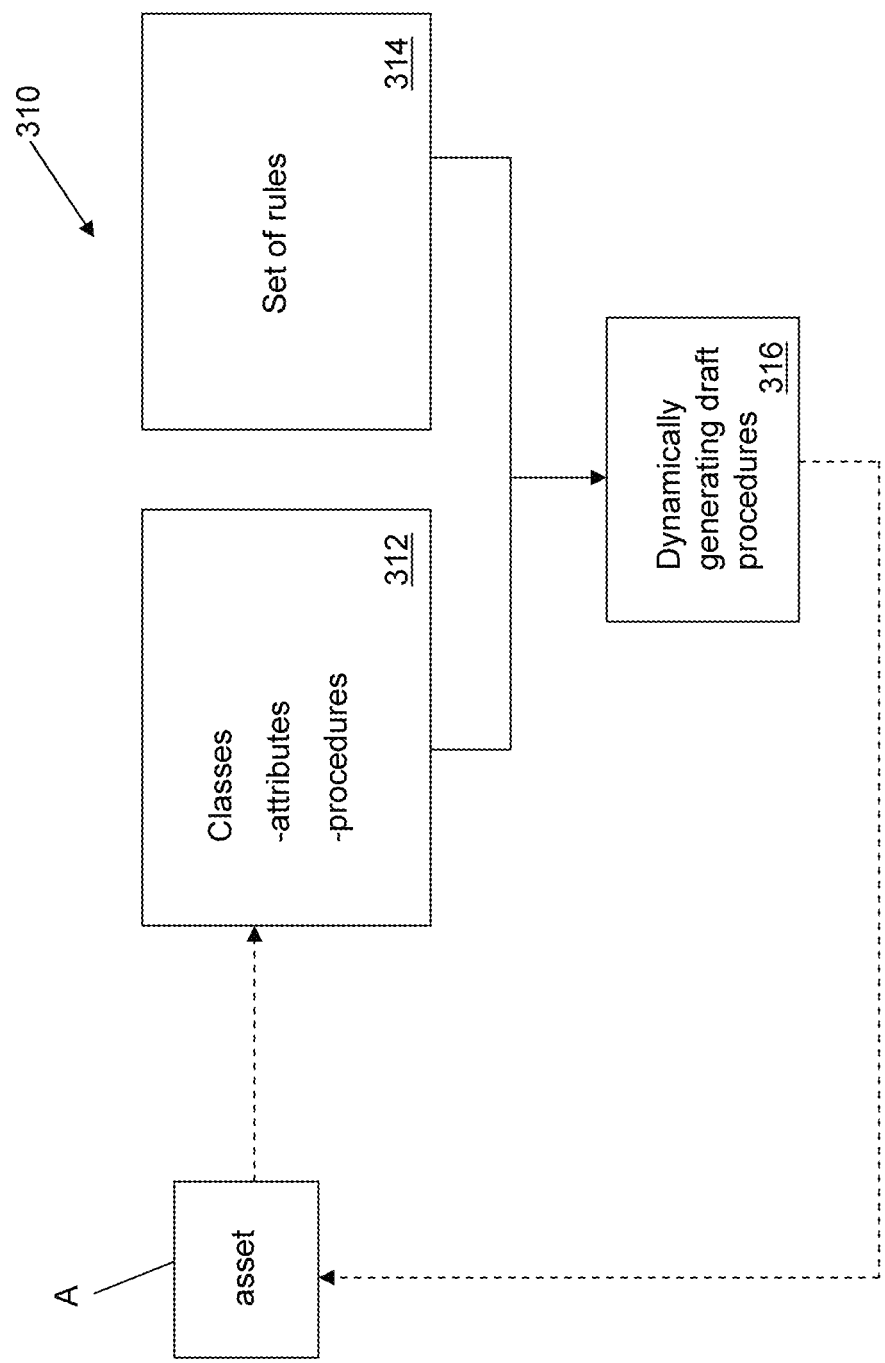
FIG. 3 is a schematic representation of a method according to a preferred embodiment of the present invention.

Preferably, the above-system performs a procedure generation method 310, as schematically represented in FIG. 3, comprising the steps of:
- providing 312 a plurality of classes, each class being representative of an asset to be used, wherein the asset is preferably an equipment, each asset having:
  - one or more attribute being representative of a qualification of the associated equipment;

one or more procedure being representative of an operation associated to the equipment, each procedure being defined by one or more statement;

providing a set of rules 314 for combining classes, attributes and procedure; and dynamically generating 316 combinations of procedure, attributes and assets based on at least said rules to produce draft procedures for respective assets.

Figure 1:
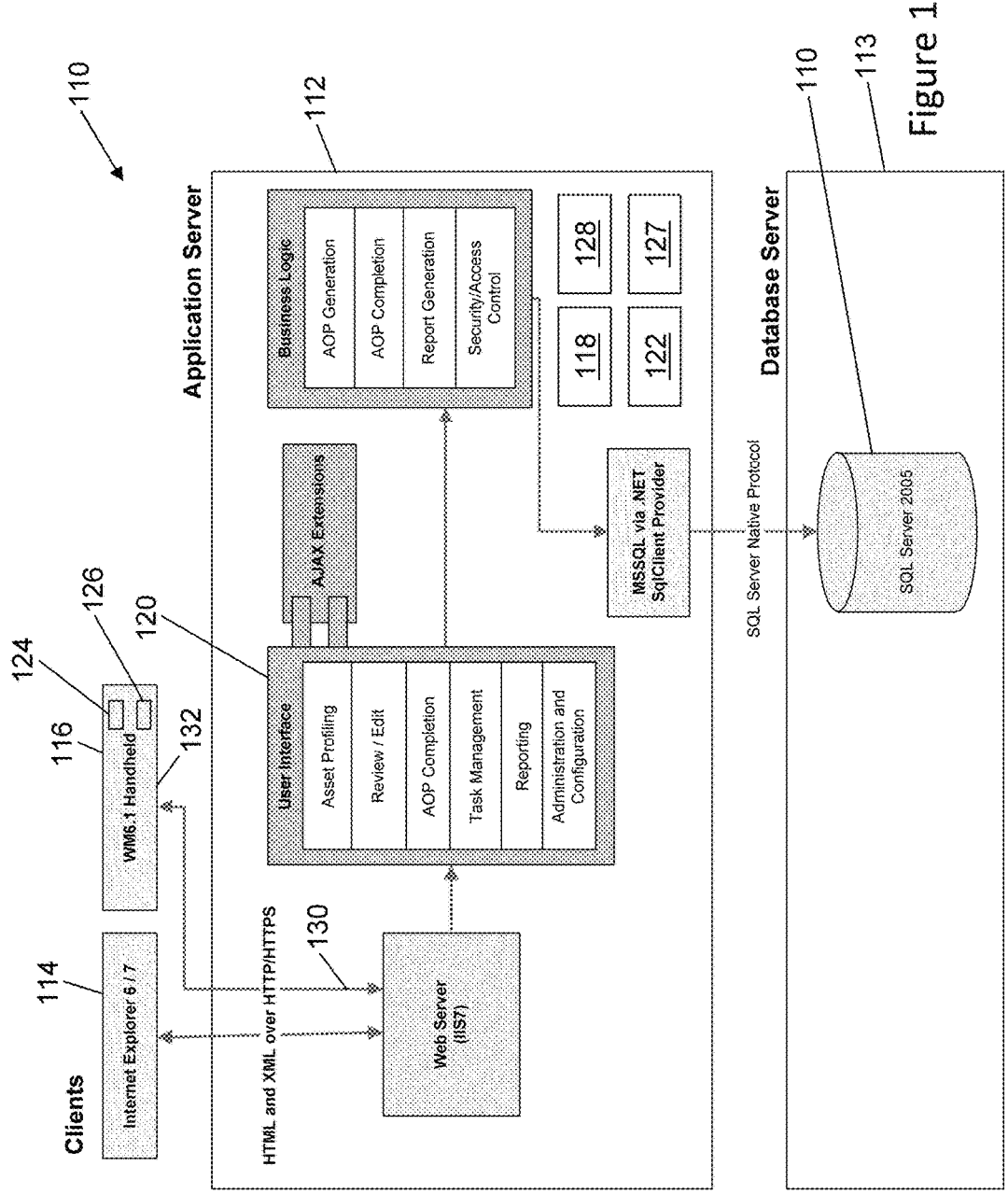
FIG. 1 is a schematic diagram of a system according to a preferred embodiment of the present invention.
Figure 4:
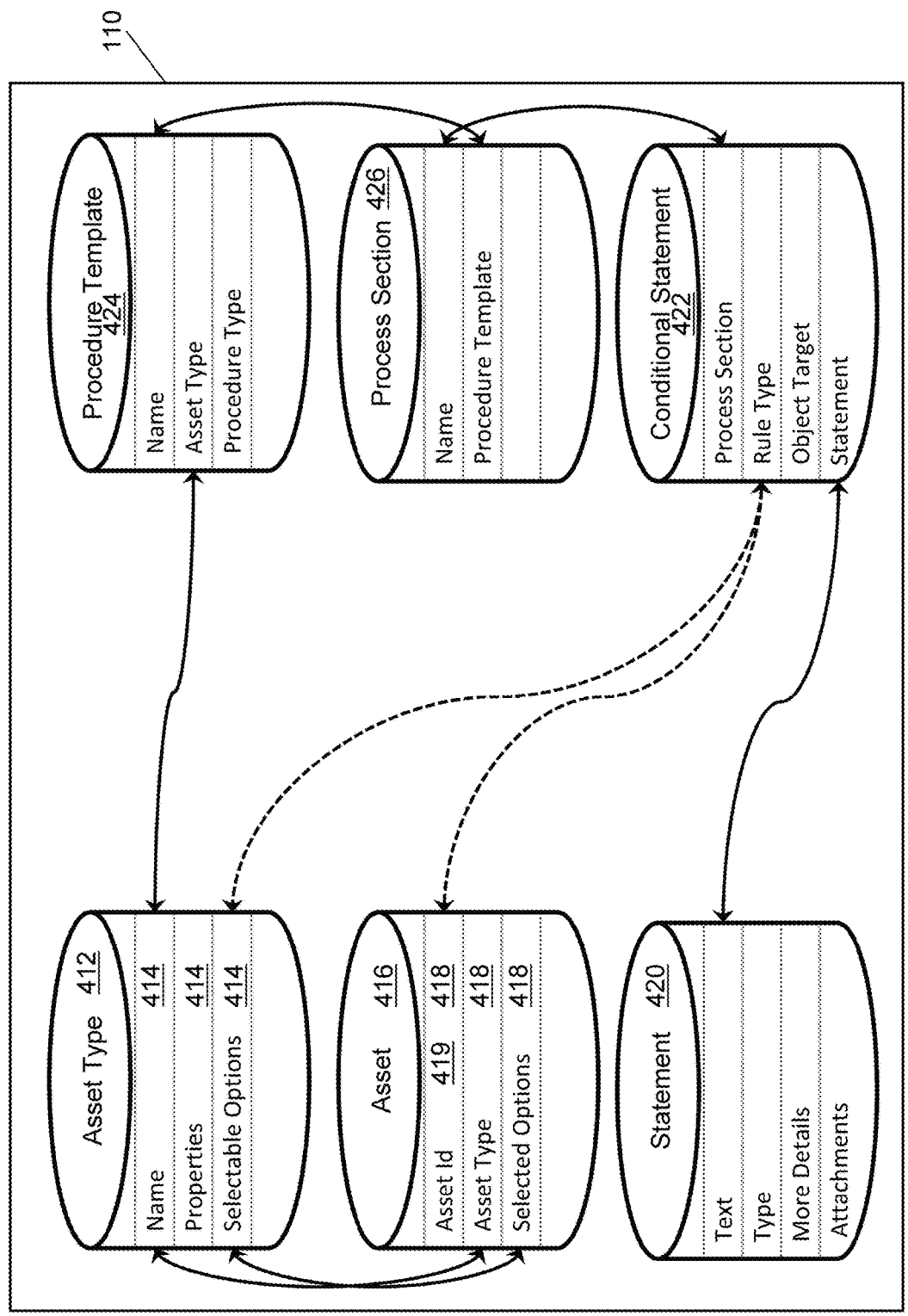
FIG. 4 is a schematic diagram of a data structure in a system according to a preferred embodiment of the present invention.
Figure 5:
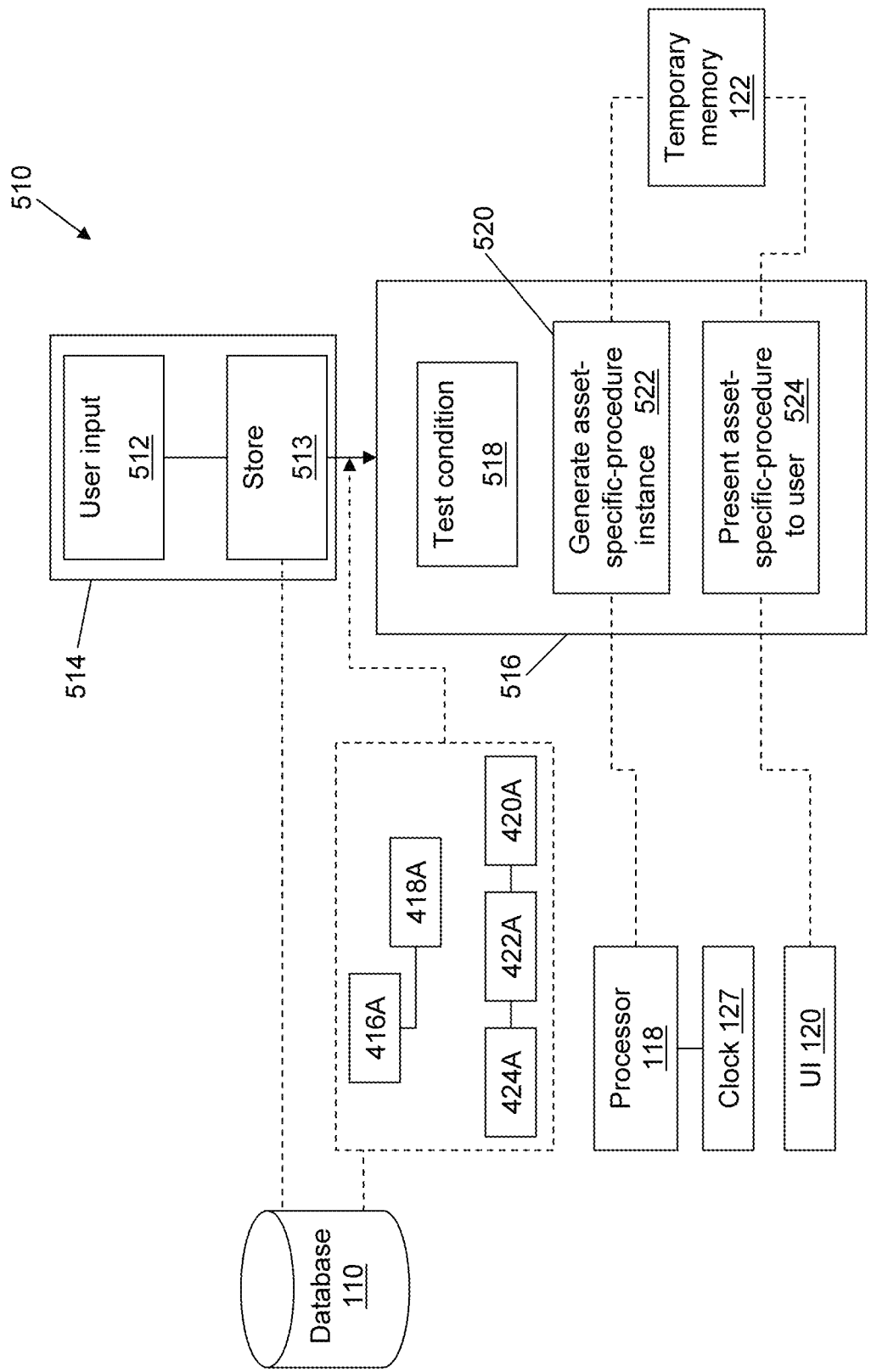
FIG. 5 is a block diagram of a method, being shown with components of a system, according to a preferred embodiment of the present invention.

More particularly, with reference to FIGS. 4 and 5, as well as to FIG. 1, there is provided, in accordance with an embodiment of the present invention, a method 510 for dynamic procedure generation. The method 510 comprises (a) storing 514, in a main storage 110: a library 412 of asset types, each being representative of a common group of assets, each asset type defining attributes 414; asset instances 416, and each of said asset instances inheriting attributes of one of the asset types and having an attribute-value assigned to each of the inherited attributes 418; a collection of procedure statements 420; one or more conditional rule 422 to be applied to an attribute-value of an asset instance, said one or more conditional rule being associated to each of the procedure statements 420; and a collection of procedure templates 424, each defining a unique combination of one of the asset types 412 and a group of said procedure statements 420. The method 510 further comprises (b) at 516, for a given asset instance at $416_A$ and a given procedure template at $424_A$: (i) at 518, iteratively reading, by means of a processor 118, each of the procedure statements $420_A$ of the group of procedure statements associated to said given procedure template $424_A$; and (ii) presenting at 520, on a user interface 120, each of said procedure statements $420_A$ where a condition is met when the corresponding one or more conditional rule at $422_A$ is applied to the attribute-values at $418_A$ of the given asset instance at $416_A$, in order to dynamically generate an asset specific procedure.

In other words, the method first identifies which statements are associated to the given procedure template. Each statement is associated to a conditional rule. The conditional rule is tested against specific attribute values of the asset instance in question, thereby dynamically generating an asset specific procedure (also referred to herein as "Asset Operating Procedure" or "AOP").

In some cases, a group of statements may be associated to a conditional rule, as can be easily understood by a person skilled in the art. Alternatively, it is to be understood that one or more statement may be subject to a plurality of conditional rules.

According to a preferred embodiment of the present invention, the method 510 comprises: (a) storing 614, in a main storage 110: a library 412 of asset types, each being representative of a common group of assets, each asset type defining attributes 414; asset instances 416, and each of said asset instances inheriting attributes of one of the asset types and having an attribute-value assigned to each of the inherited attributes 418; a collection of procedure statements 420; one or more conditional rule 422 to be applied to an attribute-value of an asset instance, said one or more conditional rule being associated to each of the procedure statements 420; and a collection of procedure templates 424, each defining a unique combination of one of the asset types 412 and a group of said procedure statements 420. The method 510 further comprises: (b) at 516, for a given asset instance and a given procedure template $424_A$: (i) at 518, iteratively reading, by means of a processor 118, each of the procedure statements $420_A$ of the group of procedure statements being associated to said given procedure template $424_A$; (ii) at 522, storing in a temporary memory 122, a statement-reference at 426, to each of said procedure statements $420_A$ where a condition is met when the corresponding one or more conditional rule $422_A$ is applied to the attribute-values $418_A$ of the given asset instance $416_A$, in order to construct an asset-specific-procedure instance; and (iii) at 524, presenting on a user interface 120, the procedure statements $420_A$ being referenced by the asset-specific-procedure instance constructed at step (b)-ii), in order to dynamically generate an asset specific procedure.

The asset types represent a common group of assets, namely assets sharing similar or common properties, i.e. which can be defined with similar attributes. Attributes are possible properties of an asset. Each property may be defined by different values which are specific to a particular asset instance. It is to be understood that not all attributes are inherited by the asset instance.

With reference to FIG. 4, an asset instance 416 is of a single asset type 412. Several asset instances 416 may be related to one asset type 412. Moreover, a procedure template 424 references a single asset type 412 and one or more Process Section 426, (identified as "PS" in some of the figures). A Process Section 426 serves to group statements which are logically related. When presented to the user, the statements are preferably grouped by Process Section with a corresponding header appearing thereabove. A Process Section 426 references one or more conditional reference 422, each of which in turn references a procedure statement 420.

The "Asset-Specific-Procedure Instance" refers to a dynamically generated list of pointers which reference the procedure statements, via the Process Section references and conditional rule references.

Definitions, Acronyms, and Abbreviations

| Name | Definition |
| --- | --- |
| AM | Area Manager, actor |
| AOP | Asset Operating Procedure, akin to Standard Operating Procedure |
| AOS | Area Operations Specialist, actor |
| DC | Database Coordinator, actor |
| FT | Facility Technician, actor |
| FTTL | Field Tech Team Lead, actor |
| SPA | Standard Procedure Accelerator |
| PSD | Process Statement Developer, actor |
| SME | Subject Matter Expert, actor |
| TW | Technical Writer, actor |

Overview of Functionalities

The SPA has two main areas of functionality, namely (1) AOP Completion and (2) AOP Development/Administration, which will be better explained hereinbelow.

1. AOP Completion

AOP Completion is provided for personnel who are tasked with the completion of published AOPs in the plants.

According to a preferred embodiment, the following steps are carried out:

A Facility Technician user arrives at the website login page.

After logging in, user goes to the 'Find Assets' page and searches for AOPs by asset number.

When the user searches for an AOP, the search results are displayed below the search box and the user may open a procedure in the 'AOP Viewer', and then add the AOP to his/her Completion List.

The user connects a handheld device to the PC, starts the SPA Mobile application and selects an option to download the AOPs from his/her Completion List.

The user enters his/her username and password on the handheld device.

SPA Mobile downloads procedures from the user's Completion List.

User takes the handheld device to field and completes the procedures, adding comments as he/she works.

The user connects the handheld device to a PC, selects an option to return completed work, and re-enters his/her password. SPA Mobile uploads any completed procedures to the SPA server.

Administrator users are able to see the history of AOP completions including the associated work order number (if entered), comments from the procedure completion, and the version of the procedure that was completed.

Figure 32:
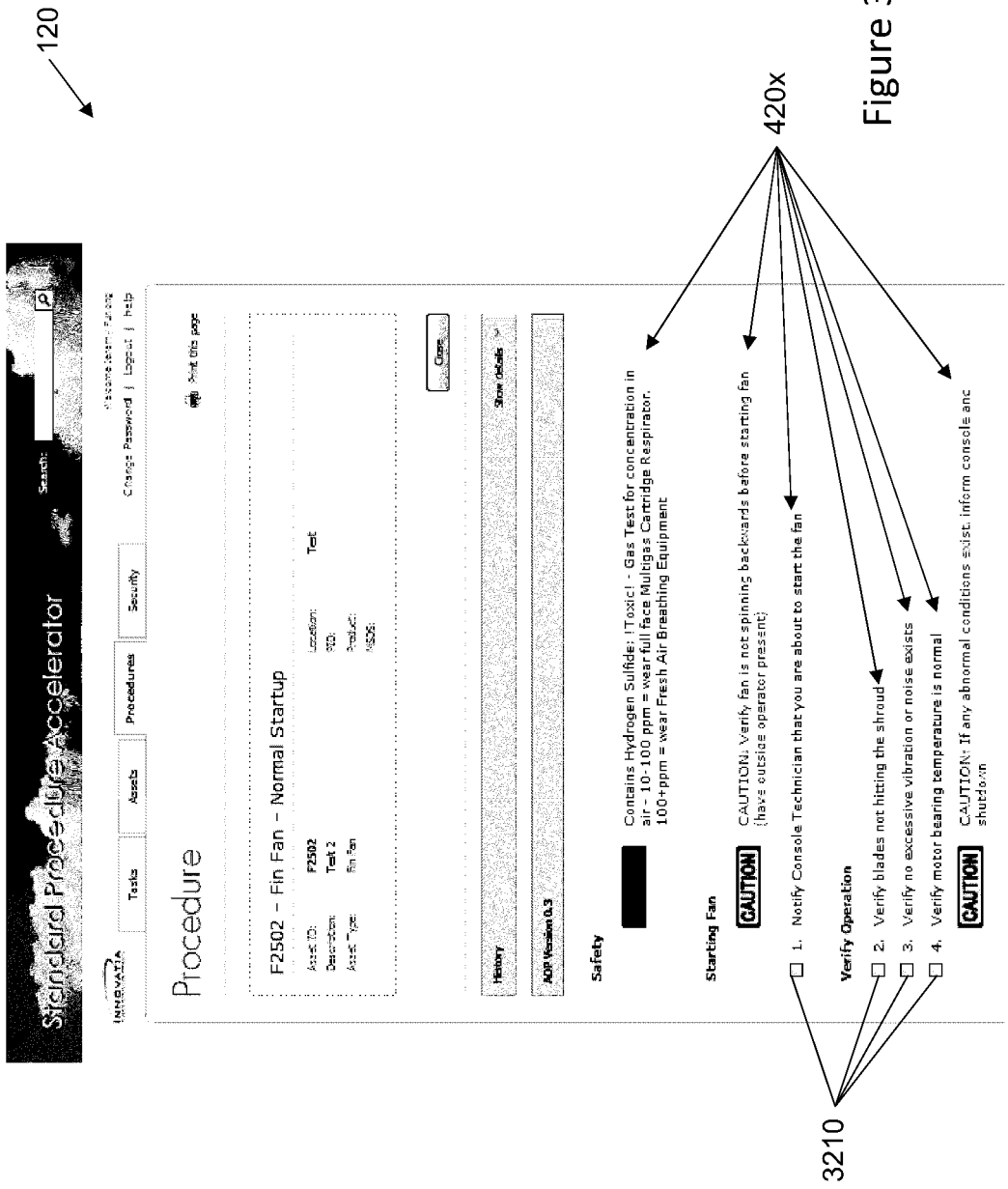
FIG. 32 is another screenshot of a user interface of a system, according to a preferred embodiment of the present invention.
Figure 33:
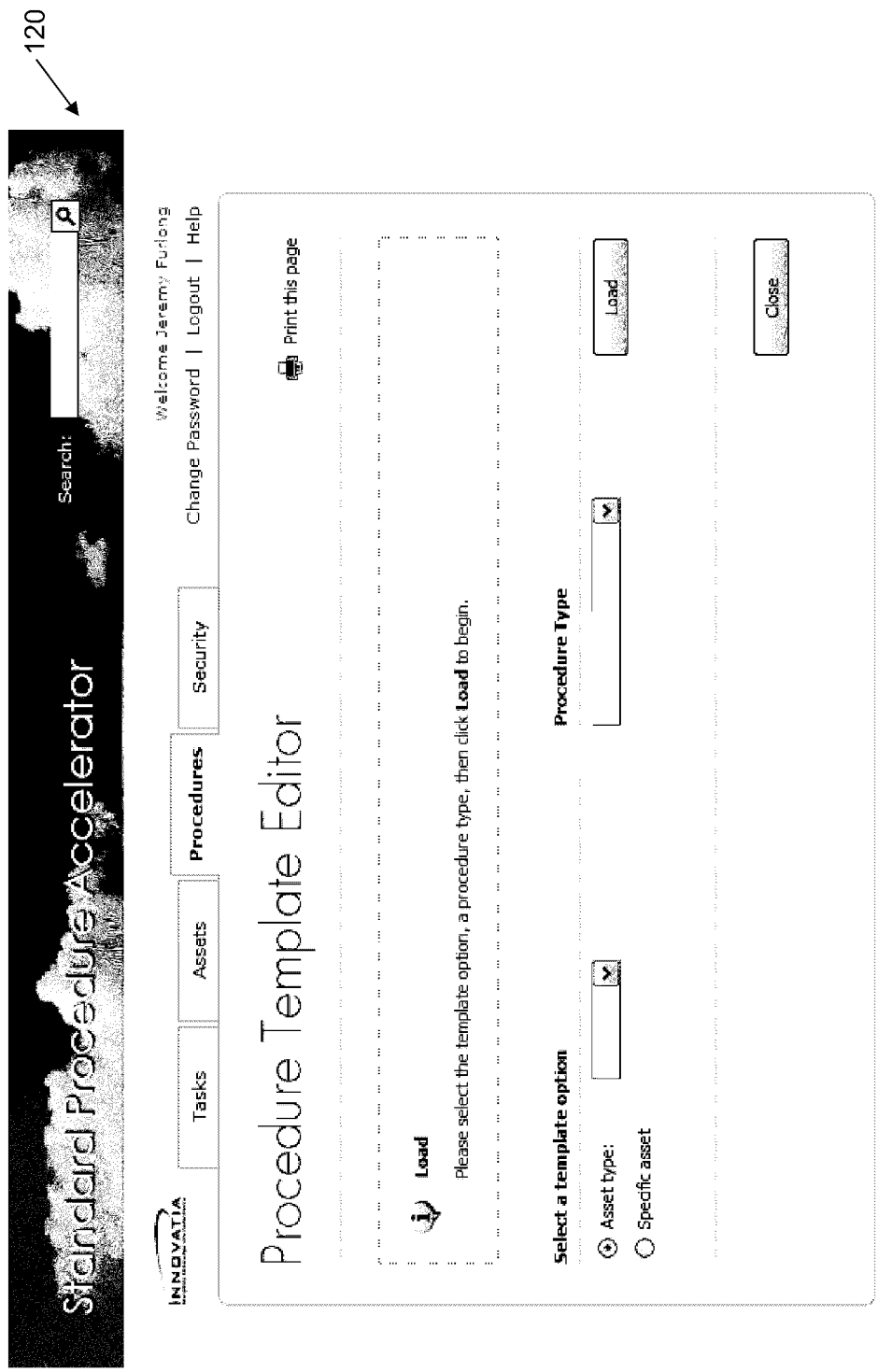
FIG. 33 is another screenshot of a user interface of a system, according to a preferred embodiment of the present invention.
Figure 34:
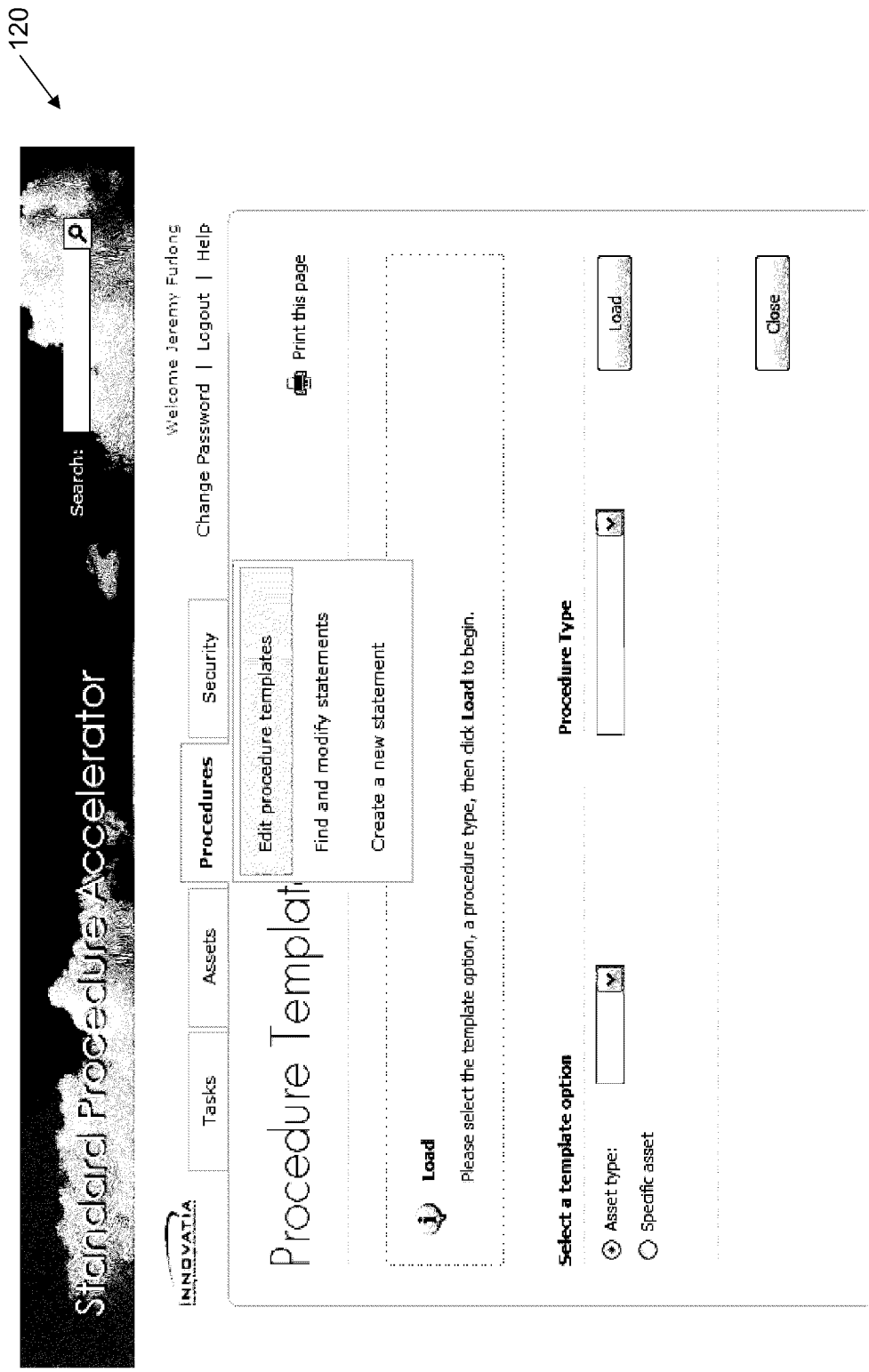
FIG. 34 is another screenshot of a user interface of a system, according to a preferred embodiment of the present invention.
Figure 35:
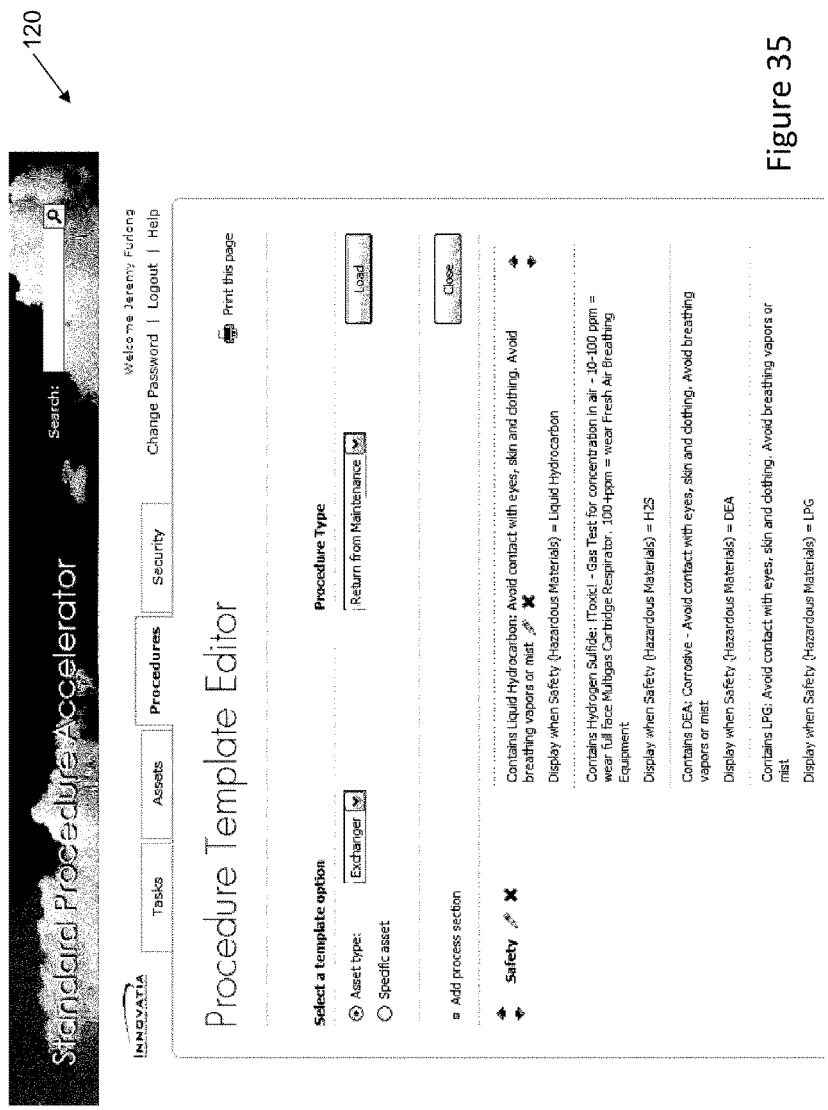
FIG. 35 is another screenshot of a user interface of a system, according to a preferred embodiment of the present invention.
Figure 36:
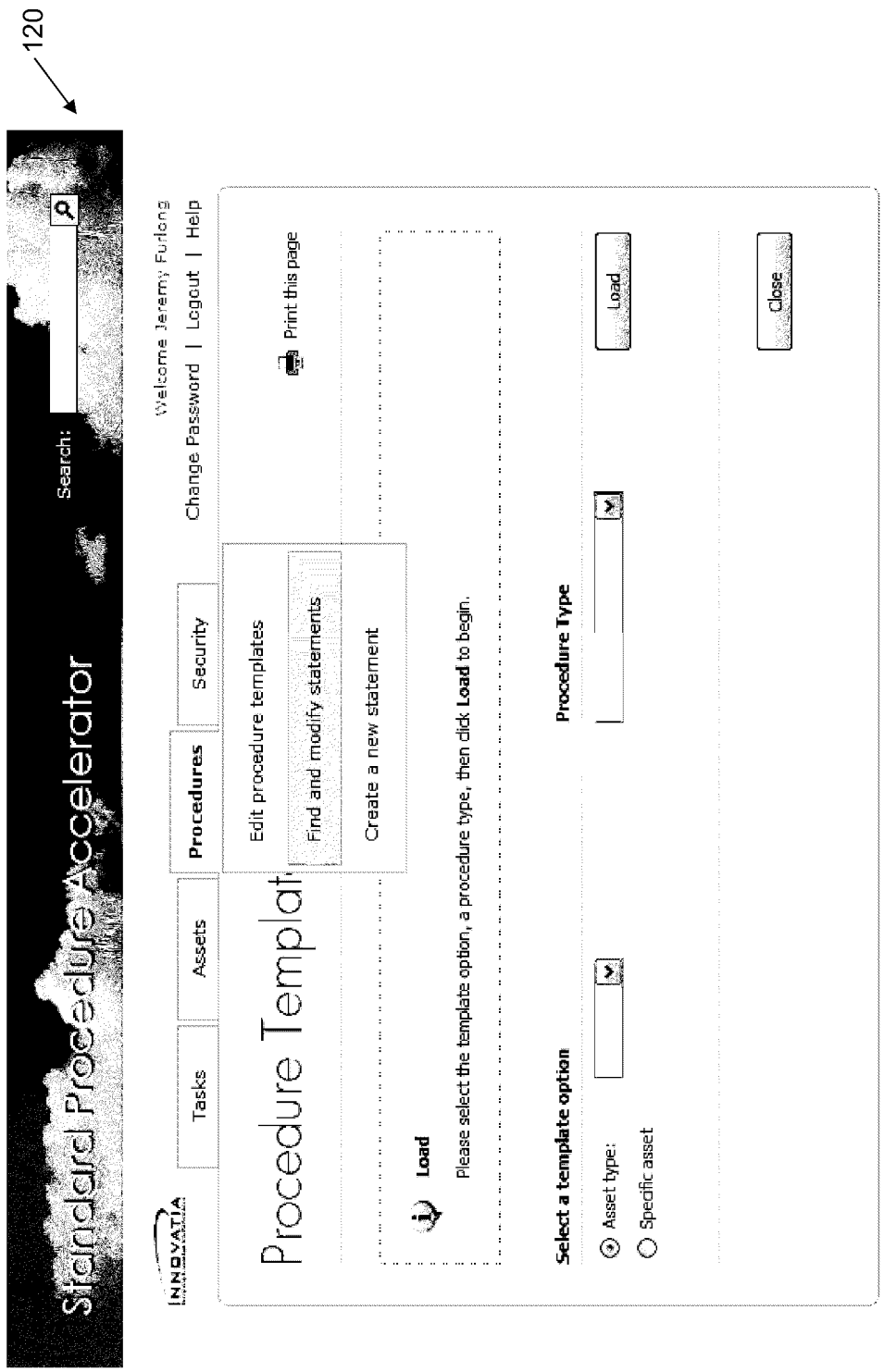
FIG. 36 is another screenshot of a user interface of a system, according to a preferred embodiment of the present invention.
Figure 37:
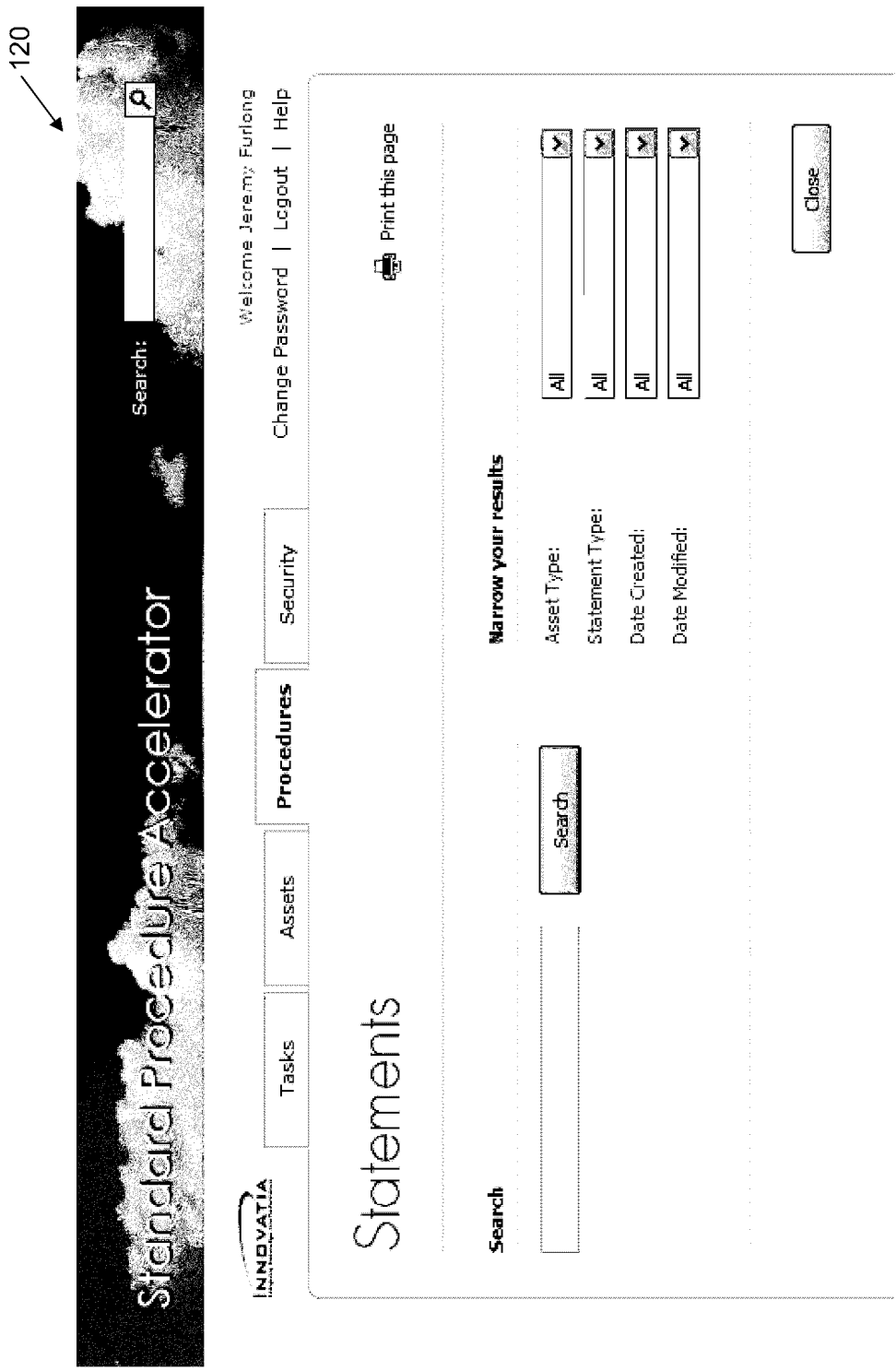
FIG. 37 is another screenshot of a user interface of a system, according to a preferred embodiment of the present invention.
Figure 38:
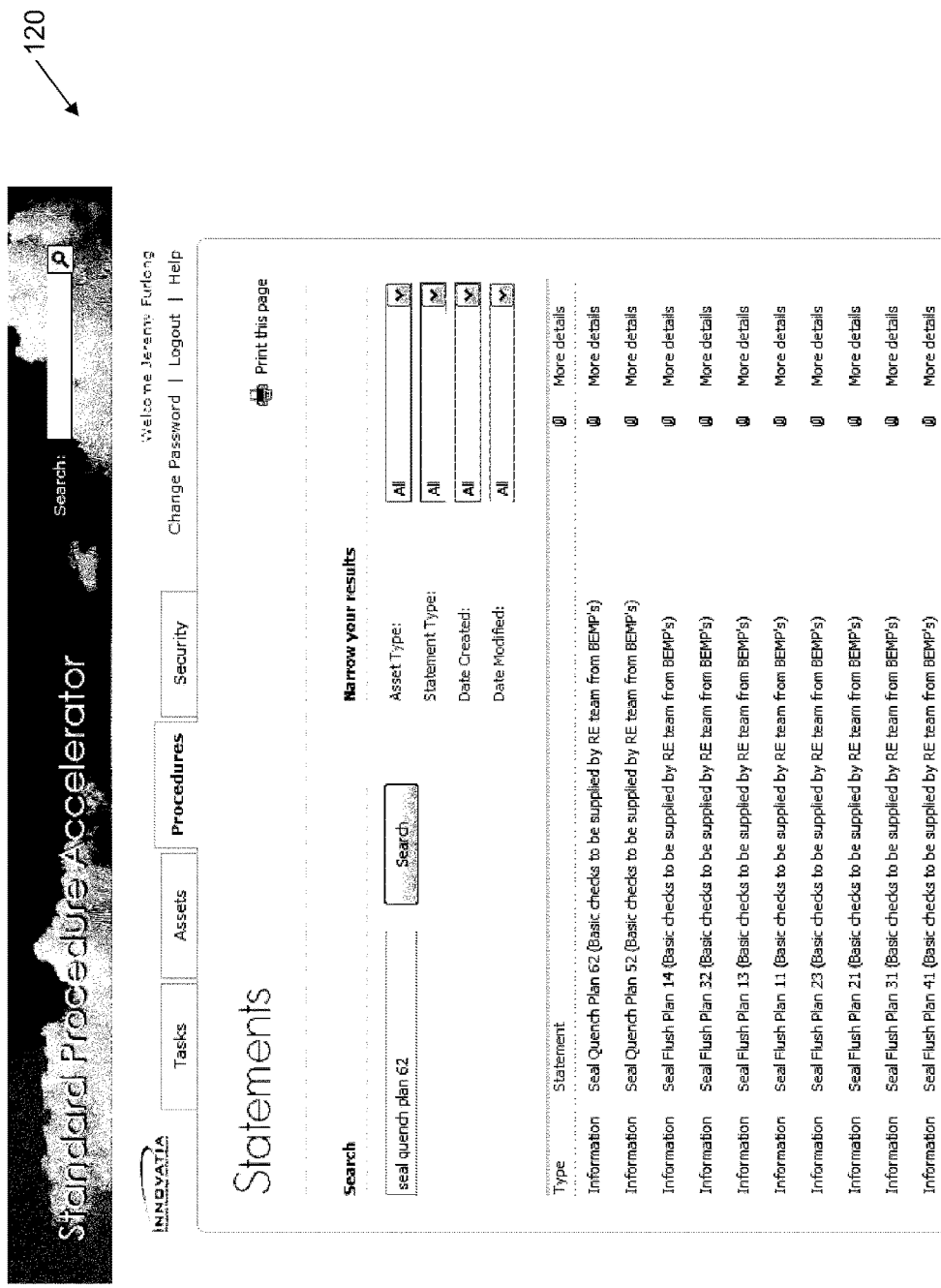
FIG. 38 is another screenshot of a user interface of a system, according to a preferred embodiment of the present invention.
Figure 40:
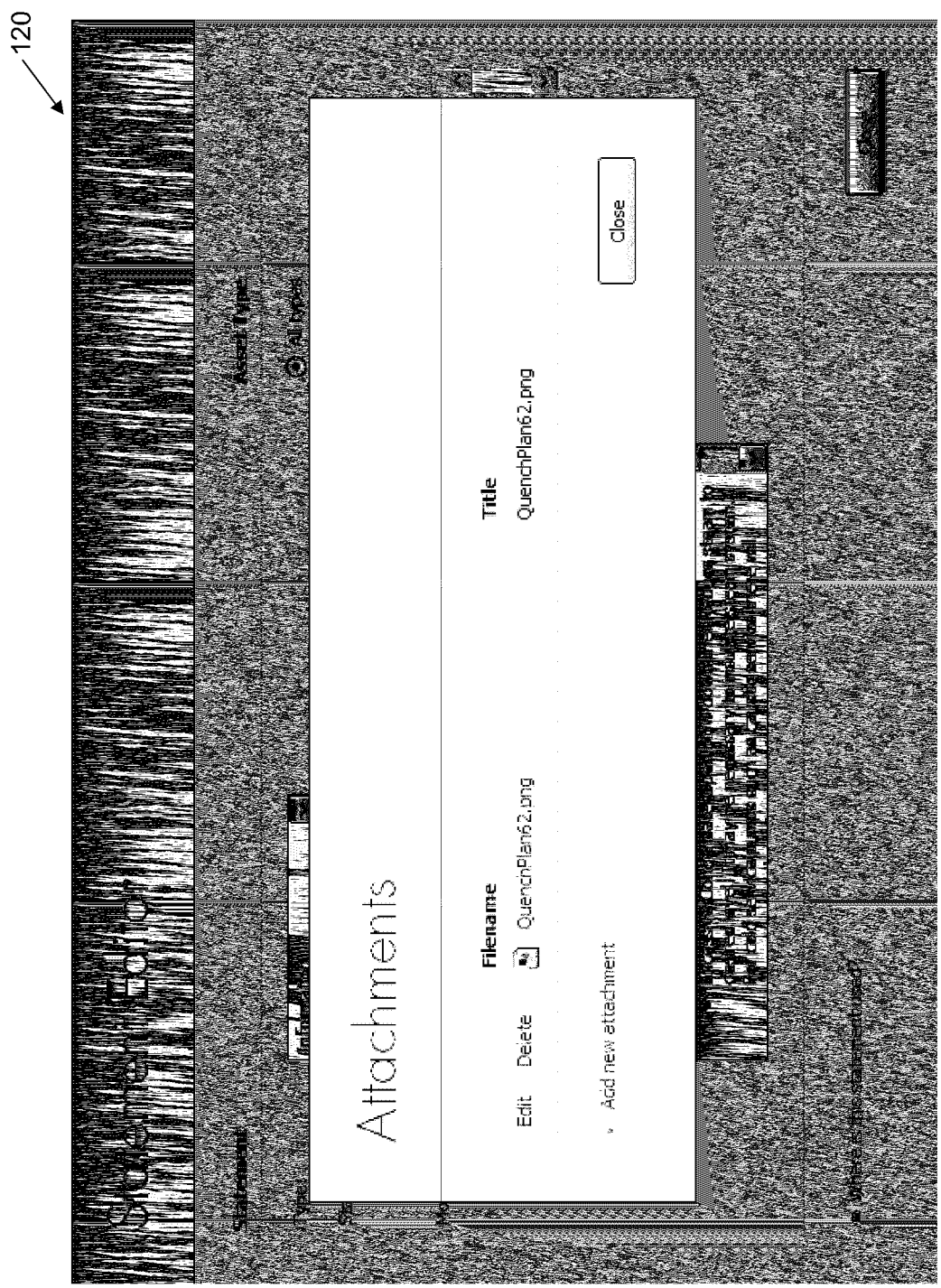
FIG. 40 is another screenshot of a user interface of a system, according to a preferred embodiment of the present invention.
Figure 41:
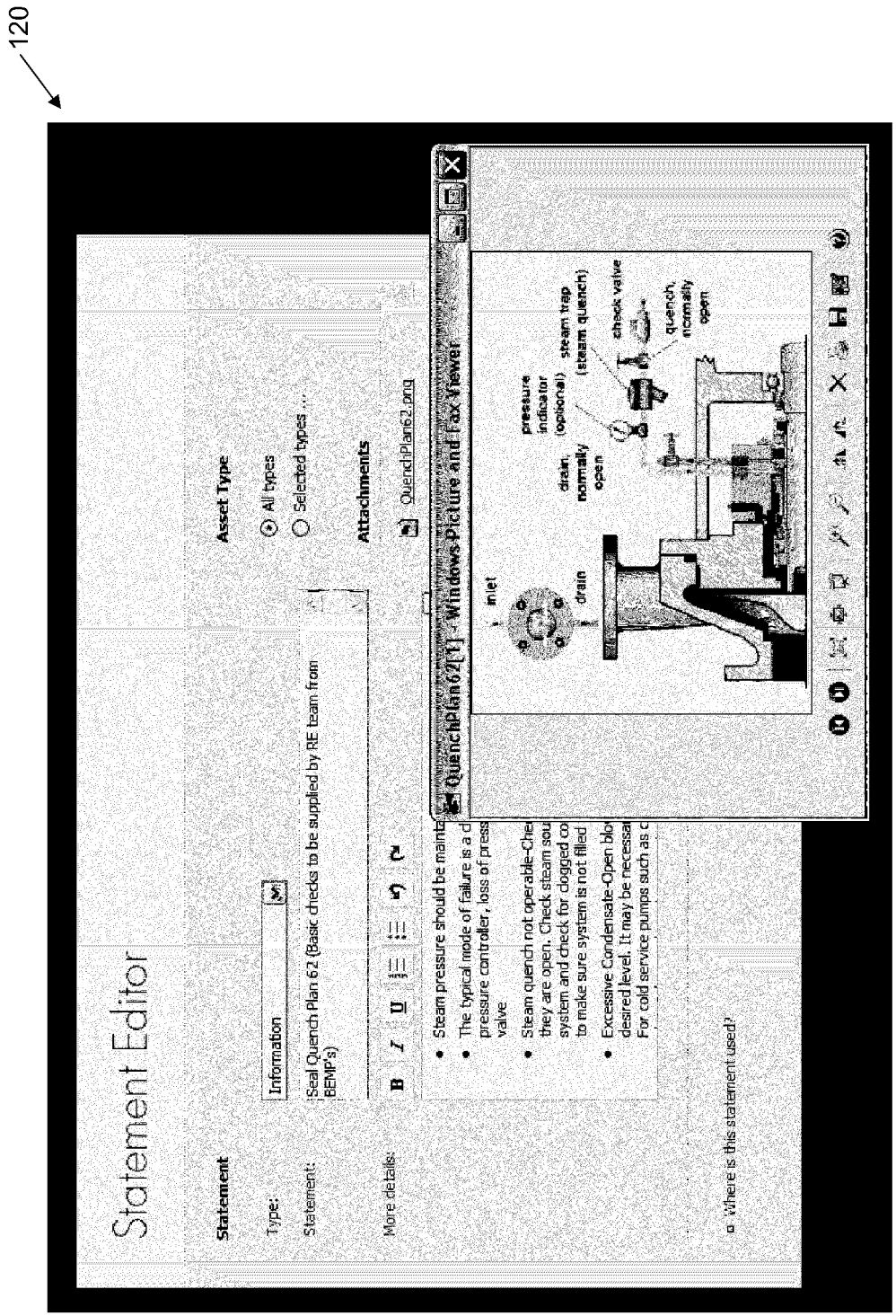
FIG. 41 is another screenshot of a user interface of a system, according to a preferred embodiment of the present invention.
Figure 42:
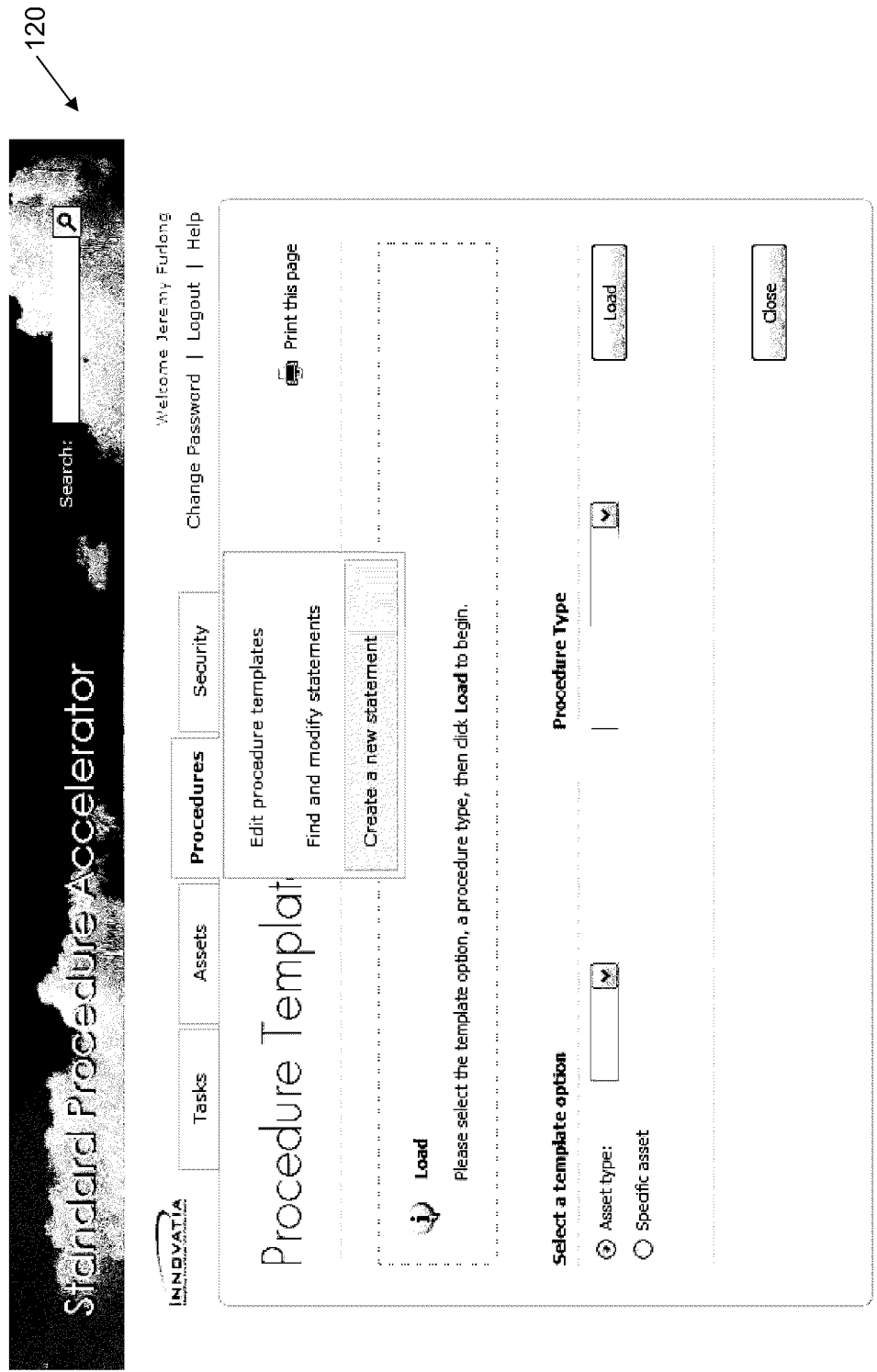
FIG. 42 is another screenshot of a user interface of a system, according to a preferred embodiment of the present invention.
Figure 44:
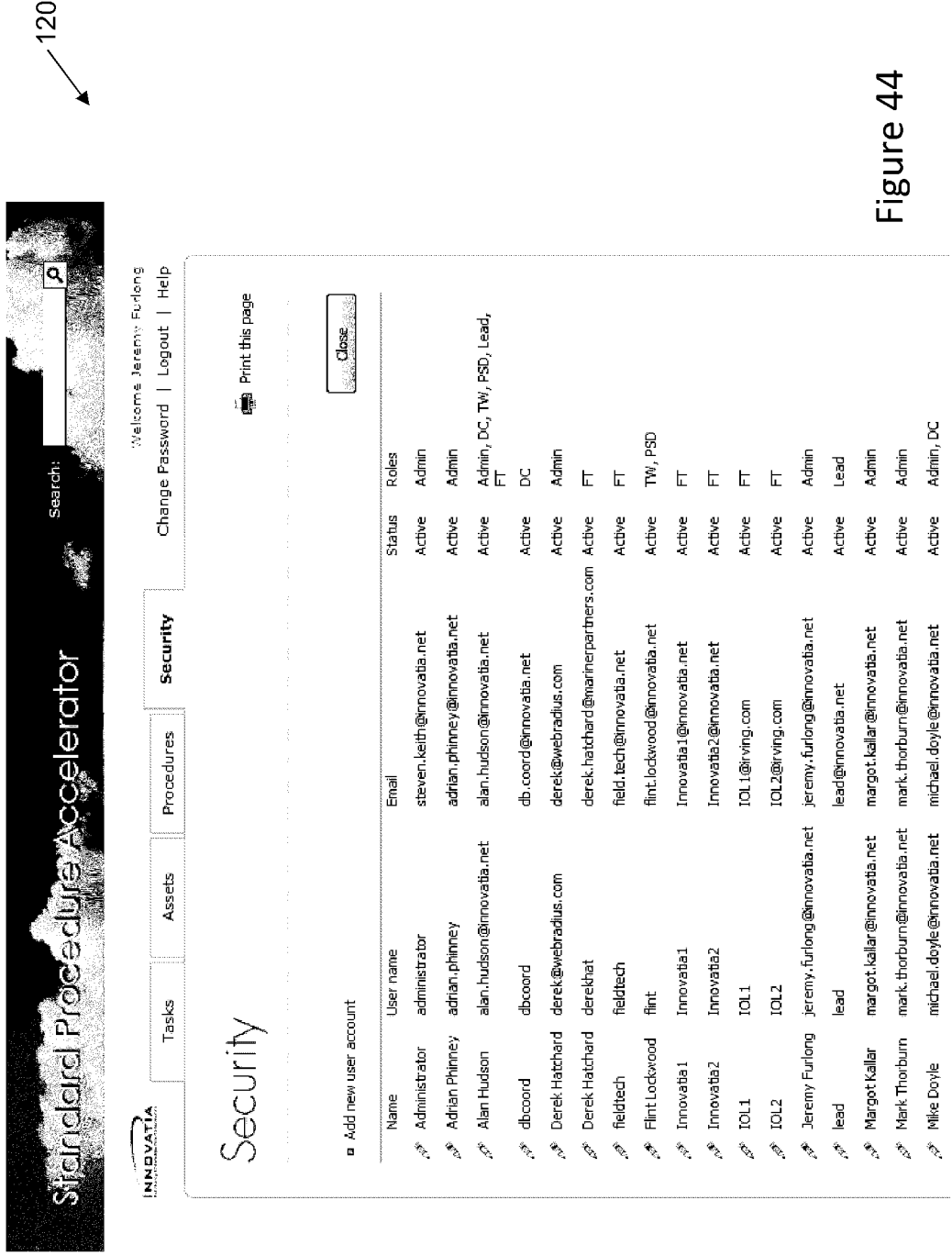
FIG. 44 is another screenshot of a user interface of a system, according to a preferred embodiment of the present invention.

Thus, according to a preferred embodiment of the present invention, with reference to FIGS. 1 and 32 the method comprises: presenting 520, on the user interface 120, the procedure statements $420_X$ being referenced by the published asset-specific-procedure instance and an input element 3210, such as a check box, for at least one of the presented procedure statements $420_X$; receiving an input from a user, via said input element 3210, to indicate that a procedure step related to the corresponding procedure statement $420_X$ has been completed; storing in the main storage 110 corresponding completion information with respect to the asset-specific-procedure instance.

Preferably, some of the above-steps may be performed offline, in an external handheld device 116 which is uncoupled from the system 100. Preferably, the external handheld device 116 can be recoupled with the system 100, in order to synchronize the main storage 110 therewith. This feature will be better explained further below.

2. AOP Development/Administration

AOP Development/Administration is for the database coordinator, the process statement developers, technical writers and anyone involved in the Proofread and/or Agreement processes.

According to a preferred embodiment, the following steps are carried out:

Users login on a Login page on the desktop. They sign in with an account in one or more of the following roles: Administrator, Editor, Approver, Reviewer, and Asset Profiler.

The 'Administrator' role is attributed with functions and features as follows:
  The Administrator is able to see all AOPs along with AOP status and AOP task assignments.
  The Administrator is be able to assign AOPs to users for the following tasks: Comment, Edit, and Approval. The DC also set due dates for completing tasks.
  The Administrator is able to publish AOPs.
  The Administrator is able to move published AOPs back into Draft status.
  The Administrator is able to see the tasks assigned to users.
  The Administrator is be able to open an AOP in the AOP Viewer.
  The Administrator is able to create new assets in the system.
  The Administrator is able view AOP completion history.

The 'Editor' role is attributed with functions and features as follows:
  An Editor is able to see his/her AOP task assignments (including due date).
  An Editor is able to open an AOP in the AOP Viewer to review comments from other users.
  An Editor is able to edit the AOP and Standard Statements as needed.
  An Editor is able to submit a revised AOP, which increments the version number of the AOP
  An Editor is able to mark a task assignment as complete, which reassigns it to the Administrator for further processing.

The 'Approver' role is attributed with functions and features as follows:
  An Approver is able to see his/her task assignments (including due date).
  An Approver is able to open an AOP in the AOP Viewer.
  An Approver is able Approve or Reject the AOP.
  An Approver is able to provide comments when rejecting an AOP.
  An Approver is able to mark an AOP as approved or rejected.
  An Approver is able to mark a task assignment as complete, which reassigns it to the Administrator for further processing.

The 'Reviewer' role is attributed with functions and features as follows:
  A Reviewer is able to see his/her task assignments (including due date).
  A Reviewer is able to open an AOP in the AOP Viewer and provide his/her comments to the AOP or indicate that he/she has no comment.
  A Reviewer is able to save his/her comments (work in progress) and resume commenting at a later time.
  A Reviewer is able to submit his/her comments back on an AOP.
  A Reviewer is able to mark a task assignment as complete, which reassigns it to the Administrator for further processing.

The 'Asset Profiler' role is attributed with functions and features as follows:
  An Asset Profiler is able to add new assets.
  An Asset Profiler is able to modify the attributes of existing assets.

Figure 29:
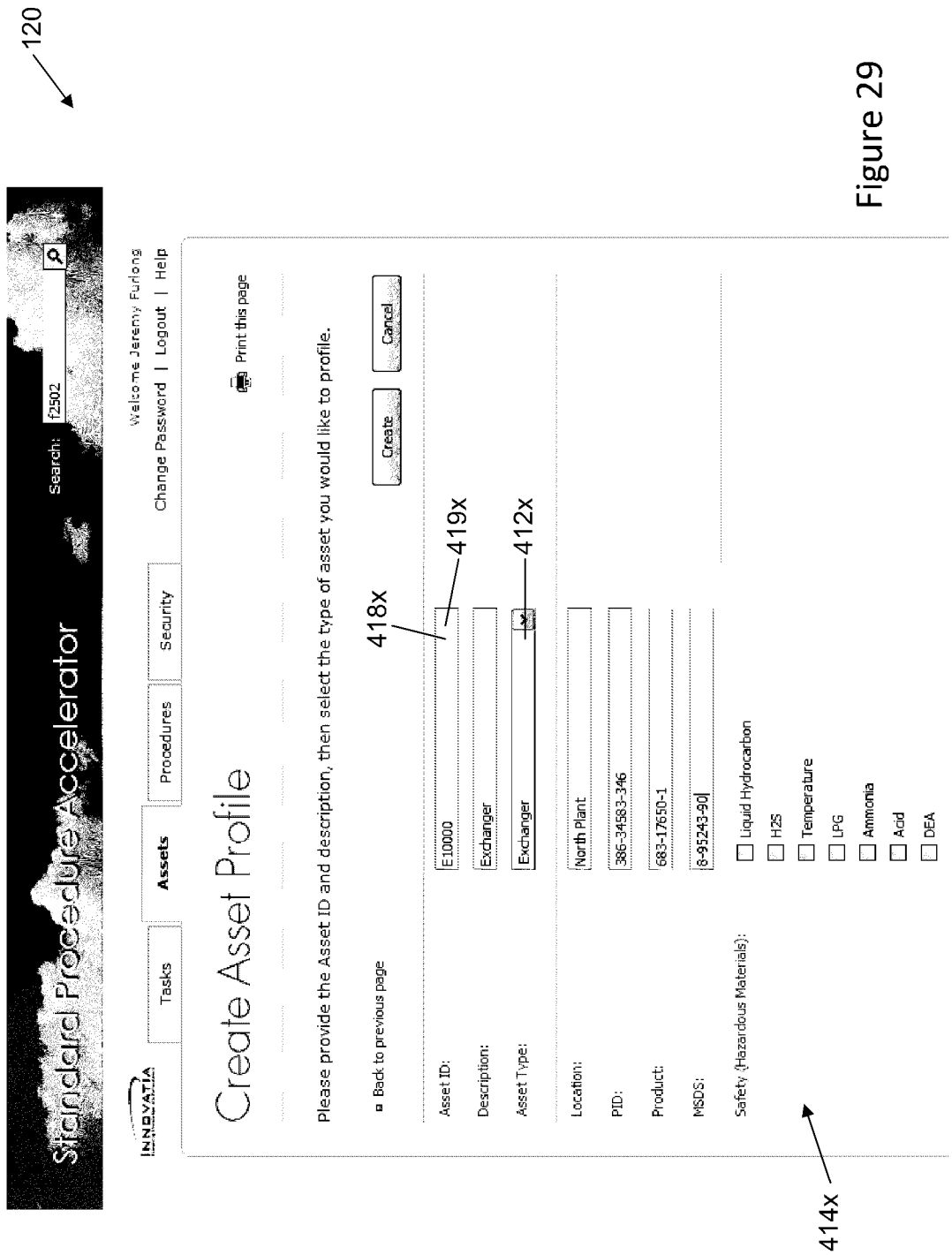
FIG. 29 is another screenshot of a user interface of a system, according to a preferred embodiment of the present invention.
Figure 30:
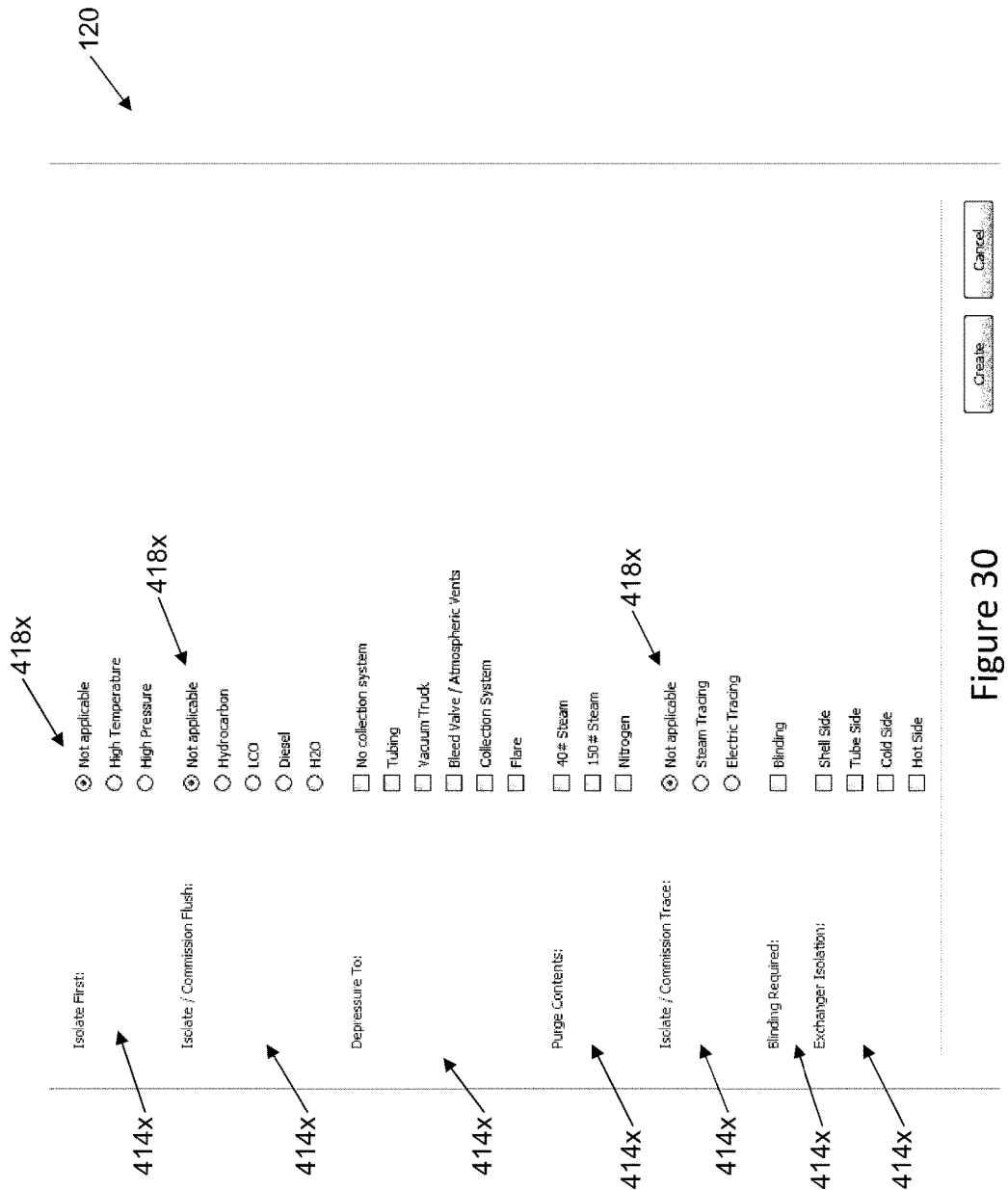
FIG. 30 is another screenshot of a user interface of a system, according to a preferred embodiment of the present invention.
Figure 31:
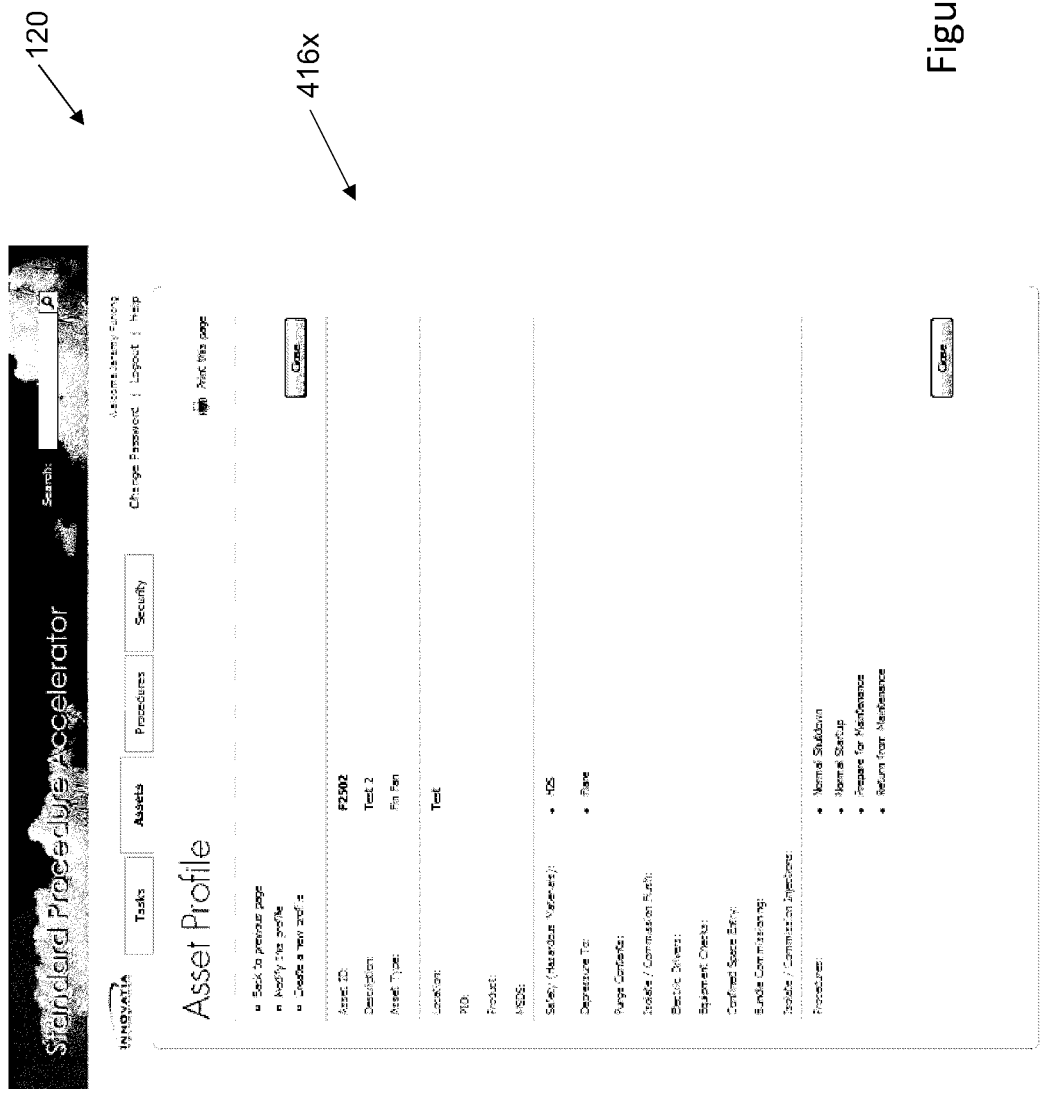
FIG. 31 is another screenshot of a user interface of a system, according to a preferred embodiment of the present invention.

Indeed, with reference to FIG. 1, as well as to FIGS. 28-31, step (a) of the afore-mentioned method comprises: presenting 512 on the user interface 120, a first input component 2810 for receiving an asset identifier and a second input component 2814 presenting a list of said library of asset types 412 for receiving a selected asset type $412_X$ therefrom (other input component(s) 2812 may be presented); upon receiving the asset identifier $419_X$ and the selected asset type $412_X$, presenting 512 on the user interface 120, another input component for each attribute $414_X$ of the selected asset type for receiving respective attribute-values $418_X$; as better illustrated in FIGS. 29 and 30; and upon receiving the attribute-values, storing at 513 in the main storage 110 the asset identifier $419_X$ and associated attribute-values $418_X$, as a new asset instance $416_X$.

As can be seen, an example of an attribute-value may be "not applicable".

Figure 14:
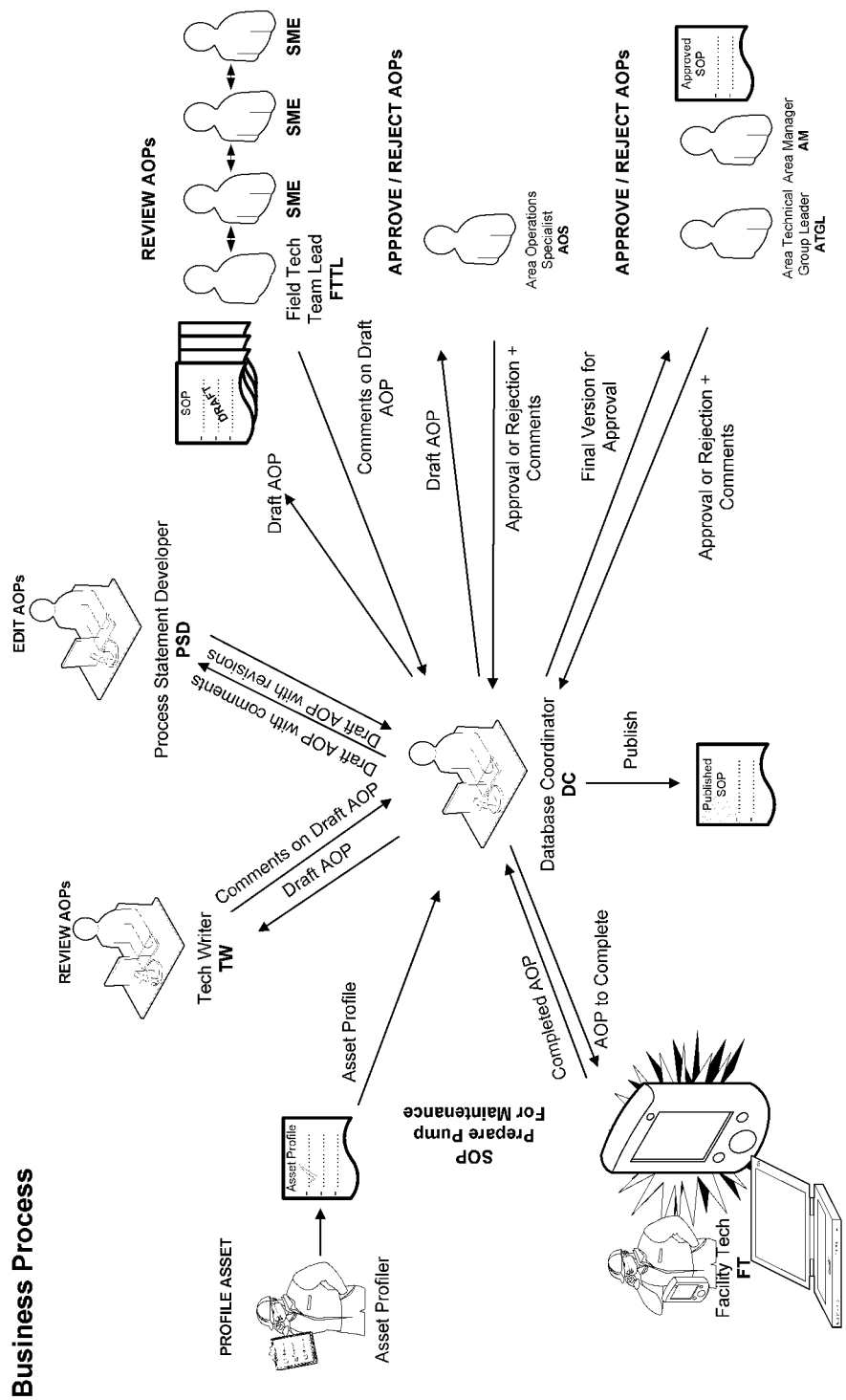
FIG. 14 is a diagram showing phases of the life cycle of an asset specific procedure, according to a preferred embodiment.

FIG. 14 depicts the two phases in the life cycle of an AOP, according to a preferred embodiment, namely development and completion.

The database coordinator is the centre of activity in the development phase and, to a lesser extent, the completion phase. The development phase includes profiling assets, editing procedures, reviewing procedures (commenting), and approving/rejecting procedures. Once the AOP is approved, it is ready for publishing. Publishing means that the asset-specific-procedure instance is permanently stored in the main storage, as a published asset-specific-procedure instance.

The completion phase includes the use of approved AOPs in the field and the capture of the results in the solution.

Figure 15:
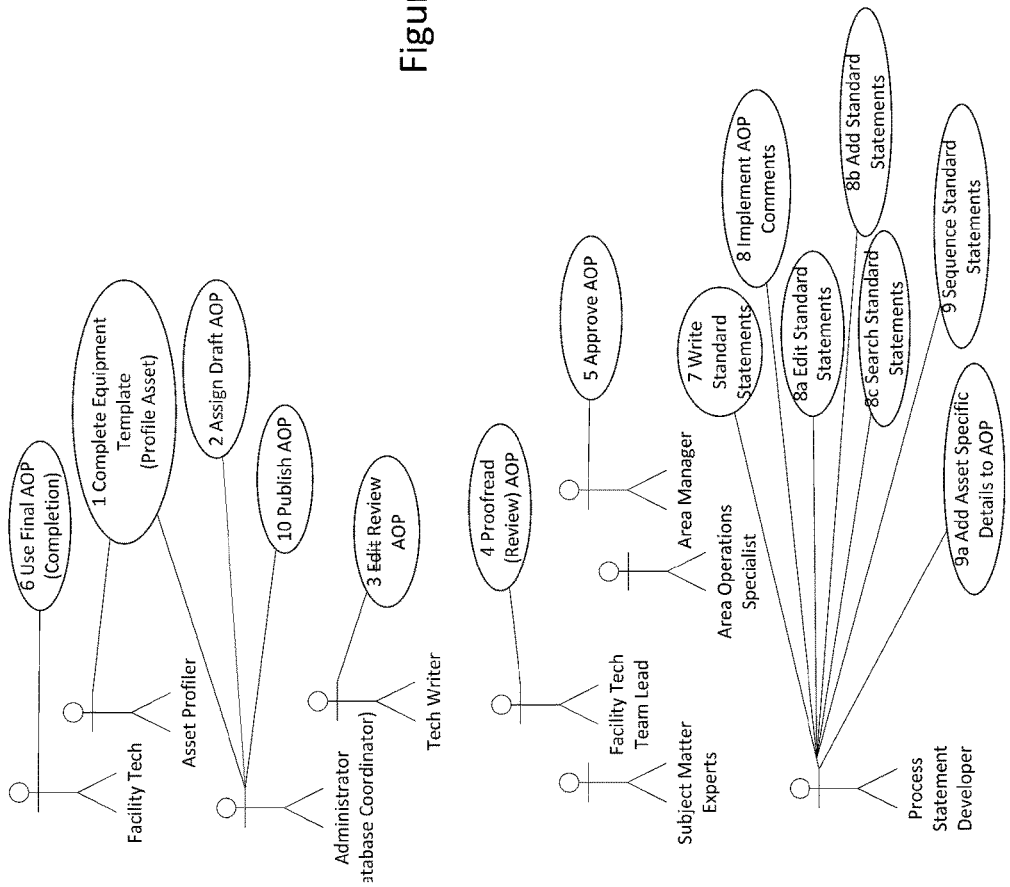
FIG. 15 is a use case diagram of a system, according to a preferred embodiment of the present invention.

FIG. 15 depicts the use cases that address the system, according to a preferred embodiment of the present invention. The use cases are summarized in the table below:

| ID | Name | Phase | Actors | Description |
|---|---|---|---|---|
| 1 | Complete Equipment Template | Development | FT DC | Select and complete an asset profile form by collecting information about a specific asset. |
| 2 | Assign Draft AOP | Development | DC | Assign a draft AOP to TW, FTTL, SME, AOS or AM for review (comments) or editing |
| 3 | Review AOP | Development | TW | Review system-generated AOP and identify required changes. Check to see if changes can be accomplished by modifying the associated Asset Profile or the Standard Statements/attribute (modify the AOP manually should be a last resort). Add recommended changes as comments to AOP. |
| 4 | Proofread (review) AOP | Development | FTTL SME | Proofread a draft AOP and provide comments. |
| 5 | Approve AOP | Development | AOS AM | Review an AOP and approve or reject it for use. |
| 6 | Use final AOP | Completion | FT | Complete an approved AOP in the field. |
| 7 | Write Standard Statements | Development | PSD | The writing of new standard statements and tagging them with attributes. |
| 8 | Implement AOP Comments | Development | PSD | Make changes to AOP based on comments from reviewers |
| 8a | Edit Standard Statements | Development | PSD | Editing Standard Statements. |
| 8b | Add Standard Statements | Development | PSD | Adding Standard Statements to an AOP. |
| 8c | Search Standard Statements | Development | PSD | Searching for Standard Statements. |
| 9 | Sequencing SS | Development | PSD | Sequencing of Standard Statements in AOP. |
| 9a | Add asset specific details to AOP | Development | PSD | Adding Details to AOP. |
| 10 | Publish AOP | Development | DC | AOP published (approved) for use in the field. |

Figure 16:
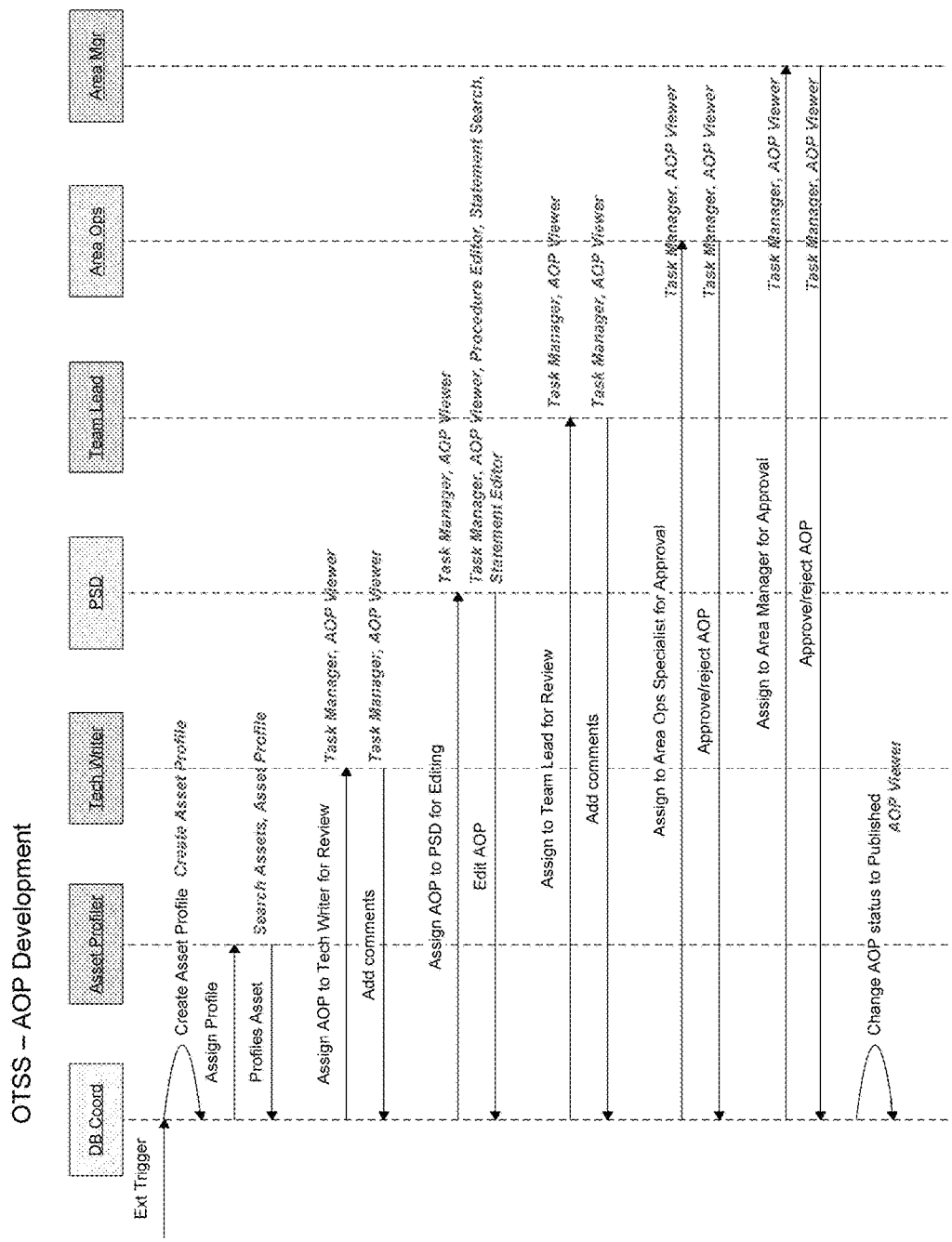
FIG. 16A is a workflow diagram showing steps of a method, according to a preferred embodiment of the present invention.
FIG. 16B is a workflow diagram showing steps of a method, according to a preferred embodiment of the present invention.

FIG. 16A is a sequence diagram which illustrates the AOP Development workflow between the actors involved. Starting at the top left, moving top-down and left-to-right, the workflow shows the first to last steps for the development of AOP's.

Each arrow shows the direction of the work, the specific task, who does the task and who receives the result of that task. The SPA pages used by the actors to do each task appear in italics.

Following are the steps illustrated in the Workflow diagram:
1. An external trigger prompts the Database Coordinator to create an asset profile.
2. The DC manually requests an Asset Profiler to complete the asset profile.
3. The DC assigns an AOP to a Tech Writer for review. The TW comments on the AOP and assigns it back to the DC.
4. The DC assigns the AOP to the Process Statement Developer for editing, if necessary. The PSD edits the AOP and/or standard statements as required and reassigns it to the DC.
5. The DC assigns the AOP to a Team Lead for proofreading. The TL proof-reads the AOP, adds comments, and reassigns it to the DC.
6. The DC reviews the comments and may assign the AOP back to the TW for review (step 4). Or the DC assigns the AOP to the Area Operations Specialist for approval.

The AOS reviews the AOP and approves or rejects it (and optionally adds comments). The AOP is then reassigned to the DC.
7. The DC reviews the comments and may assign the AOP back to the TW for review (step 4). Or the DC assigns the AOP to the Area Manager for approval. The AM reviews the AOP and approves or rejects it (and optionally adds comments). The AOP is then reassigned to the DC.
8. The DC reviews the comments and assigns the AOP back to the TW for review (step 4). Or the DC changes the status from Draft to Published.

Figure 16B:
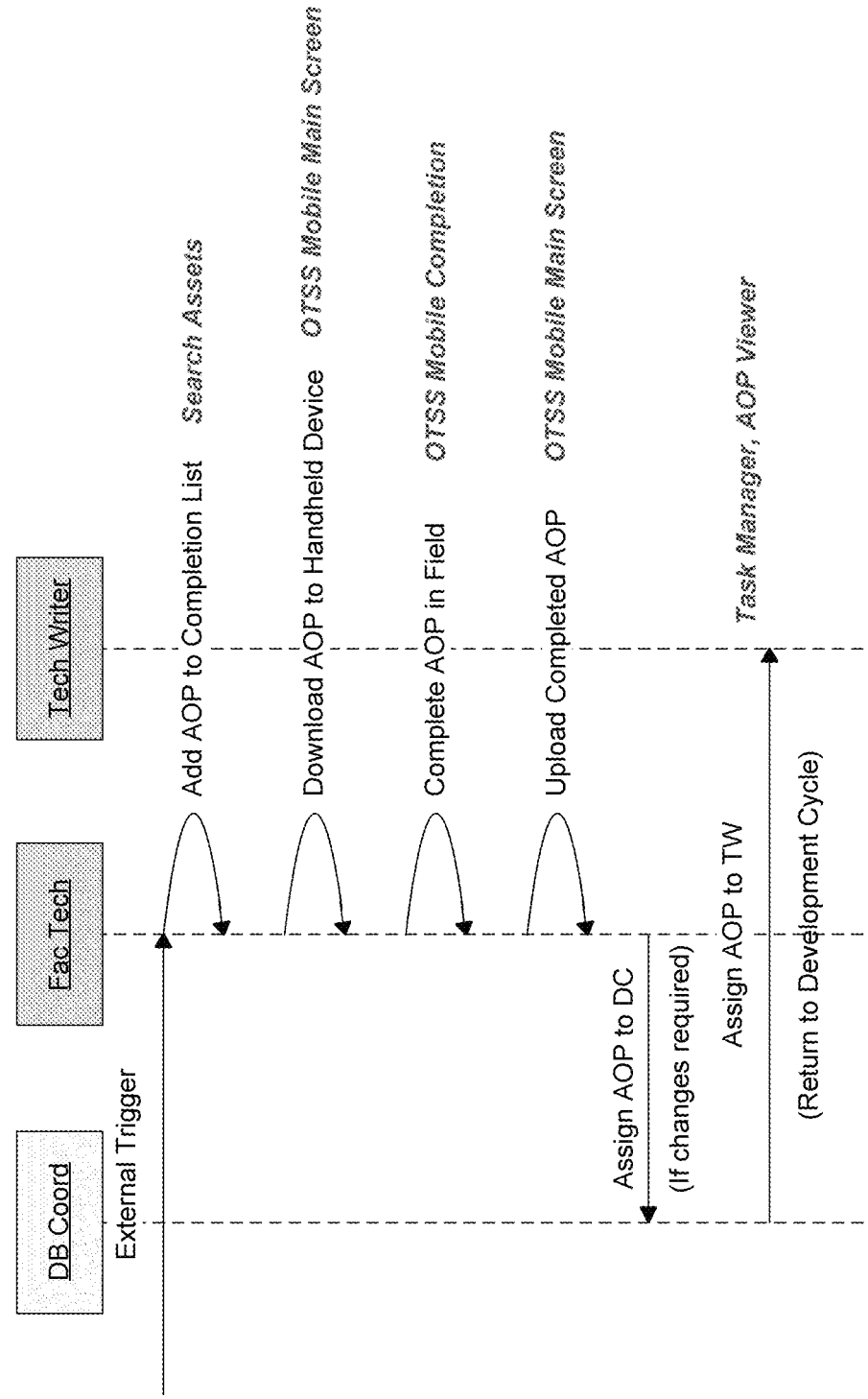

FIG. 16B is a sequence diagram which illustrates the AOP Completion workflow between the actors involved. Starting at the top left, the workflow shows the steps for the completion of AOPs.

Following are the steps illustrated in the Workflow diagram:

1. An external trigger issues a request to a Facility Technician to complete an AOP for a specific asset. The asset identification number, at a minimum, is provided with the request.
2. The FT searches for the AOP on the AOP Search page and opens the proper procedure in the AOP Viewer. The FT then adds the AOP to his/her Completion List.
3. The FT downloads a copy of the AOPs in his/her Completion List to a handheld device.
4. The FT completes the AOP in the field, recording the results on the handheld device.
5. The FT uploads the completion results. The AOP Completion is either closed or assigned to the DC depending on whether the FT added comments to the completion results.
6. The DC assigns the AOP to a technical writer for review or the PSD for editing if necessary. The workflow moves to one of the Assign steps in the AOP Development Workflow.

Figure 17:
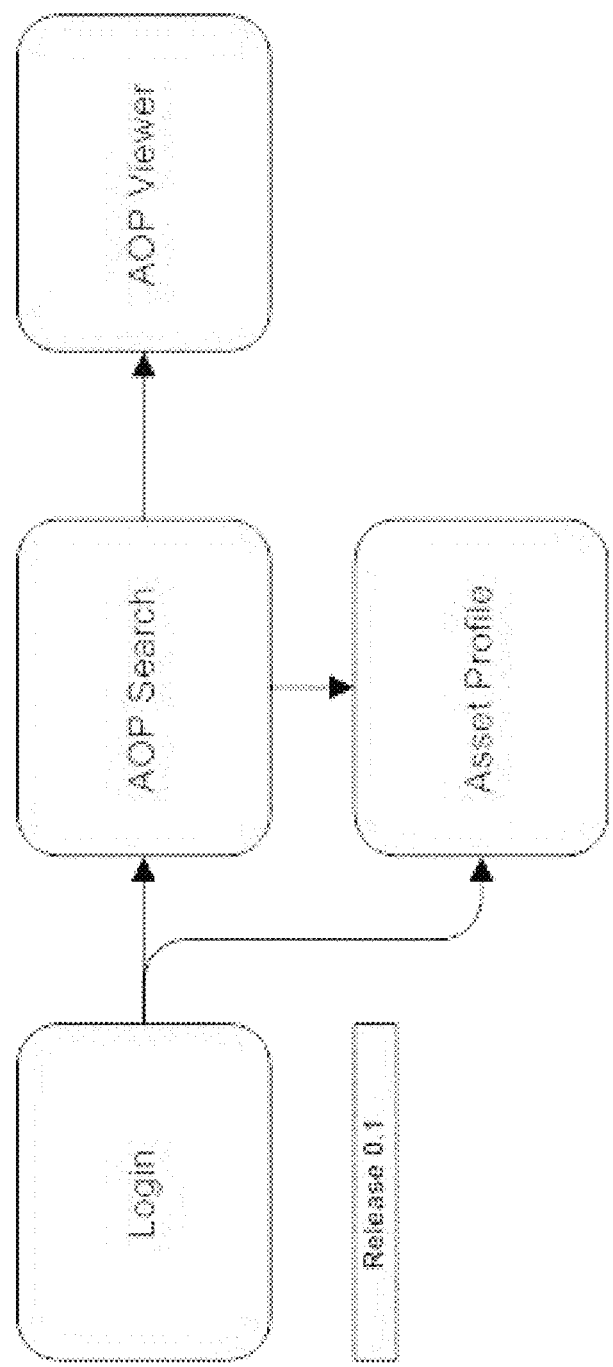
FIG. 17 is a block diagram showing steps of a method, according to a preferred embodiment of the present invention.

An embodiment of the present invention is shown in FIG. 17. According to this embodiment, all users have the ability to login to and logout from the application.

Security mechanisms are put in place to control authentication and authorization to certain screens and behaviours.

Database Coordinators are able to look for and print out an asset profile sheet for use in the field by the Facility Technician and to save the results of that field work.

Facility Technicians are able to search for an AOP by asset identifier and print out the AOP for use in the field.

The following features are provided:
1. Login page that accepts a unique username and password. Invalid usernames and/or passwords prevent access to the other screens in the solution. When access to any screen is attempted and a user session has not been established, the user is redirected to the Login page. Login includes handling of expired passwords.
2. AOP Search page that allows the users to search for AOP's by its unique asset identifier. Wild card searches are permitted. There are links from this page to the Asset Profile and AOP Viewer pages.
3. Asset Profile Definition page that allows the DC to maintain unique asset profiles. It has a print capability enabling the facility technician to profile the asset in the field and then manually update the form.
4. AOP Viewer page that allows the facility technician to view and print out the AOP for completion in the field.

Figure 18:
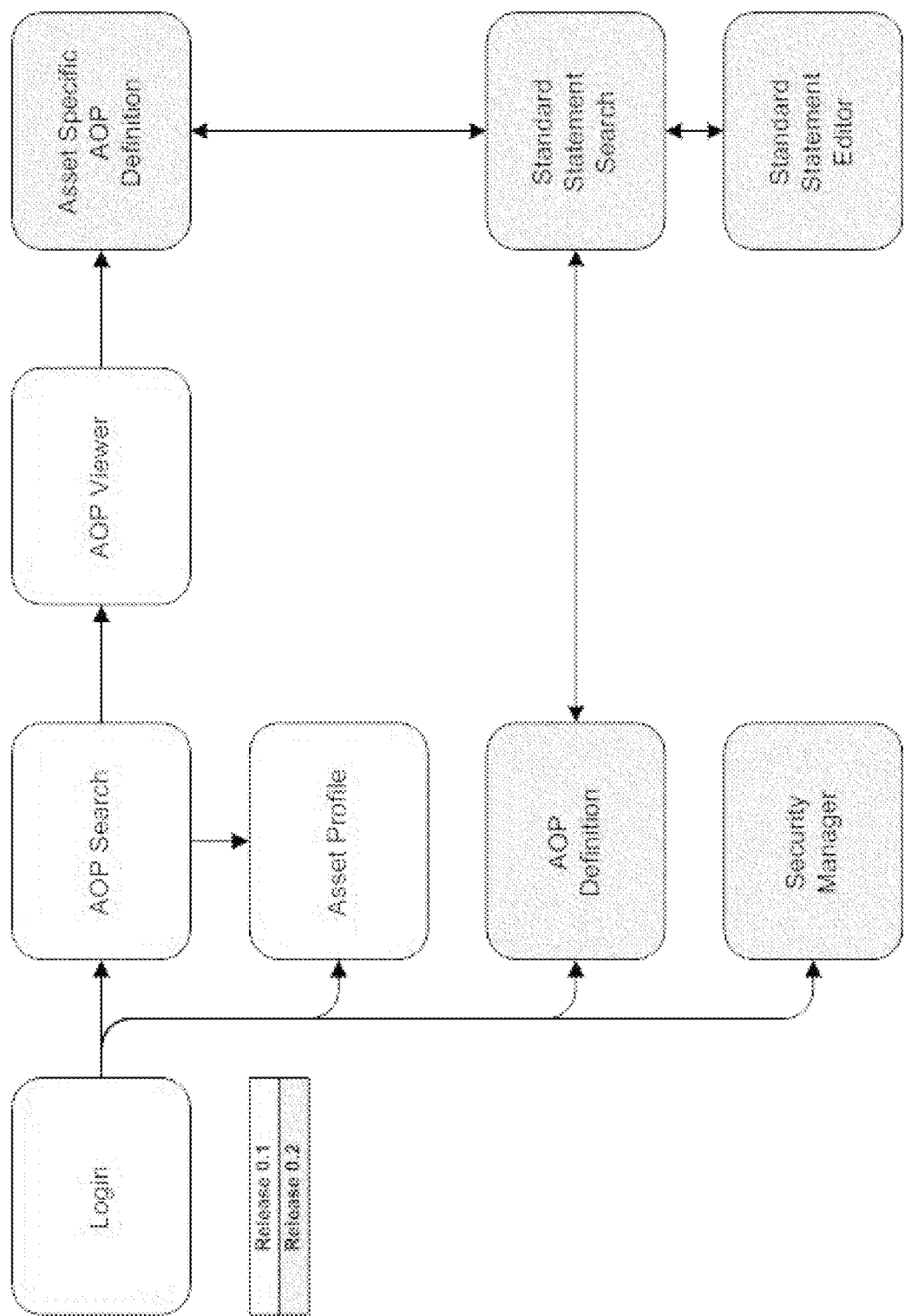
FIG. 18 is a block diagram showing steps of a method, according to a preferred embodiment of the present invention.

Another embodiment of the present invention is shown in FIG. 18. According to this embodiment, standard statement viewing and editing capability is added to the previous embodiment. This additional functionality is shown below. The PSD is able to edit standard statements and associate the statements to AOP's by using a drag & drop with the AOP definition page.

Asset specific AOP's may be created using an extension to the AOP Definition page where standard statements are tied to AOP's that are unique to an asset, as opposed to an asset type.

The security manager is included giving the DC the ability to add & remove users, to assign a role to a user and to assign start-up pages to the role.

The following additional features are provided:
1. Standard statement search page that uses a keyword search to locate statements using the keyword. The search scope may be filtered by asset type and process name. There are links to the standard statement editor from this page.
2. Standard Statement Editor page that allows standard statements to be added or modified, view a cross-reference of where the standard statement is used and view a list of attachments.
3. AOP Definition page that shows the AOP for each asset type and procedure. Standard statements are inserted into this page to build the AOP. Statements may be added and removed from this page, but not modified. Attribute values may be assigned to each standard statement. Processes within the AOP may be added, removed and changed.
4. Asset Specific AOP Definition page that behaves similarly to the AOP Definition page, except that this AOP is tied to a specific asset identifier, not an asset type. Attributes are not modified on this page as attributes are already asset specific.
5. Security Manager page that allows users to be added & removed, passwords to be reset, roles to be assigned and start-up pages to be assigned.

Figure 19:
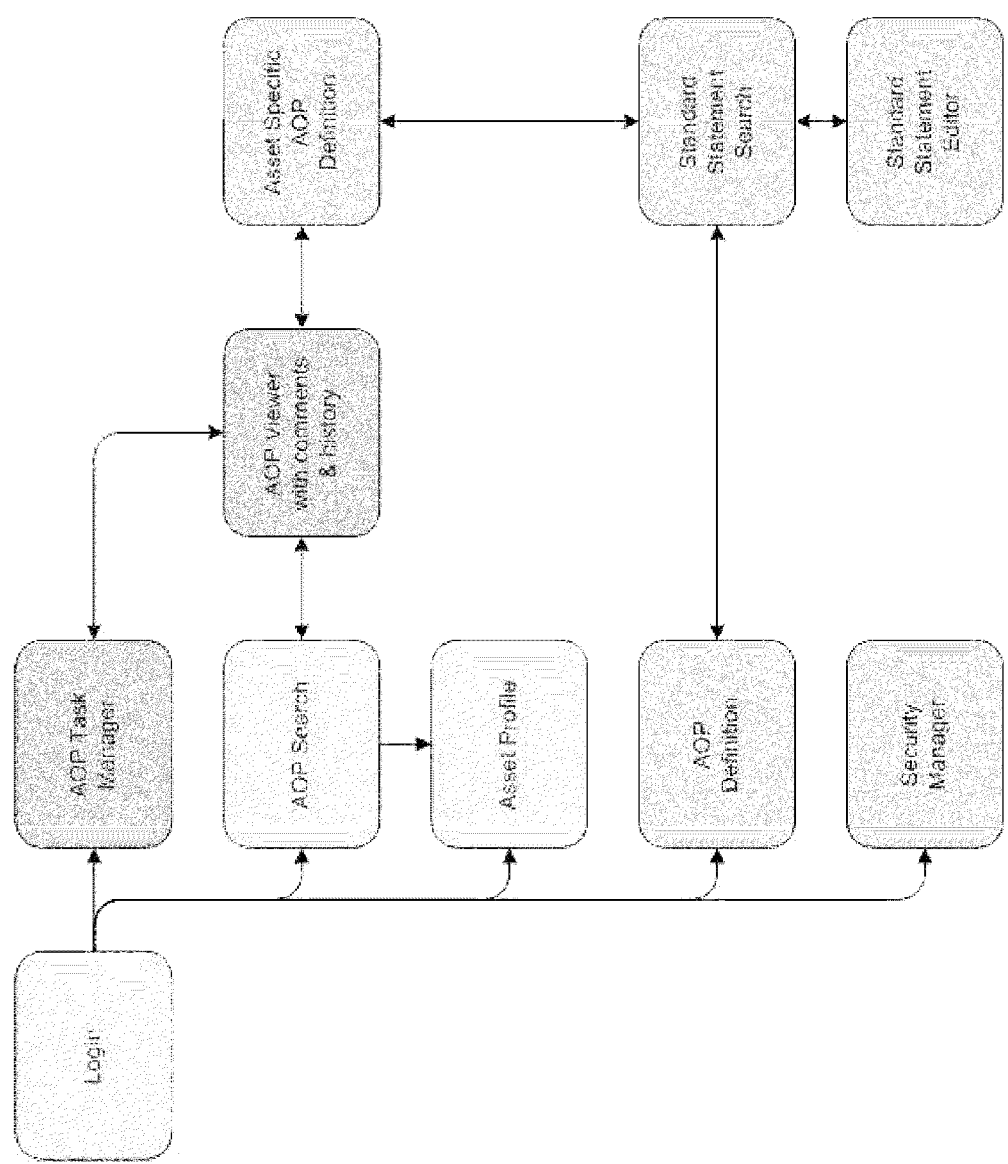
FIG. 19 is a block diagram showing steps of a method, according to a preferred embodiment of the present invention.

Another embodiment of the present invention is shown in FIG. 19. According to this embodiment, the AOP Viewer includes an AOP history section and a comment viewer & editor. Also included is the AOP Task Manager that allows the DC to assign tasks to other users.

The following additional features are provided:
1. Enhanced AOP Viewer page with ability to scroll through the AOP history by event and view the AOP and its comments that was current at the time of the event. The latest event is the current assignment and comments may be added or edited during this event.
2. AOP task manager page that enables the DC to assign AOPs to others. This page is the primary centre of activity for all users except the facility technician. All work is driven from this page.

Figure 20:
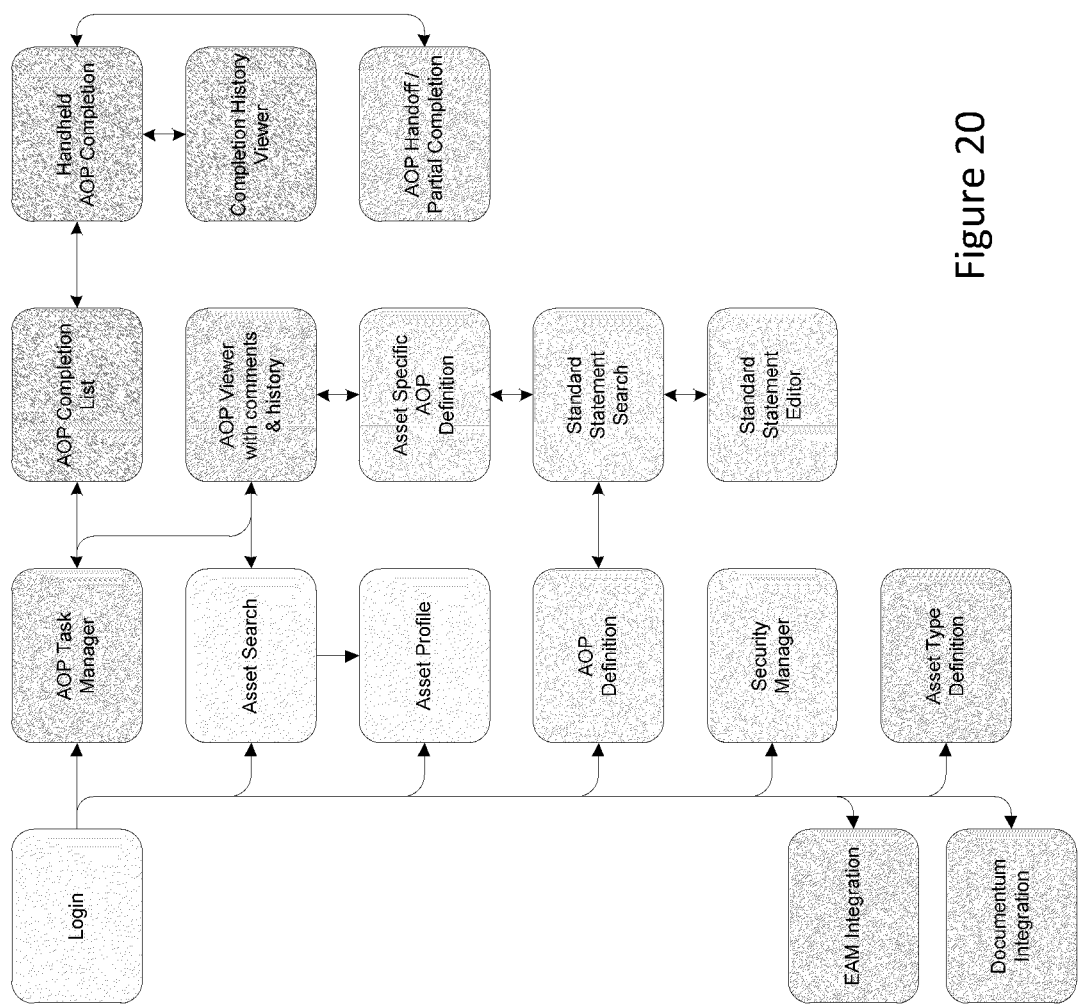
FIG. 20 is a block diagram showing steps of a method, according to a preferred embodiment of the present invention.

Another embodiment of the present invention is shown in FIG. 20. According to this embodiment, the AOP Completion List, download to handheld device, and completion update is included in the solution. This additional functionality is described below.

The following additional features are provided:
1. AOP Completion List. Using the AOP Viewer, the FT adds procedures to his/her Completion List.
2. Handheld Completion. The FT connects a handheld device to download the Completion List. Once completion is finished, the device is reconnected so it may upload the results of the completion to the server.
3. Completion History Viewer. Administrators (database coordinators) may list and view the details of completed AOPs.
4. Future Release: Asset Type Definition would enable an Administrator to maintain the asset type definitions, where the attributes and properties associated with asset types are defined. This page is not mandated by the release 0.4 requirements. However, it would be very useful for the maintenance of asset types in the future.
5. Future Release: EAM integration would allow asset profile information and open work orders for assets to be regularly imported into SPA from the Enterprise Asset Management.
6. Future Release: Documentum integration would link SPA users to documents related to assets.
7. Future Release: AOP handoff/partial completion would allow an FT user to complete part of an AOP and then handoff the procedure to another FT user to finish completion.

Figure 21:
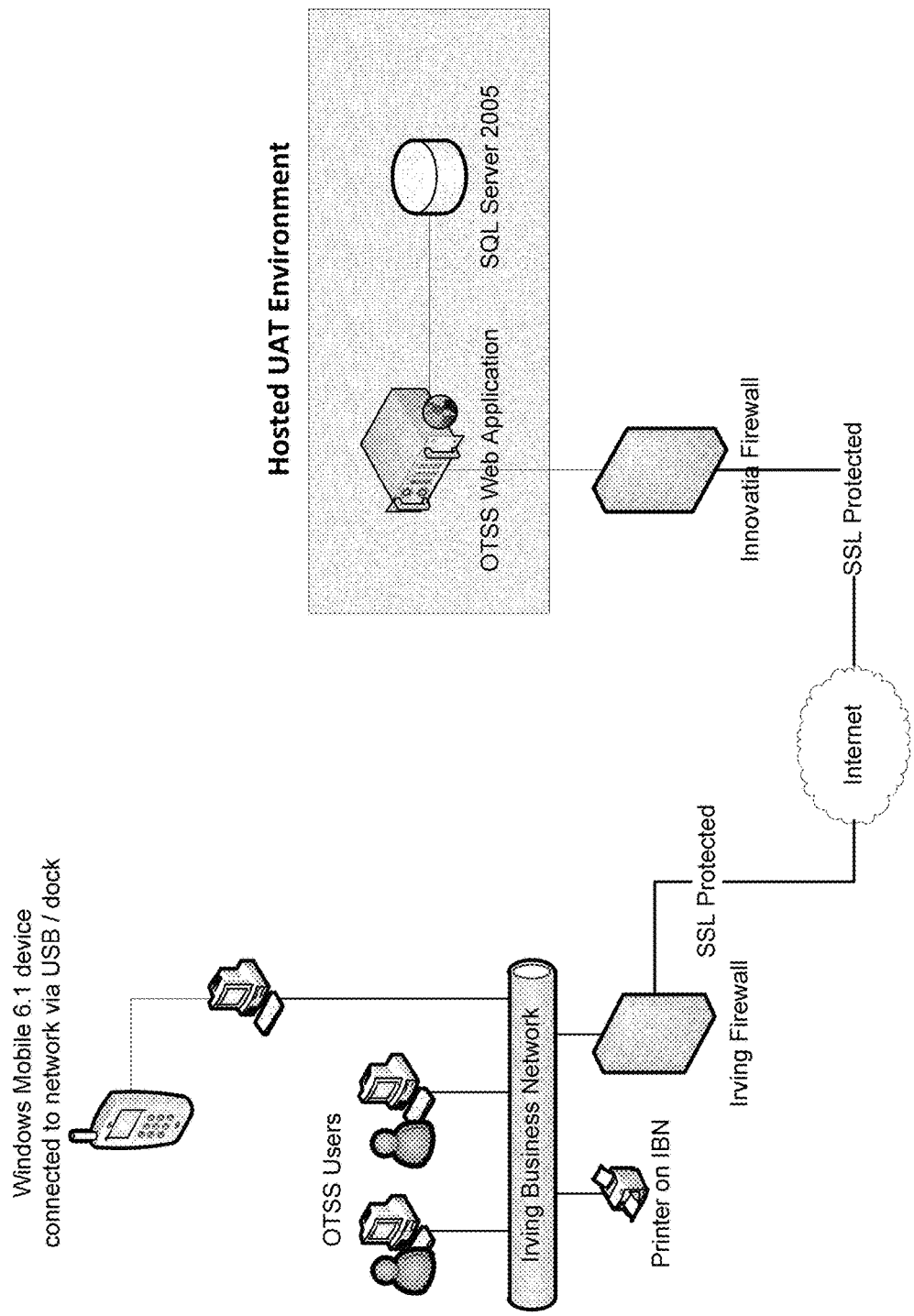
FIG. 21 is a schematic diagram of a portion of a system, according to a preferred embodiment of the present invention.
Figure 22:
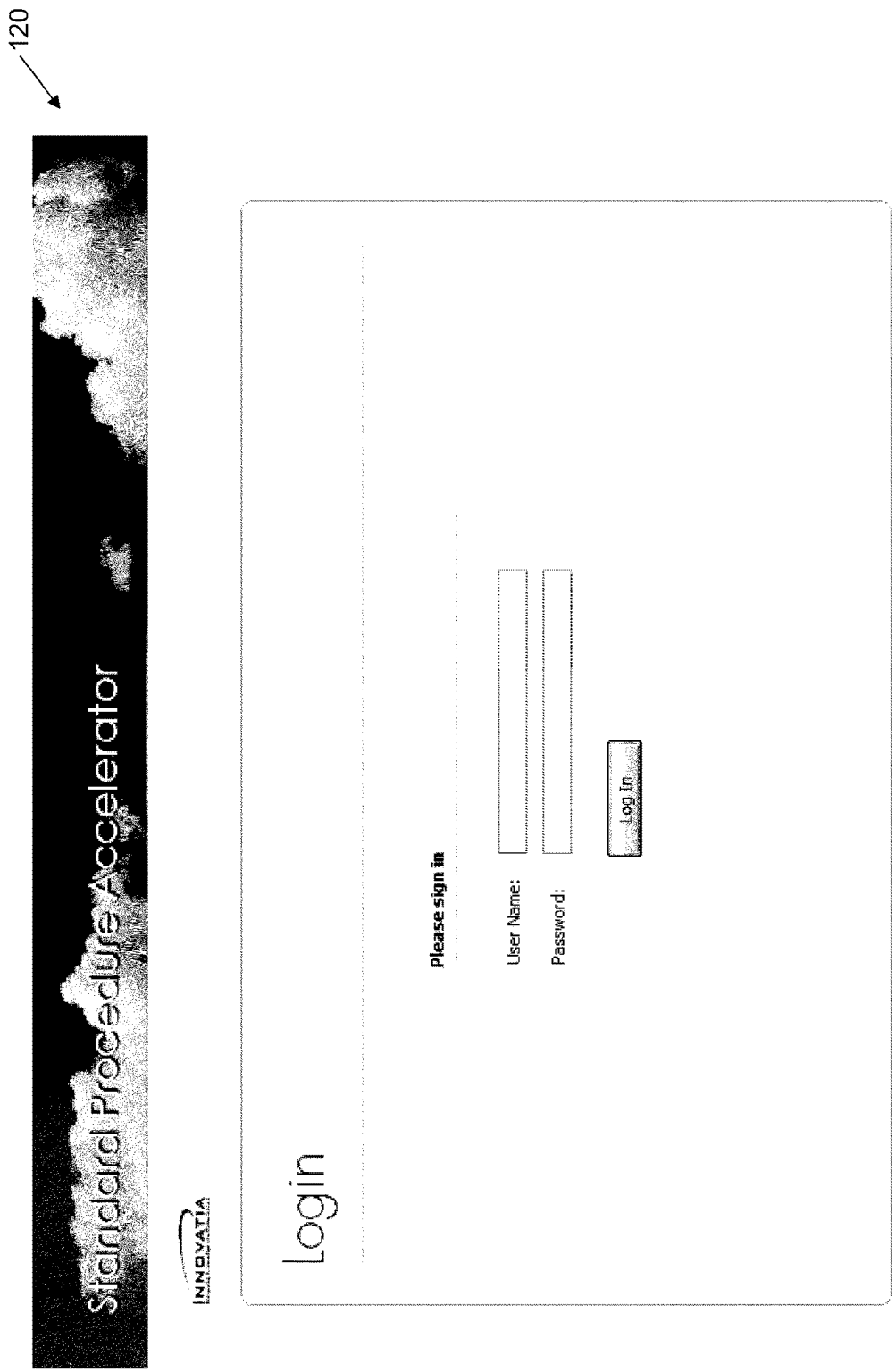
FIG. 22 is a screenshot of a user interface of a system, according to a preferred embodiment of the present invention.
Figure 24:
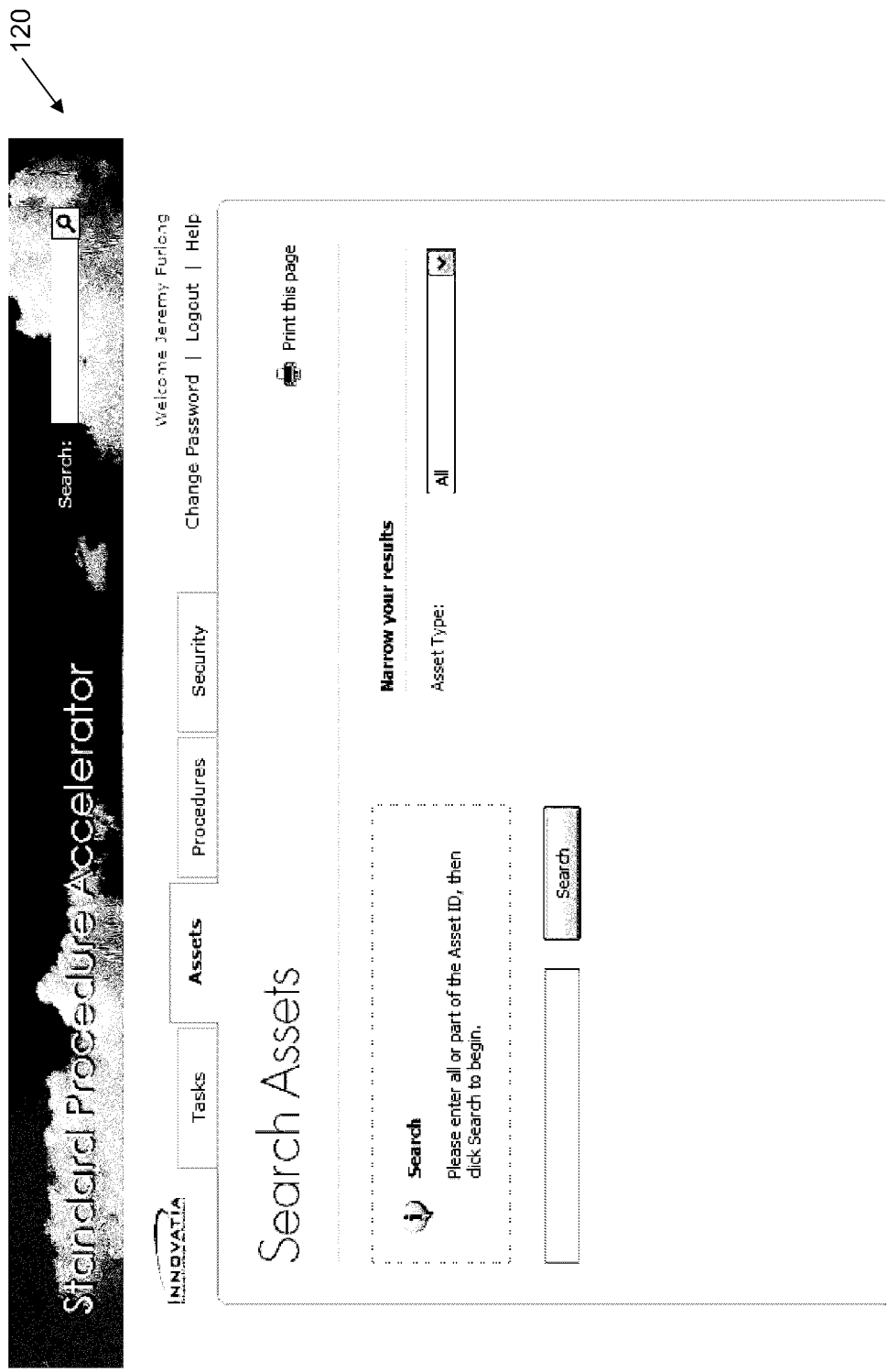
FIG. 24 is another screenshot of a user interface of a system, according to a preferred embodiment of the present invention.
Figure 25:
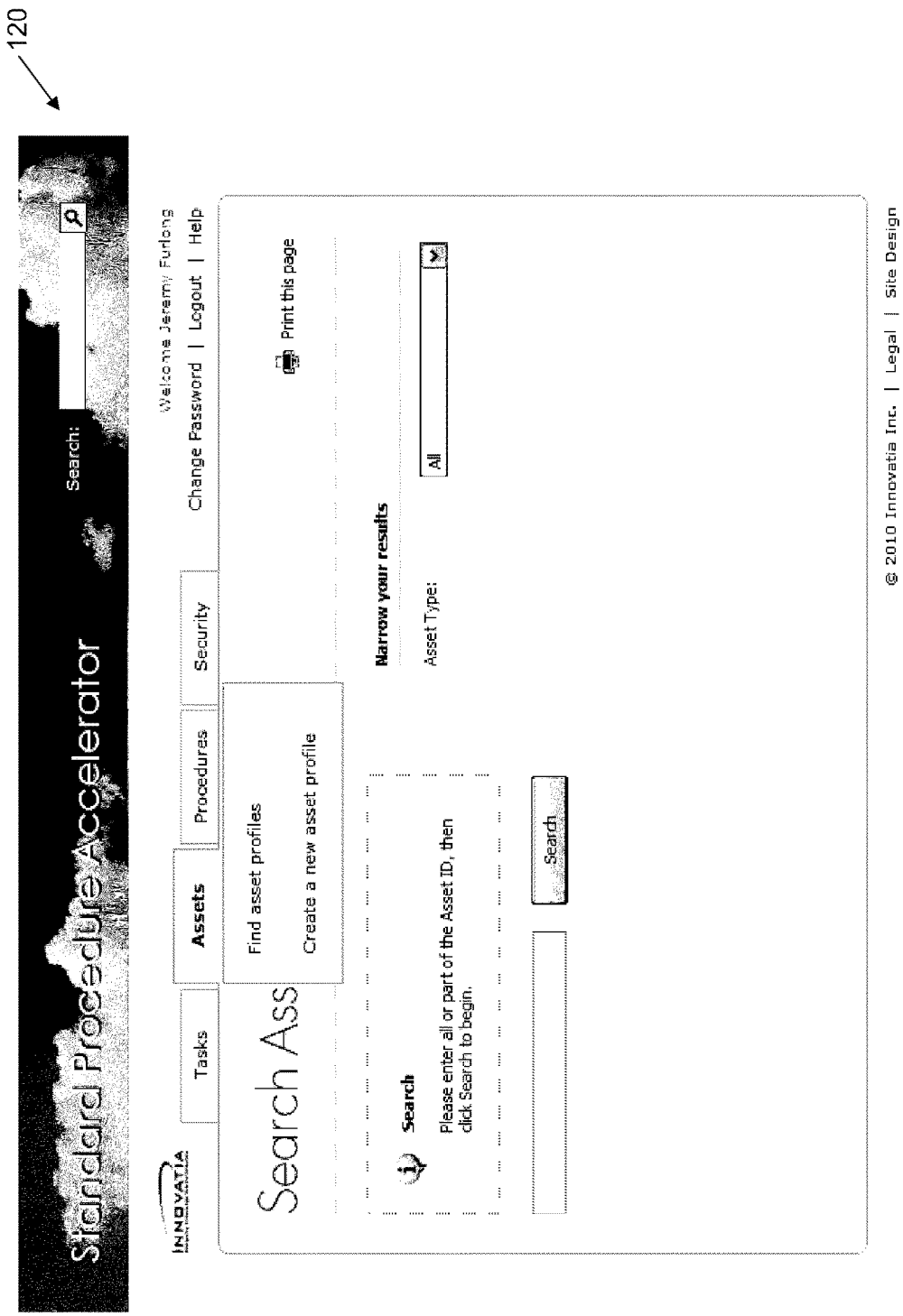
FIG. 25 is another screenshot of a user interface of a system, according to a preferred embodiment of the present invention.
Figure 26:
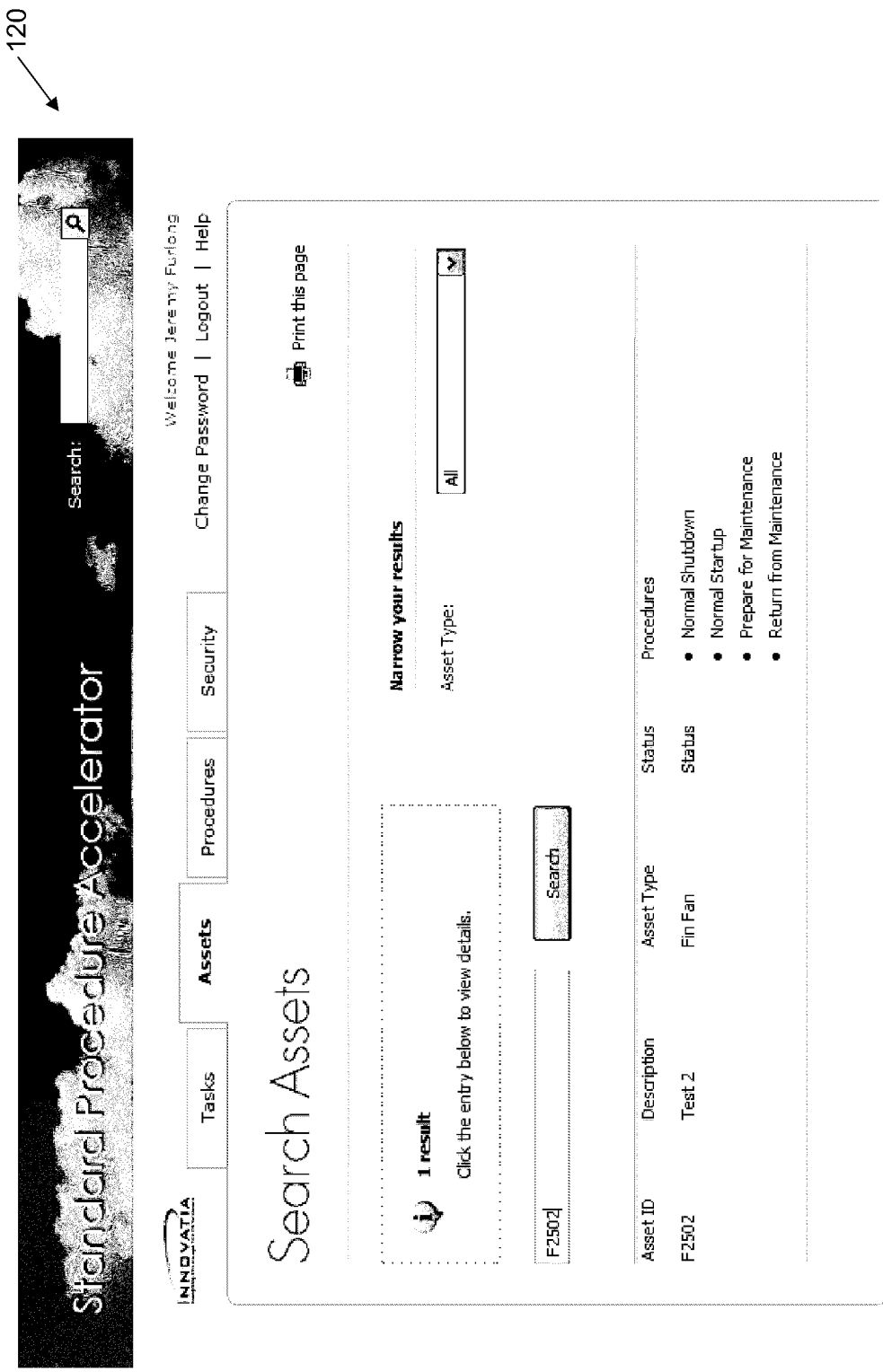
FIG. 26 is another screenshot of a user interface of a system, according to a preferred embodiment of the present invention.
Figure 27:
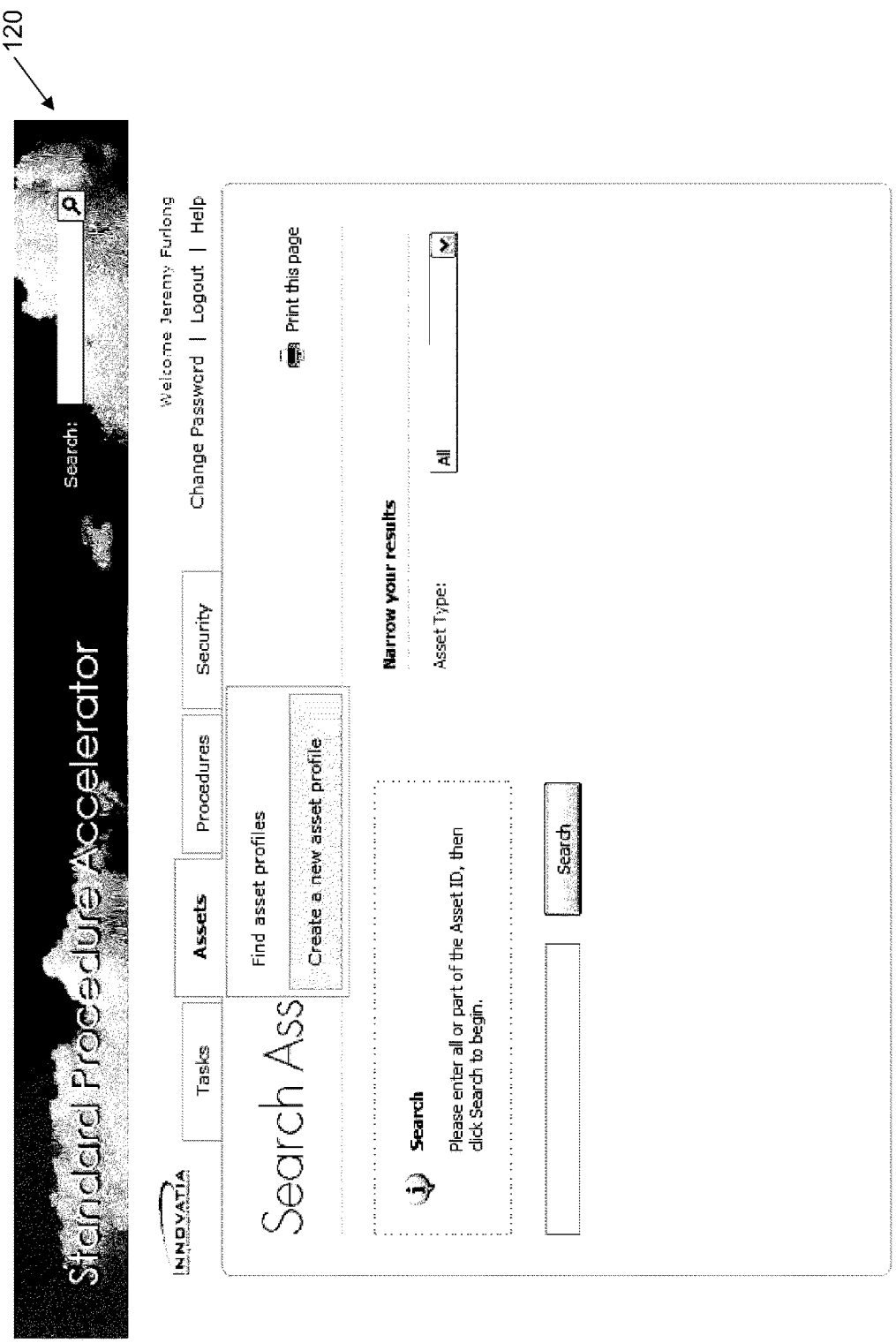
FIG. 27 is another screenshot of a user interface of a system, according to a preferred embodiment of the present invention.

Thus, with reference to FIGS. 1 and 21, the method preferably includes: uploading a copy of the published asset-specific-procedure instance on an external client device to decouple the asset specific procedure from the main storage; presenting 520, on the user interface 124 of the external device 116, the procedure statements 420$_X$ being referenced by the published asset-specific-procedure instance and an input element, for at least one of the presented procedure statements 420$_X$; receiving an input from a user, via said input element, to indicate that a procedure step related to the procedure statement has been completed; storing in an external memory 126 of said external client device 116, corresponding completion information with respect to said copy of the asset-specific-procedure instance; and upon coupling the external client device 116 to communicate with the main storage 110, updating the published asset-specific-procedure instance in the main storage 110 with said completion information stored in the external memory 126, in order to synchronize the main storage 110 with the external memory 126.

Roles

Each of the afore-mentioned roles will now be better explained.

An asset profiler is charged with populating asset profiles. Asset profilers do not create asset profiles; asset profiles are created by an Administrator (database coordinator). Asset profilers update the attribute values of assets already created in the system.

The facility technician is charged with completing AOPs in the plant and recording the results of the completion. The FT uses the asset search page to find an AOP for an asset. The FT may review the AOP and add the AOP to his/her Completion List. The AOP is then downloaded to a handheld device for completion in the field. Once the AOP Completion is complete, the FT reconnects the handheld device to a computer so the device may upload the completion results to the server.

The technical writer, field tech team lead, and any other users in the Reviewer role are tasked with reviewing draft AOPs and adding comments for improving or correcting procedures.

Reviewers use the Task Manager to view assigned tasks. Reviewers open an assigned AOP in the AOP Viewer where they may view the existing revision/comment history and add comments to the AOP.

The area operations specialist, area manager, and other users in the Approver role are tasked with approving draft AOPs and optionally adding comments when approving or rejecting the AOP.

Approvers use the Task Manager to view assigned tasks. Approvers open an assigned AOP in the AOP Viewer where they may view the existing revision/comment history, add comments to the AOP, and approve/reject the current version of the AOP.

The database coordinator and any other users in the Administrator role are tasked with:
  creating asset profiles
  assigning draft AOPs to Editors for editing, to Reviewers for review (comments), and to Approvers for approval
  changing the status of Draft AOPs to Published and vice versa
  maintaining the user accounts
  viewing AOP Completion history Administrators use the Create Asset Profile page to create new assets in the system.

Administrators use the AOP Viewer to assign Edit, Review, and Approve tasks to users in the system. When a task is completed, the AOP is automatically reassigned back to the originating Administrator (i.e., a Manage AOP task is assigned). The Administrator views assigned tasks in the Task Manager.

Administrators uses the AOP Viewer to publish draft AOPs and to pull published AOPs back to draft status.

Administrators use the Security Manager to view, add, and disable user accounts, reset passwords, and change the security permissions of users.

Administrators use the AOP Completions page (under the Procedures menu) to view the history of AOP completions including the specific version of an AOP that was completed, any steps that were skipped, and comments entered by the Facility Technician.

The Process Statement Developer and any other user in the Editor role is charged with editing standard statements and assembling them to create AOPs. An Administrator assigns draft AOPs to Editors who retrieve their assignments via the Task Manager.

An Editor may use the editing page for procedure templates and asset specific AOPs via the AOP Viewer.

An Editor may use the Find and Modify Statements page to search for and edit standard statements.

Thus, the method described herein according to an embodiment, further comprises: at step (a), storing user identifiers, each being associated to one or more role; before step (b), receiving a user identifier, via the user interface; after step (b)-ii), storing the asset-specific-procedure instance in a temporary memory and assigning a role thereto; at step b)-iii), presenting on the user interface, one or more operational option concerning the asset-specific-procedure instance, said one or more operational option depending on the role; receiving and processing one or more operational selection entered by a user via the user interface, to perform an operation on the user-specific-procedure instance in the temporary storage; assigning in the temporary storage, another role to the asset-specific-procedure instance for further processing of the asset-specific-procedure instance.

For example, in light of the above explanations, operational options may include: a variety of editing operations for the Administrator role; editing AOP or statements, submitting a revised AOP, marking task assignment as complete, etc. for the Editor; approving or rejecting AOP, providing comments, mark task assignment as complete for the Approver; submitting comments for the Reviewer; and check boxes for completed steps for the User (after publishing).

User Interface

FIGS. 24 to 45 illustrates the user interface 120 to be displayed on a display screen. The following metrics are targets for user experience.
  Search features are to return results within 10 seconds
  AOP Viewer is to open a procedure within 5 seconds
  Web application is to load within 3 seconds
  Handheld application is to launch within 3 seconds
  Web login session timeout is 60 minutes
  No more than 3 clicks are required to search for assets, procedures, or statements (not including additional clicks to set search parameters)

Security

The SPA use Secure Socket Layer (SSL) framework and HTTPS connection between server and client to ensure a secure encrypted communication. We obtain an SSL certificate from a leading certificate provider such as GoDaddy, Verisign, Comodo, or Thawte.

In addition, the server may be configured to accept connections from only IP addresses that are known to us in order to minimize the potential for denial of service attacks.

Preferably, the application requires that the user provides a valid username and password combination to log into the system. Password standards may be enforced by the SPA when a user account is created and when they attempt to update their password.

Access control is implemented through a role based—object access approach. Users are assigned to one or more roles and have access to objects that are allowed for that role. Objects have operators with which they are associated that determine functional access. Below is a table of actions and associated roles.

| Actions | Allowed Roles |
|---|---|
| Log in | All Roles |
| Change own password | |
| View and search assets and procedures | |
| View AOP/Comment on Viewed AOP | |
| Print Asset Profile | |
| Print AOP | |
| Everything | Administrator |
| Add/Edit Standard Statements | Editor |
| Add/Edit Procedure Templates | |
| Add/Edit Asset Specific Procedures | |
| View AOP history and comments | |
| View Task Manager | |
| Add Comments to AOPs | |
| View Draft AOPs | |
| Approve or Reject AOP | Approver |
| View AOP history and comments | |
| View Task Manager | |
| Add Comments to AOP | |
| View Draft AOPs | |
| Add Comments to AOP | Reviewer |
| View AOP history and comments | |
| Add Comments to AOP | |
| View Task Manager | |
| Add/modify asset profile | Asset Profiler |
| Add new assets | |
| Complete Procedure | Facility Technician |

Version Control

The SPA monitors changes to standard statements and AOPs and captures all changes to these objects in the form of a version history.

The versioning is primarily handled by storing all the objects as slowly changing dimensions in main storage. Dimension is a term in data management and data warehousing that refers to logical groupings of data. Slowly Changing Dimensions (SCDs) are dimensions that have data that changes slowly, rather than changing on a time-based, regular schedule. Though all historical versions of objects (Assets, Attributes, Procedure Templates, Process Sections, Statements, Conditional Statements, etc.) are tracked, this is still done for the purpose of dynamically generating a procedure for a given asset instance at a particular point in time. Therefore, when assets, asset types, procedure templates, or statements are modified, it is determined whether a new version of a procedure must be recorded. When a new version must be recorded, a timestamp associated to the changed item, preferably including a date and time, so that historical versions of the procedure may be dynamically assembled.

When a historical version of a procedure is assembled, the procedure is constructed based on the date and time stamped on that historical version. To do this, each of the objects required in the assembly are considered and it is determined which historical version of that object is applicable for the time stamped on the procedure version. Then all of the objects are assembled together to dynamically generate the procedure as outlined in the "Generate Procedure" algorithm.

The time-dependent dynamic generation of procedures will now be explained, with reference to FIGS. 5 to 7.

The method comprises:
storing in the main storage 110 at least one of:
one or more version of an asset instance, each version representing a previous version of an asset instance and each being identified by a version timestamp;
one or more version of a procedure template, each version representing a previous version of a procedure template and each being identified by a version timestamp;
one or more version of a procedure statement, each version representing a previous version of a procedure statement and each being identified by a version timestamp; and
one or more version of a unique combination of one of said procedure templates and of one of said asset instances, each version representing a previous version of an asset specific procedure and each being identified by a version timestamp, the method further comprising:
for a given asset instance, a given procedure template and a given timestamp, at 516:
if the given asset instance and the given procedure template is associated to one or more corresponding version, and if the given timestamp corresponds to a version timestamp of one of the one or more version,
if the procedure template is associated to one or more version thereof, retrieving by means of a processor, the corresponding version based on a comparison between the corresponding version timestamp and said given timestamp and identifying said version as a subject procedure template, otherwise identifying the given template as the subject procedure template;
iteratively reading, by means of a processor, each of the procedure statements of the group of procedure statements being associated to said subject procedure template: and
for each of the procedure statement:
if the procedure statement is associated to one or more version thereof, retrieving by means of a processor, the corresponding version based on a comparison between the corresponding version timestamp and said given timestamp and identifying said version as a subject procedure statement, otherwise identifying the given procedure statement as the subject asset instance;
if the given asset instance is associated to one or more version thereof, retrieving by means of a processor, the corresponding version based on a comparison between the corresponding version timestamp and said given timestamp and identifying said version as a subject asset instance, otherwise identifying the given asset instance as the subject asset instance;
storing in a temporary memory, a statement-reference to each of said subject procedure statements where a condition is met when the corresponding one or more conditional rule is applied to the attribute-values of the subject asset instance, in order to construct an asset-specific-procedure instance;

otherwise, repeating steps (b)-ii) and (b)-ii) (522); and presenting, on a user interface, the procedure statements being referenced by the asset-specific-procedure instance constructed at step c), in order to dynamically generate a time-dependent asset specific procedure.

Figure 6:
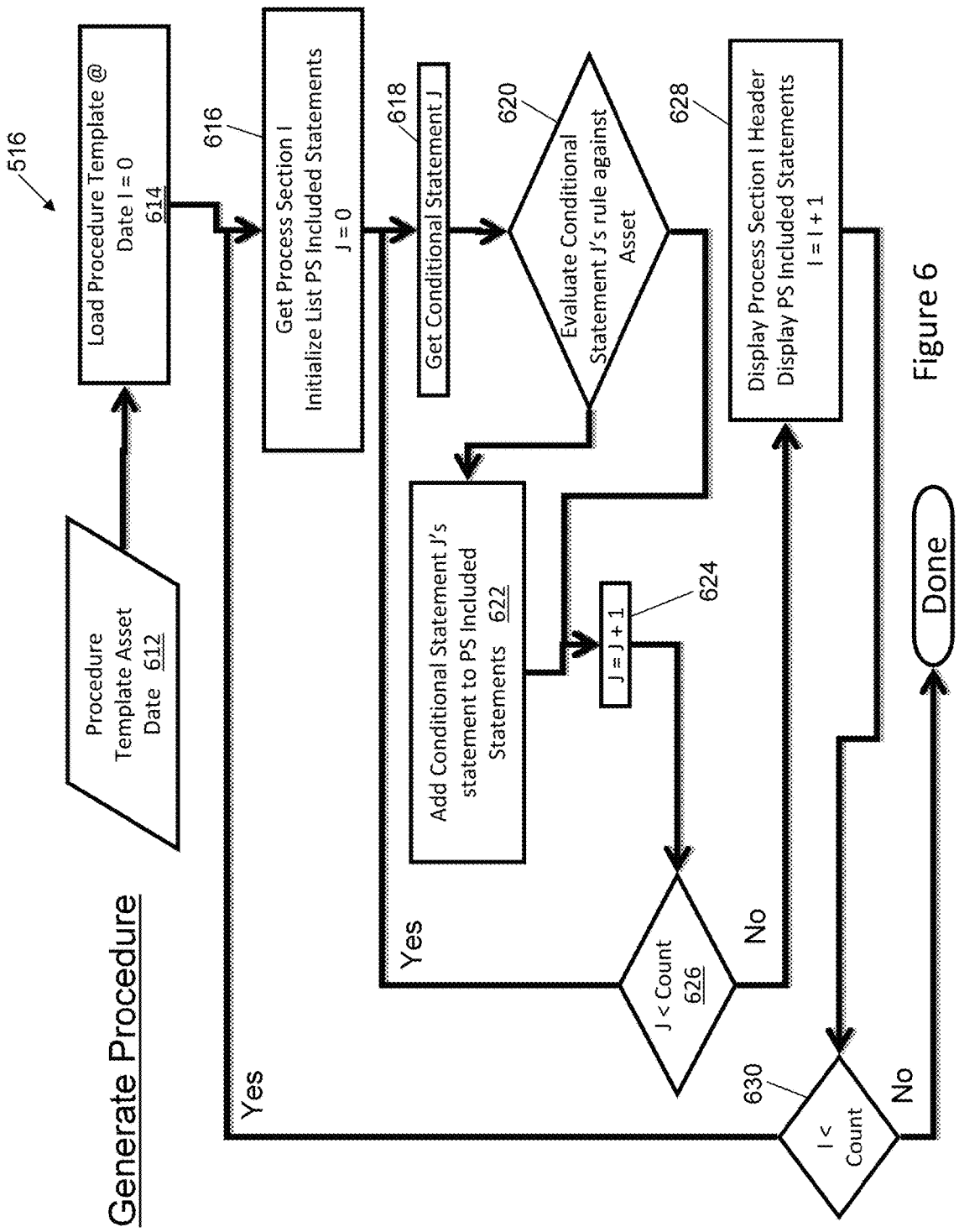
FIG. 6 is a block diagram of steps of a method, according to a preferred embodiment of the present invention.

FIG. 6 shows a block diagram comprising steps 612 to 630. FIG. 7 shows the algorithm 710 representing the steps 612 to 630 of the block diagram shown in FIG. 6.

The handling of an asset-type change will now be explained, with reference to FIGS. 5 and 8A to 9. The method comprises:

receiving an asset-type-change request from the user interface 120;

capturing, by means of a clock 127, a start timestamp;

modifying by means of a processor 118, attributes of one of the asset types in the main storage 110, in accordance with the asset-type-change request;

for each procedure template being associated to the asset type, dissociating from the respective procedure template, any procedure statement being related to a conditional rule related to an inexistent attribute of the asset type;

for each asset instance of the asset type:

executing step 522 where the given timestamp is the start timestamp, in order to store a resulting a first asset-specific-procedure instance in the temporary memory 122;

after the step of dissociating, executing step 522, where the given timestamp is a present timestamp captured by a clock 127, in order to store a resulting second asset-specific-procedure instance in the temporary memory 122;

comparing the first and second asset-specific-procedure instances and if the first and second asset-specific-procedure instances have different statement references, associating in the main storage 110, the combination of the asset instance and the procedure template with a version timestamp corresponding to the present timestamp, in order to generate a new version of the asset specific procedure.

Figure 8A:
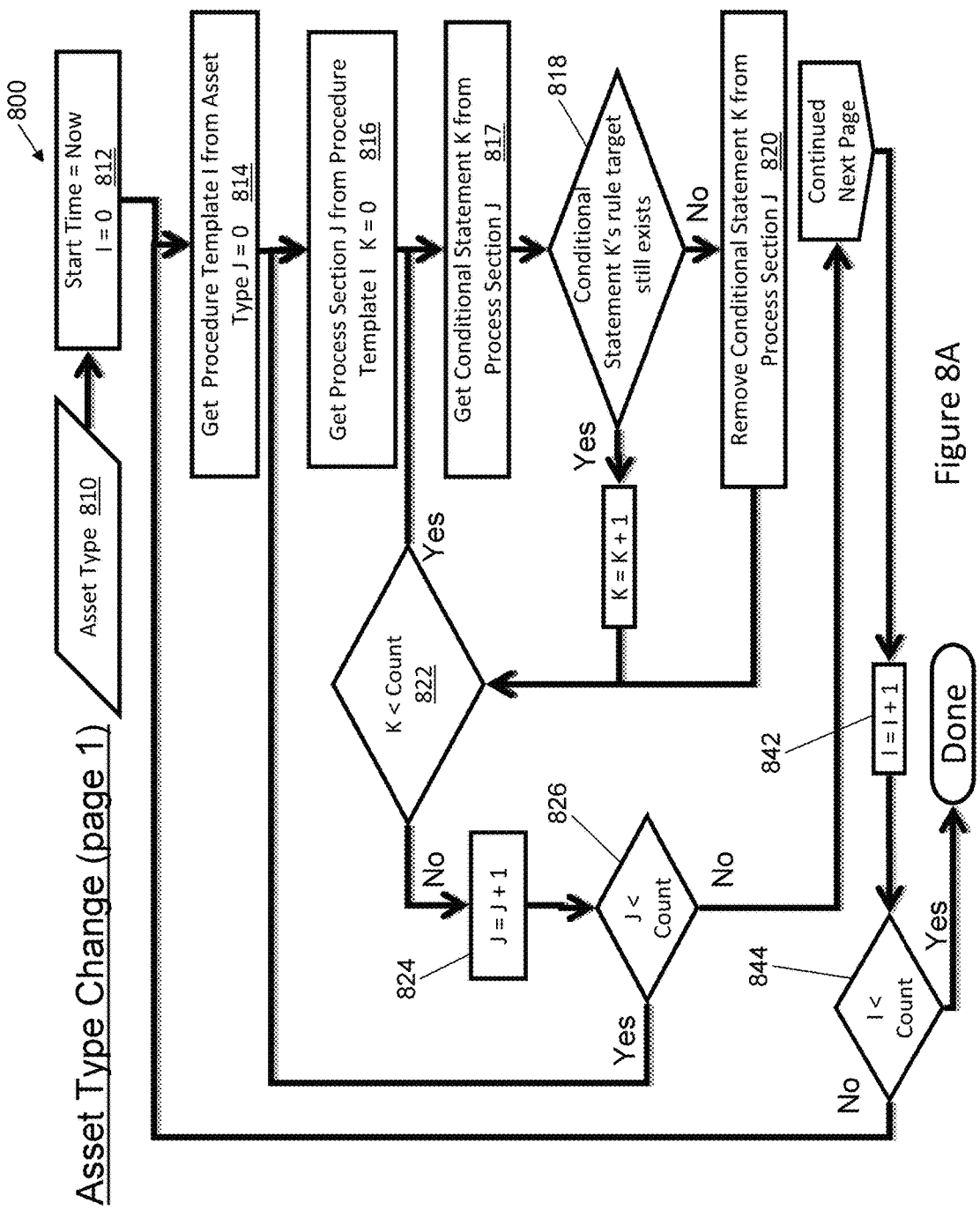

FIG. 8A-8B shows a block diagram comprising steps 810 to 844. FIG. 9 shows the algorithm 910 representing the steps 810 to 844 of the block diagram shown in FIG. 8A-8B.

The handling of a template change will now be explained, with reference to FIGS. 5, 10 and 11. The method comprises:

receiving a procedure-template-change request from the user interface 120;

capturing, by means-of a clock 127, a start timestamp;

modifying in the main storage 110, in accordance with the procedure-template-change request, at least one of: the group of procedure statements of one of the procedure templates; and one or more of the conditional rules associated to said group of procedure statements;

for each asset instance of the asset type associated to said one of the procedure templates:

re-executing step 522 wherein the given timestamp is the start timestamp, to store a resulting first asset-specific-procedure instance in the temporary memory 122;

re-executing step 522 wherein the given timestamp is a present timestamp captured by the clock 127, to store a resulting second asset-specific-procedure instance in the temporary memory 122;

comparing the first and second asset-specific-procedure instances and if the first and second asset-specific- procedure instances have different statement references, associating in the main storage 110, the combination of the asset instance and said one of the procedure templates with a version timestamp corresponding to the present timestamp, in order to generate a new version of the asset specific procedure.

Figure 10:
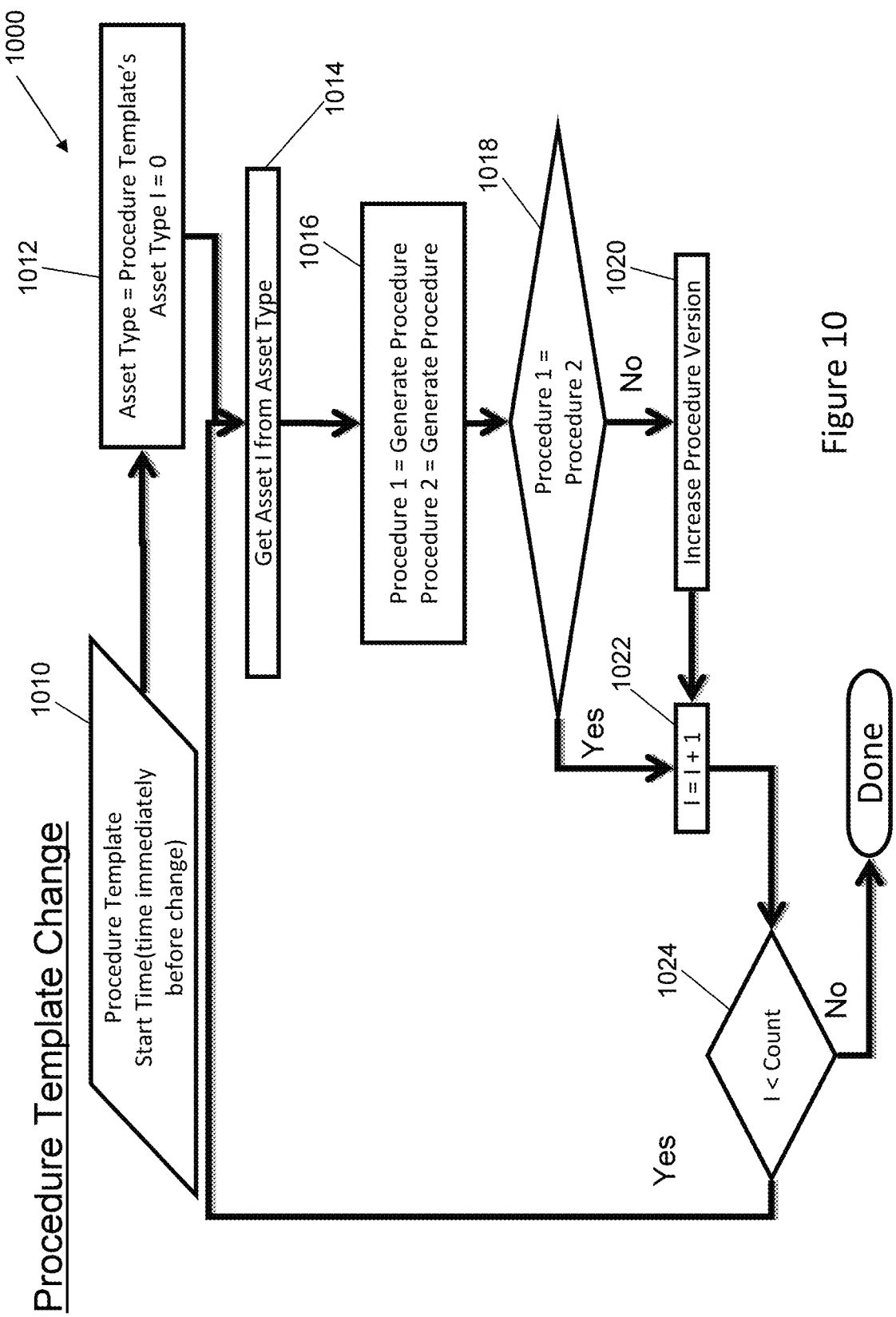
FIG. 10 is a block diagram of steps of a method, according to a preferred embodiment of the present invention.

FIG. 10 shows a block diagram comprising steps 1010 to 1024. FIG. 11 shows the algorithm 1100 representing the steps 1010 to 1024 of the block diagram shown in FIG. 10.

The handling of a procedure statement change will now be explained, with reference to FIGS. 5, 12 and 13. The method comprises:

receiving a procedure-statement-change request from the user interface 120;

modifying in the main storage 110, one of the procedure statements, in accordance with the procedure-statement-change request;

for each asset instance stored, of each procedure template associated to the asset type of the asset instance:

re-executing step 522 wherein the given timestamp is a present timestamp captured by a clock 127, to temporarily store a resulting asset-specific-procedure instance in the temporary memory 122;

if resulting asset-specific-procedure instance references the modified one of the procedure statements, associating in the main storage 110, the combination of the asset instance and the procedure template with a version timestamp corresponding to the present timestamp, in order to generate a new version of the asset specific procedure.

Figure 12:
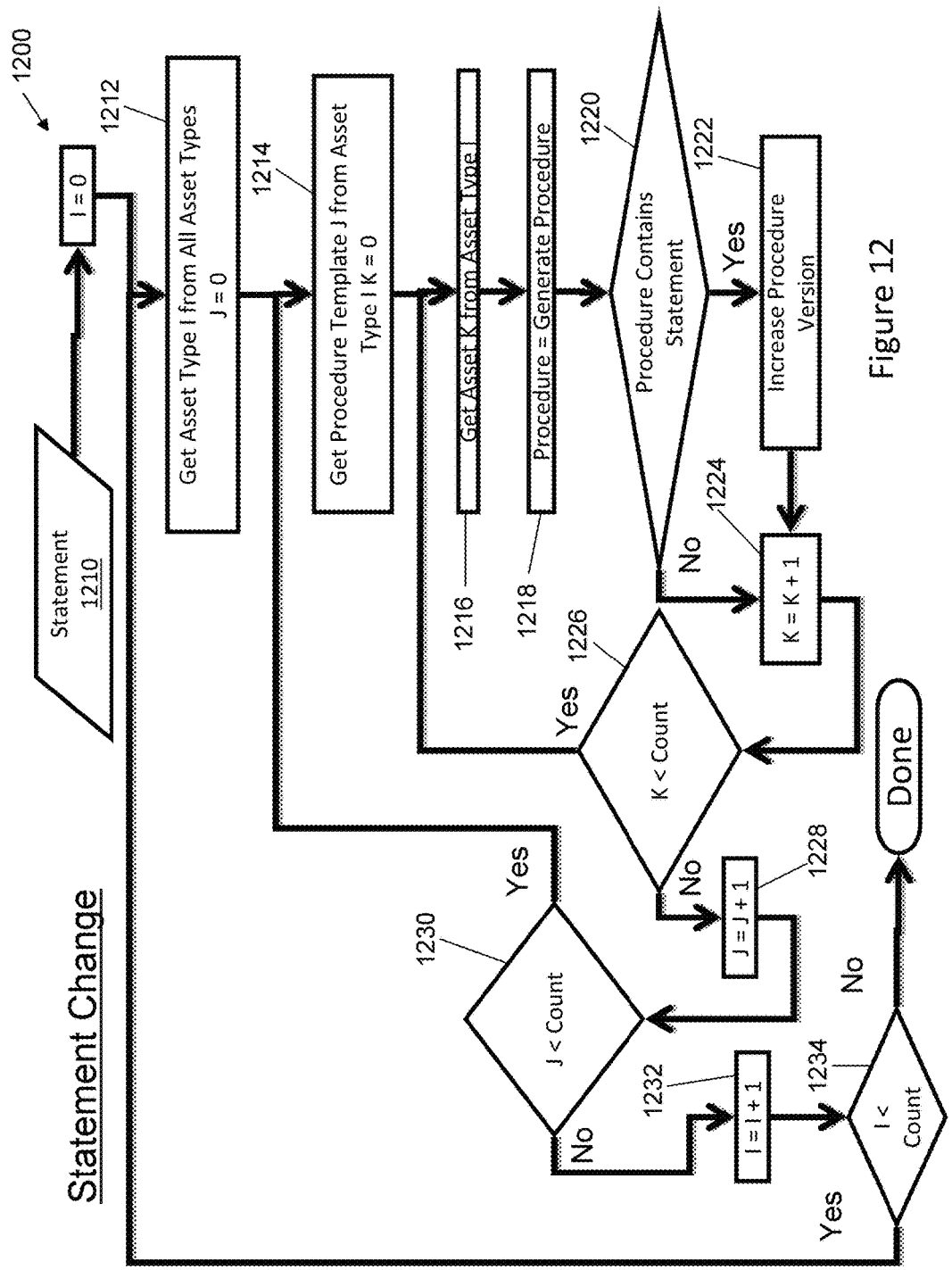
FIG. 12 is a block diagram of steps of a method, according to a preferred embodiment of the present invention.

FIG. 12 shows a block diagram comprising steps 1200 to 1234. FIG. 13 shows the algorithm 1300 representing the steps 1200 to 1234 of the block diagram shown in FIG. 12.

Architecture

Referring to FIGS. 1, 4 and 5, there is shown system 100 for dynamic procedure generation, which comprises: a main storage 110 for storing: a library 412 of asset types, each being representative of a common group of assets, each asset type defining attributes 414; asset instances 416, and each of said asset instances inheriting attributes of one of the asset types and having an attribute-value assigned to each of the inherited attributes 418; a collection of procedure statements 420; one or more conditional rule 422 to be applied to an attribute-value of an asset instance, said one or more conditional rule being associated to each of the procedure statements 420; and a collection of procedure templates 424, each defining a unique combination of one of the asset types 412 and a group of said procedure statements 420.

The system further includes a processor 118 being in communication with the storage 110 for iteratively reading each of the procedure statements $420_A$ of the group of procedure statements being associated to said given procedure template $424_A$. The system further includes a temporary memory 122 being in communication with the processor 118 for storing a statement-reference to each of said procedure statements $420_A$ where a condition is met when the corresponding one or more conditional rule $422_A$ is applied to the attribute-values $418_A$ of the given asset instance $416_A$, in order to construct an asset-specific-procedure instance. The system further includes communication means 128 being in communication with the temporary memory 122 and the processor 118 for outputting the procedure statements $420_A$ being referenced by the constructed asset-specific-procedure instance to be presented on a user interface 120, in order to dynamically generate an asset specific procedure.

Preferably, the system further includes the user interface 120. Preferably, the user interface 120 is in communication with the communication means 128 for presenting the procedure statements $420_A$.

Preferably, the processor 118, the temporary memory 122 and the communication means 128 are located in a server 112. Still preferably, the main storage 110 is located in a database 113. Still preferably, the user interface is provided by a client computer being in communication with the server, either locally or remotely.

Preferably, the system further includes a communication interface component 130 being in communication with the processor 118 and the main storage 110 and an external device 116. Preferably, the external device 116 includes a communication port 132 being adapted to cooperate with the communication interface 130 for uploading a copy of a published asset-specific-procedure instance from the main storage 110 to the external client device 116 to decouple the asset specific procedure from the main storage 110 and for updating the published asset-specific-procedure instance in the main storage 110, in order to synchronize the main storage 110 with the external device 116; an external user interface 124 for presenting the procedure statements being referenced by the copy and for receiving an input from a user, via an input element, to indicate that a procedure step related to the procedure statement has been completed; and an external memory 126 being connected to the communication port 132 for receiving the copy and connected to the user interface 124 for storing the completion information received, in order to synchronize with the main storage when the external device is coupled with the communication port.

The server side components required to run the SPA are:
Microsoft Windows Server 2008 (or 2003)
Microsoft IIS7 (or IIS6)
Microsoft SQL Server 2005
Microsoft .NET Framework 2.0
Microsoft AJAX Extensions 1.0 for .NET (v2)

Regarding the client architecture, Internet Explorer 6 or 7 on client PCs with an attached or network based printer to print Asset Profile Forms (equipment template) and AOPs. Windows Mobile 6.1 on network capable mobile devices (via direct Ethernet or ActiveSync networking sharing).

Regarding peripherals, local or network based printer is required for printing procedures. The Microsoft Windows Mobile 6.1 emulator is being used for development of Release 0.4. This is assumed to be sufficiently similar to the final handheld devices to be deployed in production. Note: The handheld solution assumes the handheld device has pass-through network access when connected to a PC via a dock or USB cable.

To the Applicant's knowledge, there are no other products/approaches available that increase the productivity of creating and maintaining standard operating large volumes of procedures to the extent that the present approach does. Other applications tend to focus on document storage and searching of procedures as actual self contained documents. The approach according to the present invention is fundamentally different compared to known methods in the way the range of procedure steps is stored in a database and specific procedures are only assembled at the time of use.

Indeed, the system according to the present invention, uses the concept of templates, but not in the traditional sense such as resume, budget, contract and form letter templates that are typically available in word processing packages and from third party vendors. The system's approach to templates deviates from this traditional model in several novel ways: (1) rather than being a mostly empty shell of a document to which content is added, the concept of template is as a comprehensively inclusive assembly of (database) records from a database of standard statements containing all possible statements that may apply to a particular object class, for a specific procedure type (statement types may include cautions, warnings, legal copy and procedures); (2) changes to a template, such as reordering, removal and addition of statements, are reflected in all procedures for which that statement applies and subsequently new versions of affected procedures are generated; (3) changes to any statement included in a template are reflected in all object specific procedures in which that statement has been included; (4) the template is preferably not accessed directly by a user who is performing the act of creating an object specific procedure, but rather, draft procedures are dynamically generated by the system through the completion of an object profile form.

There are three aspects to dynamic procedure generation: object profile, procedure templates and object specific content rules. Since all procedures are rendered dynamically by processing a real time view of all three components, changes to any of the three are reflected in the current version of the procedure. The framework for an object profile provides a means for definition of the attributes or characteristics of the object as well as all possible values of those attribute. Within the template the attributes are used in the construction of rules that allow a designer to associate particular attribute values with the intended inclusion of a statement in an object specific procedure such that, if a particular value is selected when the object profile form is being completed by an end user, that value triggers the system to include all statements that have been assigned a 'SHOW WHEN' rule, applied to a given template, and that meet the condition at the time the system receives a view request for that object specific procedure.

Versioning

Since the system departs significantly from the traditionally handling of a electronic document, in that documents in the described system are effectively a map of references to data chunks that exist as discrete database records, a new model for management of versions of those maps needed to be devised to support the system requirement of storing and retrieving all previous versions of a procedure. Therefore the system slowly changes dimensions to the problem of procedure versioning; the primary dimension in this case being the statement text.

When a statement is updated, a copy is made of the database record which held that statement, before the update is applied. The copy is then written to a historical tracking table, with its effective dates (from—to) provided.

If the system receives a request to view a previous version of a procedure business logic is triggered which checks for effective dates of the procedure being requested and then assembles all statement that were in effect for that range of dates.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A system for dynamic procedure generation, the system comprising:
 a main storage for performing storing:
  a library of asset types, each being representative of a common group of assets, each asset type defining attributes;
  asset instances, and each of said asset instances inheriting attributes of one of the asset types and having an attribute-value assigned to each of the inherited attributes;
  a collection of procedure statements;

one or more conditional rule to be applied to an attribute-value of an asset instance, said one or more conditional rule being associated to each of the procedure statements; and a collection of procedure templates, each defining a unique combination of one of the asset types and a group of said procedure statements; and a processor being in communication with the storage, the processor for performing:

a step (a) of:
presenting on a user interface, a first input component for receiving an asset identifier and a second input component presenting a list of said library of asset types for receiving a selected asset type therefrom;
upon receiving the asset identifier and the selected asset type, presenting on the user interface, another input component for each attribute of the selected asset type for receiving respective attribute-values; and
upon receiving the attribute-values, storing in the main storage the asset identifier and associated attribute-values, as a new asset instance;

a step (b) of, for a given asset instance and a given procedure template:
i) iteratively reading each of the procedure statements of the group of procedure statements being associated to said given procedure template;
ii) storing, in a temporary memory, a statement-reference to each of the procedure statements of the group of procedure statements being associated to said given procedure template, where a condition is met when the corresponding one or more conditional rule is applied to the attribute-values of the given asset instance, in order to dynamically generate an asset specific procedure instance in association with the statement-reference;
iii) presenting, on a user interface, one of the procedure statements of the group of procedure statements being referenced by the asset-specific-procedure instance; and wherein the main storage is further adapted to store at least one of:
one or more version of an asset instance, each version representing a previous version of an asset instance and each being identified by a version timestamp;
one or more version of a procedure template, each version representing a previous version of a procedure template and each being identified by a version timestamp;
one or more version of a procedure statement, each version representing a previous version of a procedure statement and each being identified by a version timestamp; and
one or more version of a unique combination of one of said procedure templates and of one of said asset instances, each version representing a previous version of an asset specific procedure and each being identified by a version timestamp; and wherein the processor is further programmed to perform a step (c) of:
for a given asset instance, a given procedure template and a given timestamp:
if the given asset instance and the given procedure template is associated to one or more corresponding version, and if the given timestamp corresponds to a version timestamp of one of the one or more version,
if the procedure template is associated to one or more version thereof, retrieving the corresponding version based on a comparison between the corresponding version timestamp and said given timestamp and identifying said version as a subject procedure template, otherwise identifying the given template as the subject procedure template;
iteratively reading each of the procedure statements of the group of procedure statements being associated to said subject procedure template: and
for each of the procedure statement:
if the procedure statement is associated to one or more version thereof, retrieving by means of a processor, the corresponding version based on a comparison between the corresponding version timestamp and said given timestamp and identifying said version as a subject procedure statement, otherwise identifying the given procedure statement as the subject asset instance;
if the given asset instance is associated to one or more version thereof, retrieving by means of a processor, the corresponding version based on a comparison between the corresponding version timestamp and said given timestamp and identifying said version as a subject asset instance, otherwise identifying the given asset instance as the subject asset instance;
storing in the temporary memory, a statement-reference to each of said subject procedure statements where a condition is met when the corresponding one or more conditional rule is applied to the attribute-values of the subject asset instance, in order to construct an asset-specific-procedure instance;
otherwise, repeating steps (b)-i) and (b)-ii); and wherein the processor is further programmed to perform a step (d) of presenting, on the user interface, the procedure statements being referenced by the asset-specific-procedure instance constructed at step c), in order to dynamically generate a time-dependent asset specific procedure.

2. The system according to claim 1, wherein the processor is further programmed to:
perform a step (e) of receiving an asset-type-change request from the user interface;
perform a step (f) of capturing, by means of a clock, a start timestamp;
perform a step (g) of modifying attributes of one of the asset types in the main storage, in accordance with the asset-type-change request;
perform a step (h) comprising, for each procedure template being associated to the asset type:
dissociating from the respective procedure template, any procedure statement being related to a conditional rule related to an inexistent attribute of the asset type; and
for each asset instance of the asset type:
executing step (c) where the given timestamp is the start timestamp, in order to store a resulting a first asset-specific-procedure instance in the temporary memory;
after the step of dissociating, re-executing step (c), where the given timestamp is a present timestamp, in order to store a resulting second asset-specific-procedure instance in the temporary memory; and
comparing the first and second asset-specific-procedure instances and if the first and second asset-specific-procedure instances have different statement references, associating in the main storage, the combination of the asset instance and the procedure template with a version timestamp corresponding to the present timestamp, in order to generate a new version of the asset specific procedure.

3. The system according to claim 2, wherein the processor is further programmed to:
perform a step (i) of receiving a procedure-template-change request from the user interface;
perform a step (j) of capturing, by means-of a clock, a start timestamp;
perform a step (k) of modifying in the main storage, in accordance with the procedure-template-change request, at least one of: the group of procedure statements of one of the procedure templates; and one or more of the conditional rules associated to said group of procedure statements; and
perform a step (l) comprising, for each asset instance of the asset type associated to said one of the procedure templates:
re-executing step (c) wherein the given timestamp is the start timestamp, to store a resulting first asset-specific-procedure instance in the temporary memory;
re-executing step (c) wherein the given timestamp is a present timestamp, to store a resulting second asset-specific-procedure instance in the temporary memory; and
comparing the first and second asset-specific-procedure instances and if the first and second asset-specific-procedure instances have different statement references, associating in the main storage, the combination of the asset instance and said one of the procedure templates with a version timestamp corresponding to the present timestamp, in order to generate a new version of the asset specific procedure.

4. The system according to claim 3, wherein the processor is further programmed to:
perform a step (m) of receiving a procedure-statement-change request from the user interface;
perform a step (n) of modifying in the main storage, one of the procedure statements, in accordance with the procedure-statement-change request;
perform a step (o) comprising: for each asset instance stored, of each procedure template associated to the asset type of the asset instance:
re-executing step (c) wherein the given timestamp is a present timestamp, to temporarily store a resulting asset-specific-procedure instance in the temporary memory; and
if resulting asset-specific-procedure instance references the modified one of the procedure statements, associating in the main storage, the combination of the asset instance and the procedure template with a version timestamp corresponding to the present timestamp, in order to generate a new version of the asset specific procedure.

5. The system according to claim 1, wherein the processor is further programmed to:
store at step (a), user identifiers, each being associated to one or more role;
receive before step (b), a user identifier, via the user interface;
store after step (b)-ii), the asset-specific-procedure instance in a temporary memory and assigning a role thereto;
present at step b)-iii), on the user interface, one or more operational option concerning the asset-specific-procedure instance, said one or more operational option depending on the role;
receive and process one or more operational selection entered by a user via the user interface, to perform an operation on the user-specific-procedure instance in the temporary storage; and
assign in the temporary storage, another role to the asset-specific-procedure instance for further processing of the asset-specific-procedure instance.

6. The system according to claim 5, wherein the processor is further programmed to permanently store, in the main storage, the asset-specific-procedure instance as a published asset-specific-procedure instance.

7. The system according to claim 6, wherein the processor is further programmed to:
present on the user interface, the procedure statements being referenced by the published asset-specific-procedure instance and an input element for at least one of the presented procedure statements;
receive an input from a user, via said input element, to indicate that a procedure step related to the procedure statement has been completed; and
store in the main storage, corresponding completion information with respect to the asset-specific-procedure instance.

8. The system according to claim 6, wherein the processor is further programmed to:
upload a copy of the published asset-specific-procedure instance on an external client device to decouple the asset specific procedure from the main storage;
present on a user interface of the external client device, the procedure statements being referenced by the published asset-specific-procedure instance and an input element for at least one of the presented procedure statements;
receive an input from a user, via said input element, to indicate that a procedure step related to the procedure statement has been completed;
store in an external memory of said external client device, corresponding completion information with respect to said copy of the asset-specific-procedure instance; and
upon coupling the external client device to communicate with the main storage, update the published asset-specific-procedure instance in the main storage with said completion information stored in the external memory, in order to synchronize the main storage with the external memory.

9. The system according to claim 1, further comprising:
a communication interface component being in communication with the processor and the main storage; and
an external device comprising:
a communication port being adapted to cooperate with the communication interface for uploading a copy of a published asset-specific-procedure instance from the main storage to the external client device to decouple the asset specific procedure from the main storage, and for updating the published asset-specific-procedure instance in the main storage, in order to synchronize the main storage with the external device;
an external user interface for presenting the procedure statements being referenced by the copy and for receiving an input from a user, via an input element, to indicate that a procedure step related to the procedure statement has been completed; and an external memory being connected to the communication port for storing the copy and to the user interface for storing the completion information, in order to synchronize with the main storage when the external device is coupled with the communication port.

10. A method for dynamic procedure generation, the method comprising:
a) storing, in a main storage:
a library of asset types, each being representative of a common group of assets, each asset type defining attributes;
asset instances, and each of said asset instances inheriting attributes of one of the asset types and having an attribute-value assigned to each of the inherited attributes;
a collection of procedure statements;
one or more conditional rule to be applied to an attribute-value of an asset instance, said one or more conditional rule being associated to each of the procedure statements; and
a collection of procedure templates, each defining a unique combination of one of the asset types and a group of said procedure statements; and
presenting on a user interface, a first input component for receiving an asset identifier and a second input component presenting a list of said library of asset types for receiving a selected asset type therefrom;
upon receiving the asset identifier and the selected asset type, presenting on the user interface, another input component for each attribute of the selected asset type for receiving respective attribute-values; and
upon receiving the attribute-values, storing in the main storage the asset identifier and associated attribute-values, as a new asset instance;
b) for a given asset instance and a given procedure template:
i) iteratively reading each of the procedure statements of the group of procedure statements being associated to said given procedure template;
ii) storing, in a temporary memory, a statement-reference to each of the procedure statements of the group of procedure statements being associated to said given procedure template, where a condition is met when the corresponding one or more conditional rule is applied to the attribute-values of the given asset instance, in order to dynamically generate an asset specific procedure instance in association with the statement-reference;
iii) presenting, on a user interface, one of the procedure statements of the group of procedure statements being referenced by the asset-specific-procedure instance; and
wherein step (a) further comprises storing in the main storage at least one of:
one or more version of an asset instance, each version representing a previous version of an asset instance and each being identified by a version timestamp;
one or more version of a procedure template, each version representing a previous version of a procedure template and each being identified by a version timestamp;
one or more version of a procedure statement, each version representing a previous version of a procedure statement and each being identified by a version timestamp; and
one or more version of a unique combination of one of said procedure templates and of one of said asset instances, each version representing a previous version of an asset specific procedure and each being identified by a version timestamp; and
wherein the method further comprises:
c) for a given asset instance, a given procedure template and a given timestamp:
if the given asset instance and the given procedure template is associated to one or more corresponding version, and if the given timestamp corresponds to a version timestamp of one of the one or more version,
if the procedure template is associated to one or more version thereof, retrieving the corresponding version based on a comparison between the corresponding version timestamp and said given timestamp and identifying said version as a subject procedure template, otherwise identifying the given template as the subject procedure template;
iteratively reading each of the procedure statements of the group of procedure statements being associated to said subject procedure template: and for each of the procedure statement:
if the procedure statement is associated to one or more version thereof, retrieving by means of a processor, the corresponding version based on a comparison between the corresponding version timestamp and said given timestamp and identifying said version as a subject procedure statement, otherwise identifying the given procedure statement as the subject asset instance;
if the given asset instance is associated to one or more version thereof, retrieving by means of a processor, the corresponding version based on a comparison between the corresponding version timestamp and said given timestamp and identifying said version as a subject asset instance, otherwise identifying the given asset instance as the subject asset instance;
storing in the temporary memory, a statement-reference to each of said subject procedure statements where a condition is met when the corresponding one or more conditional rule is applied to the attribute-values of the subject asset instance, in order to construct an asset-specific-procedure instance;
otherwise, repeating steps (b)-i) and (b)-ii); and
d) presenting, on the user interface, the procedure statements being referenced by the asset-specific-procedure instance constructed at step c), in order to dynamically generate a time-dependent asset specific procedure.

11. The method according to claim 10, further comprising:
e) receiving an asset-type-change request from the user interface;
f) capturing, by means of a clock, a start timestamp;
g) modifying attributes of one of the asset types in the main storage, in accordance with the asset-type-change request;
h) for each procedure template being associated to the asset type:
dissociating from the respective procedure template, any procedure statement being related to a conditional rule related to an inexistent attribute of the asset type; and
for each asset instance of the asset type:
executing step (c) where the given timestamp is the start timestamp, in order to store a resulting a first asset-specific-procedure instance in the temporary memory;

after the step of dissociating, re-executing step (c), where the given timestamp is a present timestamp, in order to store a resulting second asset-specific-procedure instance in the temporary memory; and comparing the first and second asset-specific-procedure instances and if the first and second asset-specific-procedure instances have different statement references, associating in the main storage, the combination of the asset instance and the procedure template with a version timestamp corresponding to the present timestamp, in order to generate a new version of the asset specific procedure.

12. The method according to claim 11, further comprising:

i) receiving a procedure-template-change request from the user interface;

j) capturing, by means of a clock, a start timestamp;

k) modifying in the main storage, in accordance with the procedure-template-change request, at least one of: the group of procedure statements of one of the procedure templates; and one or more of the conditional rules associated to said group of procedure statements; and l) for each asset instance of the asset type associated to said one of the procedure templates:

re-executing step (c) wherein the given timestamp is the start timestamp, to store a resulting first asset-specific-procedure instance in the temporary memory;

re-executing step (c) wherein the given timestamp is a present timestamp, to store a resulting second asset-specific-procedure instance in the temporary memory; and comparing the first and second asset-specific-procedure instances and if the first and second asset-specific-procedure instances have different statement references, associating in the main storage, the combination of the asset instance and said one of the procedure templates with a version timestamp corresponding to the present timestamp, in order to generate a new version of the asset specific procedure.

13. The method according to claim 12, further comprising:

m) receiving a procedure-statement-change request from the user interface;

n) modifying in the main storage, one of the procedure statements, in accordance with the procedure-statement-change request;

o) for each asset instance stored, of each procedure template associated to the asset type of the asset instance:

re-executing step (c) wherein the given timestamp is a present timestamp, to temporarily store a resulting asset-specific-procedure instance in the temporary memory; and if resulting asset-specific-procedure instance references the modified one of the procedure statements, associating in the main storage, the combination of the asset instance and the procedure template with a version timestamp corresponding to the present timestamp, in order to generate a new version of the asset specific procedure.

14. The method according to claim 10, further comprising:

storing at step (a), user identifiers, each being associated to one or more role;

receiving before step (b), a user identifier, via the user interface;

storing after step (b)-ii), the asset-specific-procedure instance in a temporary memory and assigning a role thereto;

presenting at step b)-iii), on the user interface, one or more operational option concerning the asset-specific-procedure instance, said one or more operational option depending on the role;

receiving and process one or more operational selection entered by a user via the user interface, to perform an operation on the user-specific-procedure instance in the temporary storage; and assigning in the temporary storage, another role to the asset-specific-procedure instance for further processing of the asset-specific-procedure instance.

15. The method according to claim 14, further comprising permanently storing, in the main storage, the asset-specific-procedure instance as a published asset-specific-procedure instance.

16. The method according to claim 15, further comprising:

uploading a copy of the published asset-specific-procedure instance on an external client device to decouple the asset specific procedure from the main storage;

presenting on a user interface of the external client device, the procedure statements being referenced by the published asset-specific-procedure instance and an input element for at least one of the presented procedure statements;

receiving an input from a user, via said input element, to indicate that a procedure step related to the procedure statement has been completed;

storing in an external memory of said external client device, corresponding completion information with respect to said copy of the asset-specific-procedure instance; and upon coupling the external client device to communicate with the main storage, updating the published asset-specific-procedure instance in the main storage with said completion information stored in the external memory, in order to synchronize the main storage with the external memory.

17. The method according to claim 16, further comprising:

presenting on the user interface, the procedure statements being referenced by the published asset-specific-procedure instance and an input element for at least one of the presented procedure statements;

receiving an input from a user, via said input element, to indicate that a procedure step related to the procedure statement has been completed; and storing in the main storage, corresponding completion information with respect to the asset-specific-procedure instance.

18. The method according to claim 16, further comprising:

uploading a copy of the published asset-specific-procedure instance on an external client device to decouple the asset specific procedure from the main storage;

presenting on a user interface of the external client device, the procedure statements being referenced by the published asset-specific-procedure instance and an input element for at least one of the presented procedure statements;

receiving an input from a user, via said input element, to indicate that a procedure step related to the procedure statement has been completed;

store in an external memory of said external client device, corresponding completion information with respect to said copy of the asset-specific-procedure instance; and upon coupling the external client device to communicate with the main storage, updating the published asset-specific-procedure instance in the main storage with said completion information stored in the external memory, in order to synchronize the main storage with the external memory.

* * * * *